United States Patent
Mizutani et al.

(10) Patent No.: US 8,993,166 B2
(45) Date of Patent: Mar. 31, 2015

(54) ANODE ACTIVE MATERIAL AND BATTERY

(75) Inventors: Satoshi Mizutani, Fukushima (JP); Hiroshi Inoue, Fukushima (JP); Akinori Kita, Fukushima (JP); Akira Yamaguchi, Fukushima (JP)

(73) Assignee: Sony Corporation, Tokyo (JP)

( * ) Notice: Subject to any disclaimer, the term of this patent is extended or adjusted under 35 U.S.C. 154(b) by 767 days.

(21) Appl. No.: 12/026,594

(22) Filed: Feb. 6, 2008

(65) Prior Publication Data

US 2008/0193856 A1 Aug. 14, 2008

(30) Foreign Application Priority Data

Feb. 8, 2007 (JP) ................................ 2007-029668

(51) Int. Cl.
| | |
|---|---|
| H01M 4/38 | (2006.01) |
| H01M 10/0569 | (2010.01) |
| H01M 4/134 | (2010.01) |
| H01M 4/36 | (2006.01) |
| H01M 4/58 | (2010.01) |
| H01M 10/0587 | (2010.01) |
| H01M 4/52 | (2010.01) |
| H01M 4/46 | (2006.01) |
| H01M 4/587 | (2010.01) |
| H01M 4/62 | (2006.01) |
| H01M 10/0525 | (2010.01) |
| H01M 10/42 | (2006.01) |
| H01M 4/02 | (2006.01) |

(52) U.S. Cl.
CPC .......... *H01M 10/0569* (2013.01); *H01M 4/134* (2013.01); *H01M 4/364* (2013.01); *H01M 4/38* (2013.01); *H01M 4/5805* (2013.01); *H01M 10/0587* (2013.01); H01M 4/52 (2013.01); H01M 4/387 (2013.01); H01M 4/386 (2013.01); H01M 4/463 (2013.01); H01M 4/587 (2013.01); H01M 4/625 (2013.01); H01M 10/0525 (2013.01); H01M 10/4235 (2013.01); H01M 2004/021 (2013.01); H01M 2004/027 (2013.01); Y02E 60/122 (2013.01)
USPC ...................... 429/221; 429/218.1; 429/231.8

(58) Field of Classification Search
CPC ......... H01M 4/134; H01M 4/38; H01M 4/52; H01M 4/364; H01M 4/386; H01M 4/387; H01M 4/463
USPC ..................................... 429/218.1, 221, 231.8
See application file for complete search history.

(56) References Cited

U.S. PATENT DOCUMENTS

| | | | |
|---|---|---|---|
| 4,950,566 | A | 8/1990 | Huggins et al. |
| 6,730,434 | B1 | 5/2004 | Kawakami et al. |
| 6,949,312 | B1 | 9/2005 | Kawakami et al. |
| 2006/0099515 | A1 * | 5/2006 | Yamaguchi et al. .......... 429/338 |

FOREIGN PATENT DOCUMENTS

| | | |
|---|---|---|
| JP | 08-315825 | 11/1996 |
| JP | 2000-311684 | 11/2000 |
| JP | 2005-158305 | 6/2005 |
| JP | 2006-107792 | 4/2006 |
| JP | 2006-134719 | 5/2006 |
| JP | 2006-134840 | 5/2006 |
| JP | 2006-236835 | 9/2006 |
| JP | 2006-318760 | 11/2006 |
| JP | 2007-018863 | 1/2007 |

OTHER PUBLICATIONS

A Japanese Office Action dated Jan. 6, 2009 issued in connection with counterpart Japanese Patent Application No. 2007-029668.
Japanese Office Action dated Oct. 16, 2012, issued in connection with counterpart Japanese Patent Application No. JP2009-273719.

* cited by examiner

*Primary Examiner* — Ladan Mohaddes
(74) *Attorney, Agent, or Firm* — Dentons US LLP

(57) ABSTRACT

A battery with the high capacity, the superior cycle characteristics, and the superior initial charge and discharge efficiency, and an anode active material used for it are provided. The anode active material contains at least tin, cobalt, carbon, and phosphorus as an element. A carbon content is from 9.9 wt % to 29.7 wt %, a phosphorus content is from 0.1 wt % to 2.2 wt %, and a cobalt ration to the total of the tin and the cobalt is from 24 wt % to 70 wt %.

20 Claims, 40 Drawing Sheets

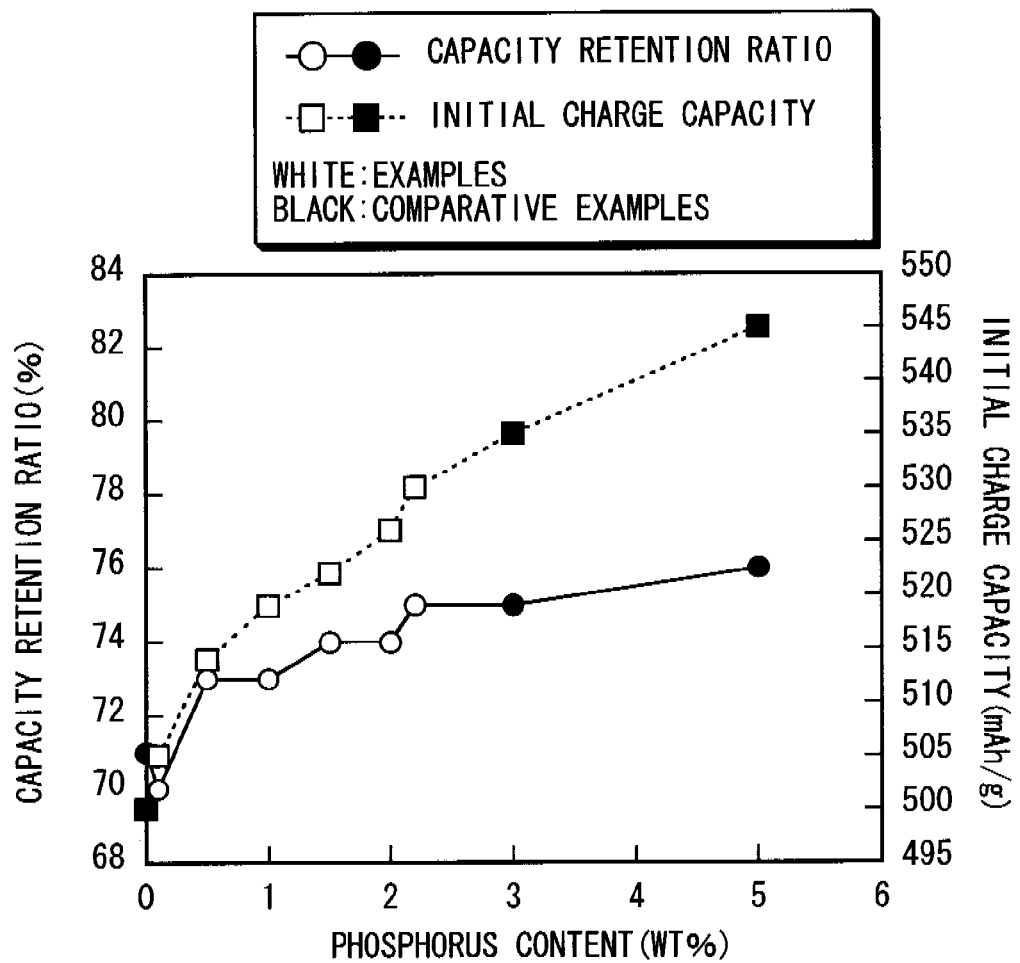
F I G. 21

ANODE ACTIVE MATERIAL AND BATTERY

CROSS REFERENCES TO RELATED APPLICATIONS

The present invention contains subject matter related to Japanese Patent Application JP 2007-029668 filed in the Japanese Patent Office on Feb. 8, 2007. the entire contents of which being incorporated herein by reference.

BACKGROUND OF THE INVENTION

1. Field of the Invention

The present invention relates to an anode active material containing tin, cobalt, carbon, and phosphorus and a battery using it.

2. Description of the Related Art

In recent years, many portable electronic devices such as combination cameras (videotape recorder), mobile phones, and notebook personal computers have been introduced, and their size and weight have been reduced. Since a battery used as a portable power source for these electronic devices, in particular a secondary battery is important as a key device, research and development to improve the energy density has been actively promoted. Specially, a nonaqueous electrolyte secondary battery (for example, lithium ion secondary battery) can provide a higher energy density compared to a lead battery and a nickel cadmium battery as an existing aqueous electrolytic solution secondary battery. Thus, studies of improving such a nonaqueous electrolyte secondary battery have been made in various fields.

In the lithium ion secondary battery, as an anode active material, a carbon material such as non-graphitizable carbon and graphite that shows the relatively high capacity and has the favorable cycle characteristics has been widely used. However, since a higher capacity has been demanded in recent years, the capacity of the carbon material should be more improved.

Against such a background, techniques to retain a high capacity with the use of the carbon material by selecting the carbonized raw material and the forming conditions have been developed (for example, refer to Japanese Unexamined Patent Application Publication No. 8-315825). However, in the case of using such a carbon material, the anode discharge potential is from 0.8 V to 1.0 V to lithium, and the battery discharge voltage becomes lowered when the battery is fabricated. Thus, in this case, it is not possible to expect great improvement in the battery energy density. Further, in this case, there is a disadvantage that the hysteresis is large in the charge and discharge curved line shape, and the energy efficiency in each charge and discharge cycle is low.

Meanwhile, as an anode with the higher capacity than that of the carbon material, researches on an alloy material have been promoted. In such an alloy material, the fact that a certain type of metal is electrochemically alloyed with lithium, and the resultant alloy is reversibly generated and decomposed is applied. For example, a high capacity anode using Li—Al alloy or Sn alloy has been developed. In addition, a high capacity anode made of Si alloy has been developed (for example, refer to U.S. Pat. No. 4,950,566).

However, the Li—Al alloy, the Sn alloy, or Si alloy is expanded and shrunk due to charge and discharge, the anode is pulverized every time charge and discharge are repeated, and thus the cycle characteristics are extremely poor.

Thus, as a technique to improve the cycle characteristics, studies on suppressing expansion by alloying tin or silicon have been made. For example, it has been proposed to alloy iron and tin (for example, refer to "Journal of the Electrochemical Society," 1999. No. 146. p. 414). Further, $Mg_2Si$ or the like has been proposed (for example, refer to "Journal of the Electrochemical Society," 1999. No. 146. p. 4401). Furthermore, for example, Sn.A.X (A represents at least one of transition metals and X represents at least one selected from the group consisting of carbon and the like) in which the ratio Sn/(Sn+A+V) is from 20 atomic % to 80 atomic % has been proposed (for example, refer to Japanese Unexamined Patent Application Publication No. 2000-311681).

SUMMARY OF THE INVENTION

However, even when the foregoing technique is used, in the present circumstances, the effects of improving the cycle characteristics are not sufficient, and the advantages of the high capacity anode using the alloy material are not sufficiently used. Thus, a technique to further improve the cycle characteristics has been sought. In this case, in particular, it is also important to improve not only the cycle characteristics but also the initial charge and discharge efficiency for exercising sufficient performance from the initial usage, in terms of increased demand for a battery with the high performance.

In view of the foregoing, in the invention, it is desirable to provide a battery with the high capacity, the superior cycle characteristics, and the superior initial charge and discharge efficiency, and an anode active material used for it.

According to an embodiment of the invention, there is provided a first anode active material containing at least tin, cobalt, carbon, and phosphorus as an element, in which the carbon content is from 9.9 wt % to 29.7 wt %, the phosphorus content is from 0.1 wt % to 2.2 wt %, and the cobalt ratio to the total of the tin and the cobalt is from 24 wt % to 70 wt %. According to an embodiment of the invention, there is provided a first battery including a cathode, an anode, and an electrolyte, in which the anode contains an anode active material containing at least tin, cobalt, carbon, and phosphorus as an element, the carbon content in the anode active material is from 9.9 wt % to 29.7 wt %, the phosphorus content in the anode active material is from 0.1 wt % to 2.2 wt %, and the cobalt ratio to the total of the tin and the cobalt is from 24 wt % to 70 wt %.

According to an embodiment of the invention, there is provided a second anode active material containing at least tin, cobalt, carbon, phosphorus, and iron as an element, in which the carbon content is from 9.9 wt % to 29.7 wt %, the phosphorus content is from 0.1 wt % to 2.2 wt %, the iron content is from 0.1 wt % to 5.9 wt %, and the cobalt ratio to the total of the tin and the cobalt is from 24 wt % to 70 wt %. According to an embodiment of the invention, there is provided a second battery including a cathode, an anode, and an electrolyte, in which the anode contains an anode active material containing at least tin, cobalt, carbon, phosphorus, and iron as an element, the carbon content in the anode active material is from 9.9 wt % to 29.7 wt %, the phosphorus content in the anode active material is from 0.1 wt % to 2.2 wt %, the iron content in the anode active material is from 0.1 wt % to 5.9 wt %, and the cobalt ratio to the total of the tin and the cobalt is from 24 wt % to 70 wt %.

According to the first anode active material of the embodiment of the invention, since tin is contained as an element, a high capacity can be obtained. Further, cobalt is contained as an element, and the cobalt ratio to the total of tin and cobalt is from 24 wt % to 70 wt %. Therefore, while the high capacity is maintained, the cycle characteristics are improved. Further, carbon and phosphorus are contained as an element, the carbon content is from 9.9 wt % to 29.7 wt %, and the phosphorus content is from 0.1 wt % to 2.2 wt %. Therefore, the cycle characteristics are further improved, and the initial charge and discharge efficiency is improved. Consequently, according to the first battery of the embodiment of the invention using the anode active material, a high capacity can be obtained, and superior cycle characteristics and superior initial charge and a discharge efficiency can be obtained.

According to the second anode active material of the embodiment of the invention, since tin is contained as an element, a high capacity can be obtained. Further, cobalt is contained as an element, and the cobalt ratio to the total of tin and cobalt is from 24 wt % to 70 wt %. Therefore, while the high capacity is maintained, the cycle characteristics are improved. Further, carbon, phosphorus, and iron are contained as an element, the carbon content is from 9.9 wt % to 29.7 wt %, the phosphorus content is from 0.1 wt % to 2.2 wt %, and the iron content is from 0.1 wt % to 5.9 wt %. Therefore, the cycle characteristics are further improved, and the initial charge and discharge efficiency is improved. Consequently, according to the second battery of the embodiment of the invention using the anode active material, a high capacity can be obtained, and superior cycle characteristics and a superior charge and discharge efficiency can be obtained. In this case, in particular, the cycle characteristics can be improved more than the case in which the anode active material does not contain iron as an element.

If the anode active material further contains silicon as an element, a higher capacity can be obtained.

If the anode active material further contains at least one selected from the group consisting of indium, niobium, germanium, titanium, molybdenum, gallium, and bismuth as an element, and the content thereof is in a range of 14.9 wt % or less, the cycle characteristics can be further improved. In particular, if the content thereof is 1.5 wt % or more, higher effects can be obtained.

In addition, if the electrolyte contains a cyclic ester carbonate derivative having a halogen atom, the decomposition reaction of the solvent in the anode is prevented, and thereby the cycle characteristics can be further improved.

Other and further objects, features and advantages of the invention will appear more fully from the following description.

BRIEF DESCRIPTION OF THE DRAWINGS

FIG. 21 is a characteristics diagram showing a relation between phosphorus contents in anode active materials of the batteries according to the first embodiment (gel electrolyte) and capacity retention ratios/initial charge capacities;

DETAILED DESCRIPTION OF THE PREFERRED EMBODIMENTS

Figure 1:
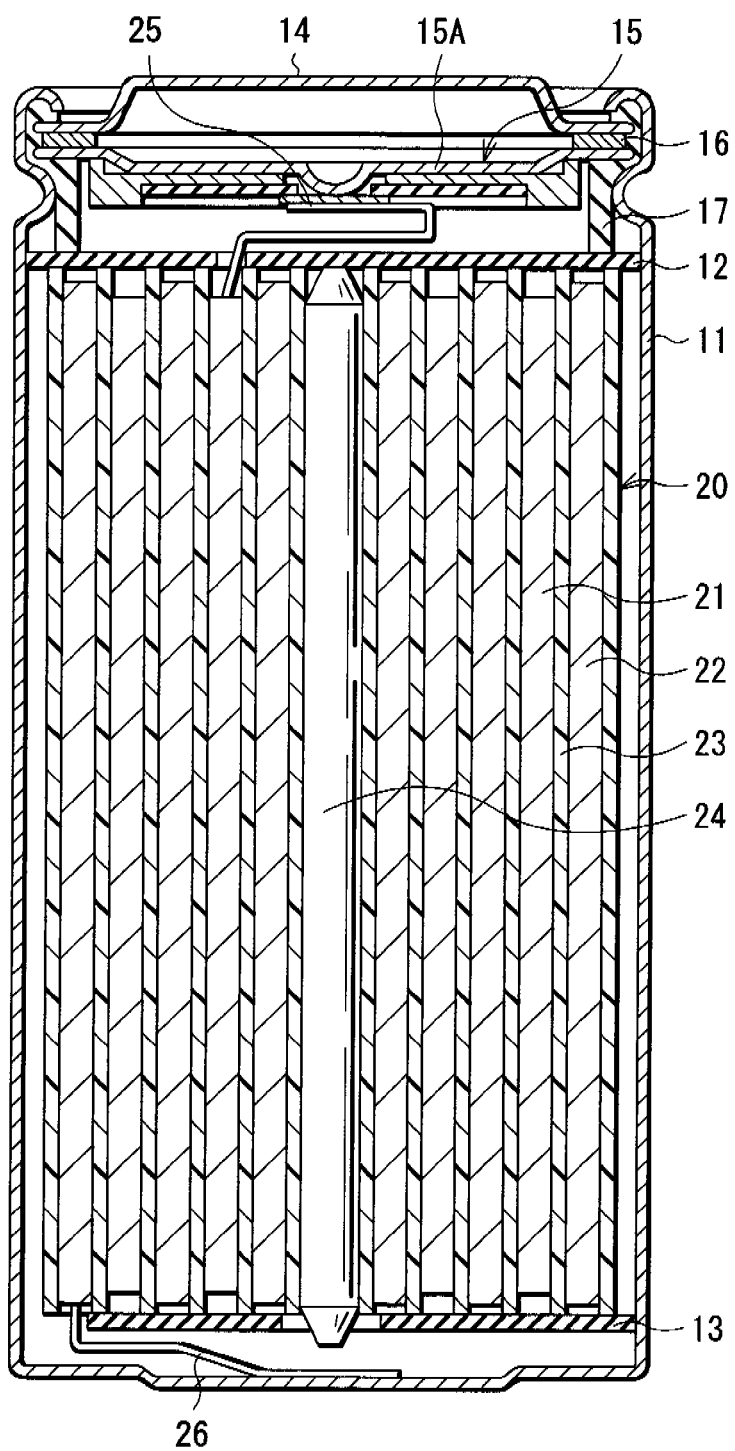
FIG. 1 is a cross section showing a structure of a first battery according to a first embodiment of the invention.

Embodiments of the invention will be hereinafter described in detail with reference to the drawings.

First Embodiment

An anode active material according to a first embodiment of the invention can react with lithium or the like, and contains tin and cobalt as an element. The reaction amount of tin to lithium per unit weight is high, and thus a high capacity can be thereby obtained. It is difficult to obtain sufficient cycle characteristics with the use of tin simple substance. Meanwhile, when the anode active material contains cobalt, the cycle characteristics are improved.

For the cobalt content, the cobalt ratio to the total of tin and cobalt is preferably in the range from 24 wt % to 70 wt %, and more preferably in the range from 24 wt % to 60 wt %. If the cobalt ratio is low, the cobalt content is lowered and thus sufficient cycle characteristics may not be obtained. Meanwhile, if the cobalt ratio is high, the tin content is lowered and thus a capacity higher than that of the existing anode material such as the carbon material may not be achieved.

The anode active material further contains carbon as an element in addition to tin and cobalt. Thereby, the cycle characteristics are further improved. The carbon content is preferably in the range from 9.9 wt % to 29.7 wt %, more preferably in the range from 14.9 wt % to 29.7 wt %, and much more preferably in the range from 16.8 wt % to 24.8 wt %. In such a range, high effects can be obtained.

The anode active material further contains phosphorus as an element in addition to tin, cobalt, and carbon. Thereby, even when the cobalt content is small, sufficient cycle characteristics are obtained, and the initial charge and discharge efficiency is increased. The phosphorus content is preferably in the range from 0.1 wt % to 2.2 wt %, and in particular, preferably in the range from 0.5 wt % to 2 wt %. In such a range, high effects can be obtained. If the phosphorus content is excessively large, a sufficient initial charge and discharge efficiency may not be achieved.

In particular, in some cases, the anode active material preferably further contains silicon as an element in addition to tin, cobalt, carbon, and phosphorus. The reaction amount of silicon to lithium per unit weight is high, and thus a high capacity is thereby achieved. The silicon content is preferably in the range from 0.5 wt % to 7.9 wt %. If the silicon content is small, effects to improve the capacity may be insufficient. Meanwhile, if the silicon content is large, the anode may be pulverized due to charge and discharge, thereby lowering the cycle characteristics.

In some cases, the anode active material may preferably further contain at least one selected from the group consisting of indium, niobium, germanium, titanium, molybdenum, gallium, and bismuth as an element. The cycle characteristics are thereby further improved. The content thereof is preferably in the range of 14.9 wt % or less, more preferably in the range from 1.5 wt % to 14.9 wt %, and in particular, much more preferably in the range from 2.8 wt % to 12.9 wt %. If the content is small, there is a possibility that sufficient effects may not be obtained. Meanwhile, if the content thereof is large, there is a possibility that the tin content is lowered, a sufficient capacity may not be obtained, thereby lowering the cycle characteristics.

The anode active material has the low crystallinity phase or the amorphous phase. The phase is a reactive phase capable of reacting with lithium or the like, and superior cycle characteristics are thereby obtained. The half-width of the diffraction peak obtained by X-ray diffraction of the phase preferably has the diffraction angle 2θ of 1 degree or more, in the case that CuKα-ray is used as a specific X ray and the sweep rate is 1 degree/min. Thereby, lithium or the like can be more smoothly inserted and extracted, and the reactivity with an electrolyte can be more decreased.

Whether or not the diffraction peak obtained by X-ray diffraction corresponds to the reactive phase capable of reacting with lithium or the like can be easily determined by comparison between the X-ray diffraction chart before the electrochemical reaction with lithium or the like and the X-ray diffraction chart after the electrochemical reaction with lithium or the like. For example, if the position of the diffraction peak before the electrochemical reaction with lithium or the like and the position of the diffraction peak after the electrochemical reaction with lithium or the like are different from each other, the diffraction peak obtained by X-ray diffraction corresponds to the reactive phase capable of reacting with lithium or the like. In this anode active material, for example, the diffraction peak of the low crystallinity reactive phase or the amorphous reactive phase is observed in the range of 2θ=from 20 to 50 degrees. The reactive phase includes, for example, the foregoing respective elements. It is thought that the reactive phase becomes low crystal or amorphous mainly due to carbon.

In some cases, the anode active material has a phase including the simple substance of each element or part thereof, in addition to the foregoing low crystallinity phase or the foregoing amorphous phase.

Further, in the anode active material, at least part of carbon as an element is preferably bonded to a metal element or a metalloid element as other element. It is thought that lowering of cycle characteristics is caused by cohesion or crystallization of tin or the like. In this regard, when carbon is bonded to other element, such cohesion or crystallization can be prevented.

As a measurement method for examining bonding state of elements, for example, X-ray Photoelectron Spectroscopy (XPS) can be cited. In the XPS, a sample is irradiated with soft X-ray (in a commercially available apparatus, al-Kα-ray or Mg—Kα-ray is used), the kinetic energy of photoelectrons jumped out from the surface thereof is measured, and thereby the element composition and the bonding state in the region several nm apart from the sample surface are examined.

The bound energy of the inner orbital electron of an element varies correlatively to the electric charge density on the element first-order approximately. For example, in the case where the electric charge density of carbon element is decreased due to interaction with an element existing in the vicinity thereof, an outer-shell electron such as 2p electron is decreased, and thus 1s electron of the carbon element is strongly bound by the shell. That is, if an electric charge of an element is decreased, the bound energy is increased. In XPS, if the bound energy is increased, the peak is shifted to the higher energy region.

In XPS, in the case of graphite, the peak of 1s orbit of carbon (C1s) is observed at 284.5 eV in the apparatus in which energy calibration is made so that the peak of 4f orbit of gold atom (Au4f) is obtained at 84.0 eV. In the case of surface contamination carbon, the peak is observed at 284.8 eV. Meanwhile, in the case of higher electric charge density of carbon element, for example, if carbon is bonded to an element more positive than carbon, the peak of C1s is observed in the region lower than 284.5 eV. That is, if at least part of carbon contained in the anode active material is bonded to the metal element or the metalloid element as other element, the peak of the composite wave of C1s obtained for the anode active material is observed in the region lower than 284.5 eV.

In XPS measurement of the anode active material, if the surface is covered with surface contamination carbon, the surface is preferably sputtered slightly with the use of an argon ion gun attached to an XPS apparatus. Further, if the anode active material subject to measurement exists in the anode of the after-mentioned battery, it is preferable that after the battery is disassembled and the anode is taken out, the anode is washed with a volatile solvent such as dimethyl carbonate. Thereby, a low-volatile solvent and an electrolyte salt that exist on the surface of the anode are removed. Such a sampling is preferably made under the inert atmosphere.

Further, in XPS measurement, for example, the peak of C1s is used for correcting the energy axis of spectrums. Since surface contamination carbon generally exists on a substance surface, the peak of C1s of the surface contamination carbon is set to 284.8 eV, which is used as an energy reference. In XPS measurement, the waveform of the peak of C1s is obtained as a form including the peak of the surface contamination carbon and the peak of carbon in the anode active material. Therefore, for example, the waveform is analyzed by using commercially available software to separate the peak of the surface contamination carbon and the peak of carbon in the anode active material. In the analysis of the waveform, the position of the main peak existing on the lowest bound energy side is set to the energy reference (284.8 eV).

The anode active material can be formed by, for example, mixing raw materials of the respective elements, melting the mixture in an electric furnace, a high frequency inducing furnace, an arc melting furnace or the like, and then solidifying the resultant. Otherwise, the anode active material can be formed by, for example, various atomization methods such as gas atomization method and water atomization method, various rolling methods, or a method utilizing mechanochemical reaction such as mechanical alloying method and mechanical milling method. Specially, the anode active material is preferably formed by the method utilizing mechanochemical reaction, since the anode active material can thereby obtain the low crystallinity structure or the amorphous structure. For such a method, for example, a planetary ball mill device can be used.

For the raw material, simple substances of the respective elements can be used by mixing. However, for some of the elements other than carbon, alloys are preferably used. If carbon is added to such alloys, and then the anode active material is synthesized by a method using mechanical alloying method, a low crystallinity structure or an amorphous structure can be obtained, and the reaction time can be shortened. The raw materials can be either powder or a mass.

As a carbon used as a raw material, for example, one or more carbon materials such as non-graphitizable carbon, graphitizable carbon, graphite, pyrolytic carbons, coke, glassy carbons, an organic polymer compound fired body, activated carbon, and carbon black can be used. Of the foregoing, the coke includes pitch coke, needle coke, petroleum coke and the like. The organic polymer compound fired body is a carbonized body obtained by firing a polymer compound such as a phenol resin and a furan resin at an appropriate temperature. The shape of these carbon materials can be fibrous, spherical, granular, or scale-like.

The anode active material is used for a battery as follows, for example.

First Battery

FIG. 1 shows a cross sectional structure of a first battery. The battery herein described is a lithium ion secondary battery in which the anode capacity is expressed by the capacity component based on insertion and extraction of lithium as an electrode reactant.

The secondary battery contains a spirally wound electrode body 20 in which a strip-shaped cathode 21 and a strip-shaped anode 22 are layered with a separator 23 in between and spirally wound inside a battery can 11 having the shape of an approximately hollow cylinder. The structure including the battery can 11 is called cylindrical type. The battery can 11 is made of, for example, iron plated by nickel. One end of the battery can 11 is closed, and the other end thereof is opened. A liquid electrolyte (so-called electrolytic solution) is injected into the battery can 11 and impregnated in the separator 23. A pair of insulating plates 12 and 13 is respectively arranged perpendicularly to the spirally wound periphery face so that the spirally wound electrode body 20 is sandwiched by the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is made of, for example, a material similar to that of the battery can 11. The safety valve mechanism 15 is electrically connected to the battery cover 14 through the PTC device 16. In the safety valve mechanism 15, if the internal pressure of the battery becomes a certain level or more by internal short circuit, external heating or the like, a disk plate 15A flips to cut the electric connection between the battery cover 14 and the spirally wound electrode body 20. When temperature rises, the PTC device 16 increases the resistance value and thereby limits a current to prevent abnormal heat generation resulting from a large current. The gasket 17 is made of, for example, an insulating material and its surface is coated with asphalt.

For example, the spirally wound electrode body 20 is spirally wound centering on the center pin 24. A cathode lead 25 made of aluminum (Al) or the like is connected to the cathode 21 of the spirally wound electrode body 20, and an anode lead 26 made of nickel (Ni) or the like is connected to the anode 22. The cathode lead 25 is electrically connected to the battery cover 14 by being welded to the safety valve mechanism 15. The anode lead 26 is welded and thereby electrically connected to the battery can 11.

Figure 2:
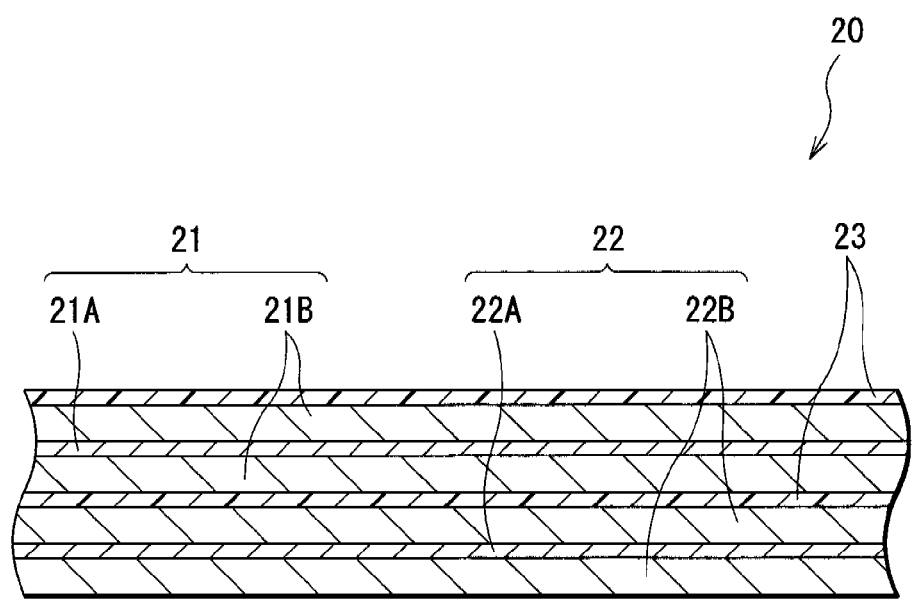
FIG. 2 is a cross section showing an enlarged part of a spirally wound electrode body shown in FIG. 1.

FIG. 2 shows an enlarged part of the spirally wound electrode body 20 shown in FIG. 1. The cathode 21 has a structure in which, for example, a cathode active material layer 21B is provided on a single face or the both faces of a cathode current collector 21A having a pair of opposed faces. The cathode current collector 21A is made of, for example, a metal foil such as an aluminum foil. The cathode active material layer 21B contains, for example, one or more cathode active materials capable of inserting and extracting lithium. If necessary, the cathode active material layer 21B may contain an electrical conductor such as a carbon material and a binder such as polyvinylidene fluoride.

As the cathode active material capable of inserting and extracting lithium, for example, a metal sulfide or a metal oxide not containing lithium such as titanium sulfide ($TiS_2$), molybdenum sulfide ($MoS_2$), niobium selenide ($NbSe_2$), and vanadium oxide ($V_2O_5$) can be cited. Further, a lithium complex oxide with a main body of $Li_xMO_2$ (in the formula, M represents one or more transition metals. x varies according to charge and discharge states of the battery, and the value of x is generally in the range of $0.05 \leq x \leq 1.1$) or the like can be cited as well. As the transition metal M composing the lithium complex oxide, cobalt, nickel, or manganese (Mn) is preferable. As specific examples of such a lithium complex oxide, $LiCoO_2$, $LiNiO_2$, $Li_xNi_yCo_{1-y}O_2$ (in the formula, x and y vary according to charge and discharge states of the battery. In general, x and y are in the range of $0<x<1<y<1$), a lithium manganese complex oxide having a spinel-type structure or the like can be cited.

The anode 22 has a structure in which, for example, an anode active material layer 22B is provided on a single face or the both faces of an anode current collector 22A having a pair of opposed faces as the cathode 21 does. The anode current collector 22A is made of a metal foil such as a copper foil.

The anode active material layer 22B contains, for example, the anode active material according to this embodiment. If necessary, the anode active material layer 22B contains a binder such as polyvinylidene fluoride. Since the anode active material according to this embodiment is contained in the anode active material layer 22B, in the secondary battery, a high capacity is obtained, and the cycle characteristics and the initial charge and discharge efficiency are improved. The anode active material layer 22B may contain other anode active material and other material such as an electrical conductor in addition to the anode active material according to this embodiment. Other anode active materials include, for example, a carbon material capable of inserting and extracting lithium can be cited. The carbon material is preferably used, since the carbon material can improve the charge and discharge cycle characteristics, and functions as an electrical conductor. Examples of the carbon material include, for example, a material similar to that used in forming the anode active material.

The ratio of the carbon material is preferably in the range from 1 wt % to 95 wt % to the anode active material of this embodiment. If the amount of the carbon material is small, the electric conductivity of the anode 22 may be lowered. Meanwhile, if the amount of the carbon material is large, the capacity may be lowered.

The separator 23 separates the cathode 21 from the anode 22, and passes lithium ions while preventing current short circuit due to contact of the both electrodes. The separator 23 is made of, for example, a porous film made of a synthetic resin such as polytetrafluoroethylene, polypropylene, and polyethylene, or a ceramic porous film. The separator 23 may have a structure in which two or more porous films as the foregoing porous films are layered.

The electrolytic solution impregnated in the separator 23 contains a solvent and an electrolyte salt dissolved in the solvent. Examples of the solvent include propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, ester acetate, ester butylate, and ester propionate. One of the solvents may be used singly, or two or more thereof may be used by mixing.

The solvent more preferably contains a cyclic ester carbonate derivative having a halogen atom, since thereby decomposition reaction of the solvent in the anode 22 can be suppressed, and thus the cycle characteristics can be improved. Specific examples of such an ester carbonate derivative include 4-fluoro-1,3-dioxolan-2-one shown in Chemical formula 1,4-difluoro-1,3-dioxolan-2-one shown in Chemical formula 2, 4,5-difluoro-1,3-dioxolan-2-one shown in Chemical formula 3, 4-difluoro-5-fluoro-1,3-dioxolan-2-one shown in Chemical formula 4, 4-chrolo-1,3-dioxolan-2-one shown in Chemical formula 5, 4,5-dichrolo-1,3-dioxolan-2-one shown in Chemical formula 6, 4-bromo-1,3-dioxolan-2-one shown in Chemical formula 7, 4-iodine-1,3-dioxolan-2-one shown in Chemical formula 8, 4-fluoromethyl-1,3-dioxolan-2-one shown in Chemical formula 9, 4-trifluoromethyl-1,3-dioxolan-2-one shown in Chemical formula 10 and the like. Specially, 4-fluoro-1,3-dioxolan-2-one is desirable, since higher effects can be thereby obtained.

Chemical formula 1
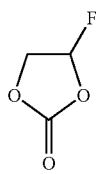

Chemical formula 2
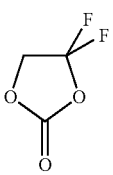

Chemical formula 3
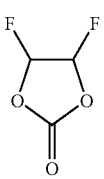

Chemical formula 4
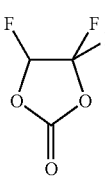

Chemical formula 5
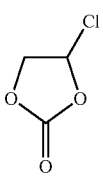

Chemical formula 6
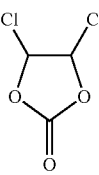

Chemical formula 7
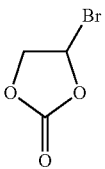

Chemical formula 8
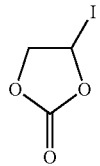

Chemical formula 9
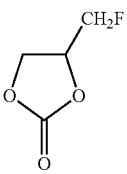

Chemical formula 10
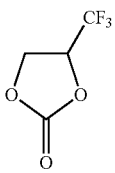

The solvent may be composed of only the ester carbonate derivative. However, the solvent is preferably a mixture of the ester carbonate derivative and a low-boiling point solvent whose boiling point is 150 deg C. or less at the atmopheric pressure ($1.01325 \times 10^5$ Pa), since thereby the ion conductivity is improved. The content of ester carbonate derivative is preferably in the range from 0.1 wt % to 80 wt % to the entire solvent. If the content is small, the effects to prevent the decomposition reaction of the solvent in the anode 22 may be insufficient. Meanwhile, if the content is large, the viscosity may be increased, and thus the ion conductivity may be lowered.

As the electrolyte salt, for example, a lithium salt can be cited. One thereof may be used singly, or two or more thereof may be used by mixing. Examples of the lithium salt include $LiClO_4$, $LiAsF_6$, $LiPF_6$, $LiBF_4$, $LiB(C_6H_5)_4$, $CH_3SO_3Li$, $CF_3SO_3Li$, LiCl, LiBr or the like can be cited. Though the lithium salt is preferably used as an electrolyte salt, it is not essential to use the lithium salt. Lithium ions contributing to charge and discharge are enough if provided by the cathode 21 or the like.

The secondary battery can be manufactured, for example, as follows.

First, for example, a cathode active material, and if necessary, an electrical conductor and a binder are mixed to prepare a cathode mixture. After that, the cathode mixture is dispersed in a mixed solvent such as N-methyl-2-pyrrolidone to form cathode mixture slurry. Subsequently, the cathode current collector 21A is coated with the cathode mixture slurry, which is dried and compressed to form the cathode active material layer 21B, and thereby the cathode 21 is formed. After that, the cathode lead 25 is welded to the cathode 21.

Further, for example, the anode active material according to this embodiment and if necessary, other anode active material and a binder are mixed to prepare an anode mixture. The anode mixture is dispersed in a mixed solvent such as N-methyl-2-pyrrolidone to form anode mixture slurry. Subsequently, the anode current collector 22A is coated with the anode mixture slurry, which is dried and compressed to form the anode active material layer 22B, and thereby the anode 22 is formed. After that, the anode lead 26 is welded to the anode 22.

Subsequently, the cathode 21 and the anode 22 are spirally wound with the separator 23 in between. An end of the cathode lead 25 is welded to the safety valve mechanism 15, and an end of the anode lead 26 is welded to the battery can 11. The spirally wound cathode 21 and the spirally wound anode 22 are sandwiched between the pair of insulating plates 12 and 13, and are contained in the battery can 11. Subsequently, an electrolytic solution is injected into the battery can 11. After that, at the open end of the battery can 11, the battery cover 14, the safety valve mechanism 15, and the PTC device 16 are fixed by being caulked with the gasket 17. The secondary battery shown in FIG. 1 and FIG. 2 is thereby fabricated.

In the secondary battery, when charged, for example, lithium ions are extracted from the cathode 21, and are inserted in the anode 22 through the electrolyte. When discharged, for example, lithium ions are extracted from the anode 22, and are inserted in the cathode 21 through the electrolyte.

As above, according to the anode active material of this embodiment, since the anode active material contains tin as an element, the high capacity can be obtained. Further, the anode active material contains cobalt as an element, and the cobalt ratio to the total of tin and cobalt is from 24 wt % to 70 wt %. Therefore, the cycle characteristics can be improved while the high capacity is maintained. Further, the anode active material further contains carbon and phosphorus as an element, the carbon content is from 9.9 wt % to 29.7 wt %, and the phosphorus content is from 0.1 wt % to 2.2 wt %. Therefore, the cycle characteristics are more improved, and the initial charge and discharge efficiency is improved. In the anode active material, compared to a case not including phosphorus as an element, even when the tin content is equal to or less than the tin content in the case not including phosphorus as an element, a high capacity can be obtained, and the initial charge and discharge efficiency is improved. Furthermore, in this anode active material, even when the cobalt content is small, high cycle characteristics can be obtained. Thereby, in the battery according to this embodiment, since the foregoing anode active material is used, a high capacity can be achieved, and superior cycle characteristics and superior initial charge and discharge efficiency can be achieved.

If the anode active material further contains silicon as an element, a higher capacity can be obtained.

If the anode active material further contains at least one selected from the group consisting of indium, niobium, germanium, titanium, molybdenum, gallium, and bismuth as an element, and the content thereof is 14.9 wt % or less, the cycle characteristics can be further improved. In particular, if the content thereof is 1.5 wt % or more, higher effects can be achieved.

In addition, if the electrolyte contains the cyclic ester carbonate derivative having halogen atom, the decomposition reaction of the solvent in the anode 22 is suppressed, and thereby the cycle characteristics can be further improved.

Second Battery

Figure 3:
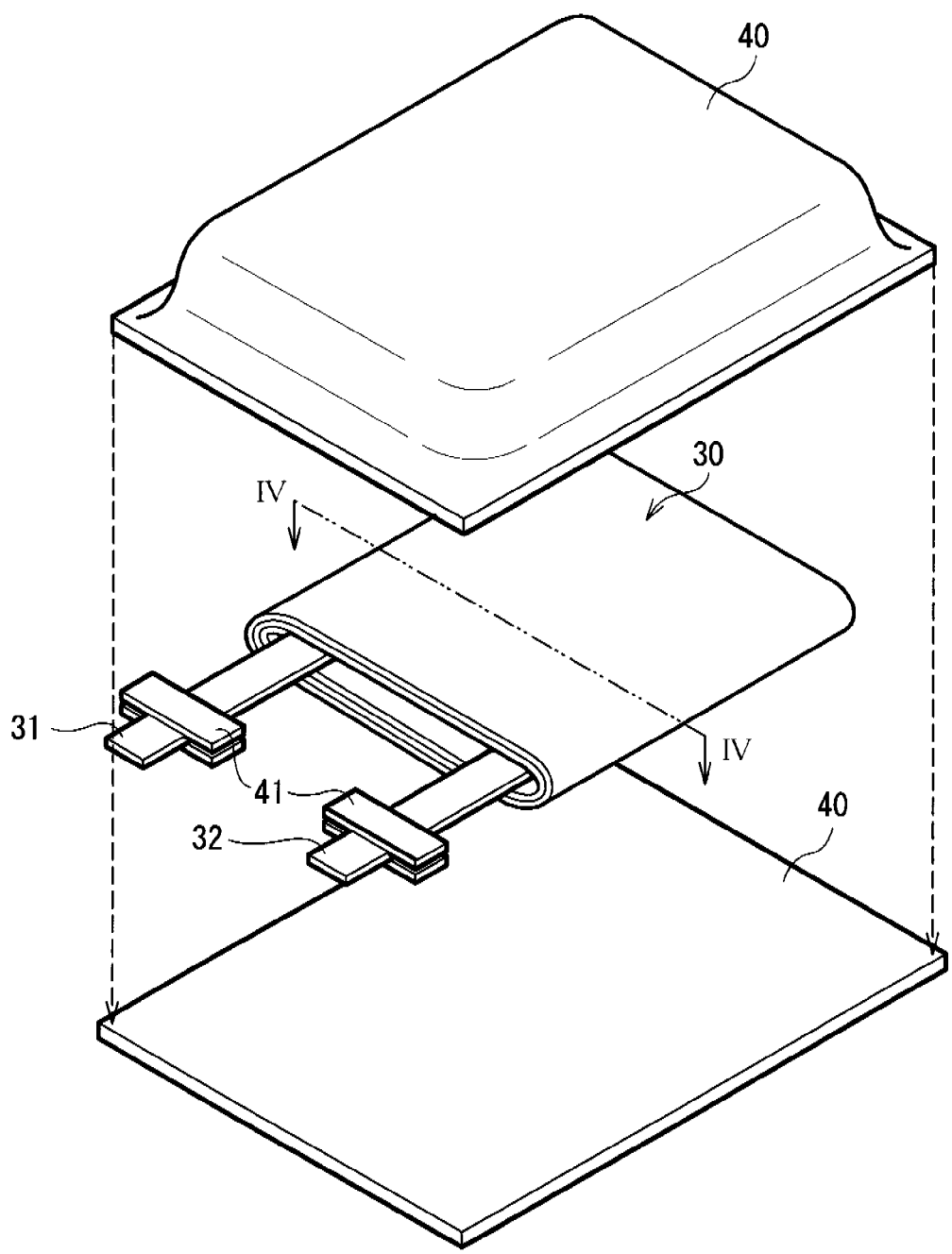
FIG. 3 is an exploded perspective view showing a structure of a second battery according to the first embodiment of the invention.

FIG. 3 shows an exploded perspective structure of a second battery. In the battery, a spirally wound electrode body 30 on which a cathode lead 31 and an anode lead 32 are attached is contained in a film package member 40. The size, the weight, and the thickness of the battery can be reduced. The battery is, for example, a lithium ion secondary battery similar to the first battery, and the battery structure including the film package member 40 is called the laminated type.

The cathode lead 31 and the anode lead 32 are respectively directed from inside to outside of the package member 40 in the same direction, for example. The cathode lead 31 and the anode lead 32 are made of, for example, a metal material such as aluminum, copper, nickel, and stainless. The cathode lead 31 and the anode lead 32 are respectively in the shape of a thin plate or mesh.

The package member 40 is made of a rectangular aluminum laminated film in which, for example, a nylon film, an aluminum foil, and a polyethylene film are bonded together in this order. The package member 40 is, for example, arranged so that the polyethylene film side and the spirally wound electrode body 30 are opposed, and the respective outer edges are contacted to each other by fusion bonding or an adhesive. An adhesive film 41 to protect from entering of outside air is inserted between the package member 40 and the cathode lead 31, the anode lead 32. The adhesive film 41 is made of a material having contact characteristics to the cathode lead 31 and the anode lead 32, for example, and is made of a polyolefin resin such as polyethylene, polypropylene, modified polyethylene, and modified polypropylene.

The package member 40 may be made of a laminated film having other structure, a polymer film such as polypropylene, or a metal film, instead of the foregoing aluminum laminated film.

Figure 4:
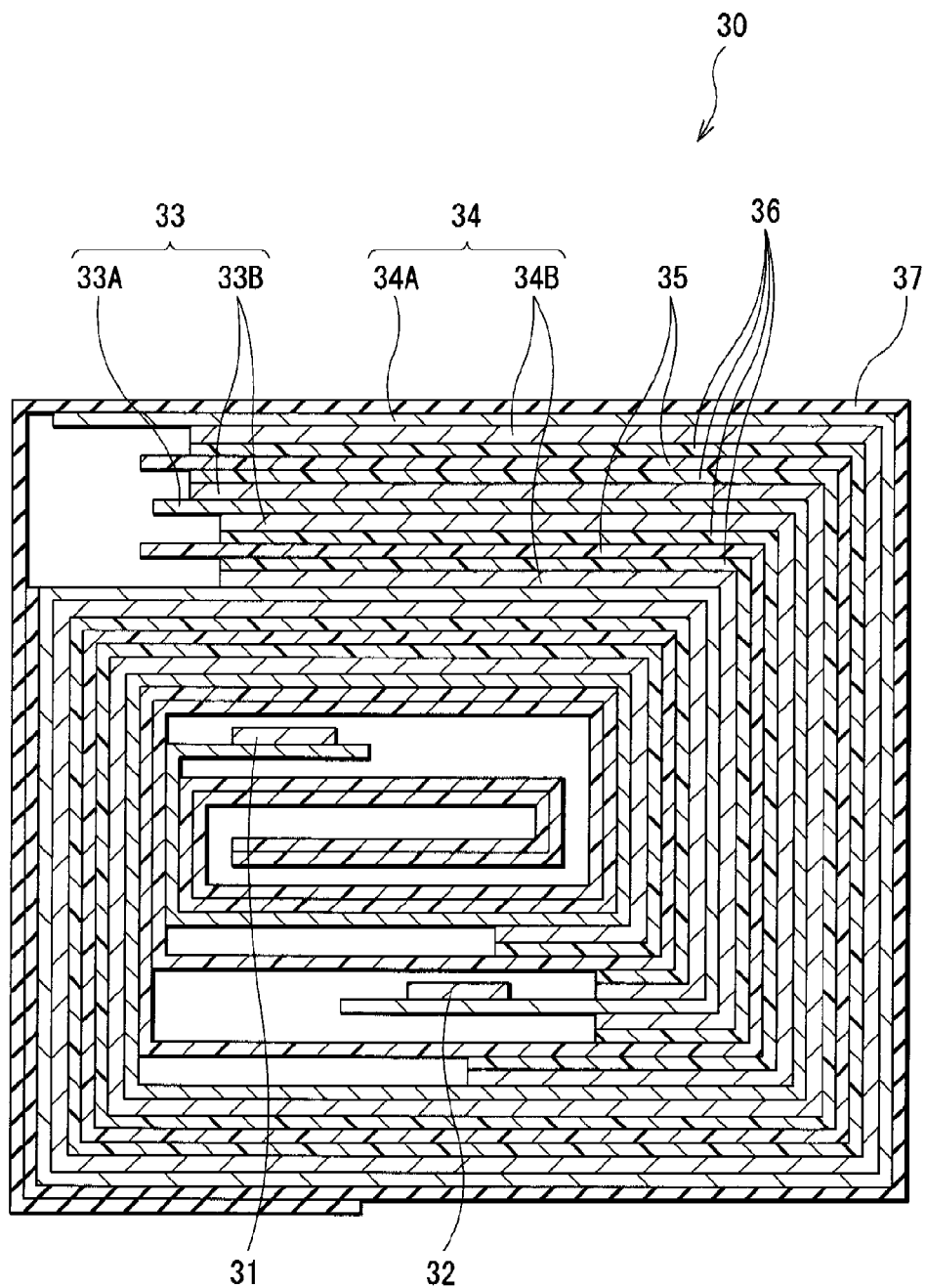
FIG. 4 is a cross section showing a structure taken along line IV-IV of a spirally wound electrode body shown in FIG. 3.

FIG. 4 shows a cross sectional structure taken along line IV-IV of the spirally wound electrode body 30 shown in FIG. 3. In the spirally wound electrode body 30, a cathode 33 and an anode 34 are layered with a separator 35 and an electrolyte layer 36 in between and then spirally wound. The outermost periphery thereof is protected by a protective tape 37.

The cathode 33 has a structure in which a cathode active material layer 33B is provided on a single face or the both faces of a cathode current collector 33A. The anode 34 has a structure in which an anode active material layer 34B is provided on a single face or the both faces of an anode current collector 34A. Arrangement is made so that the anode active material layer 34B side is opposed to the cathode active material layer 33B. The structures of the cathode current collector 33A, the cathode active material layer 33B, the anode current collector 34A, the anode active material layer 34B, and the separator 35 are similar to those of the cathode current collector 21A, the cathode active material layer 21B, the anode current collector 22A, the anode active material layer 22B, and the separator 23 of the foregoing first battery.

The electrolyte 36 is so-called gelatinous, containing an electrolytic solution and a polymer compound that holds the electrolytic solution. The gel electrolyte is preferable, since thereby high ion conductivity can be obtained and liquid leakage of the battery can be prevented. The structure of the electrolytic solution (that is, a solvent and an electrolyte salt) is similar to that of the electrolytic solution in the foregoing first battery. As the polymer compound, for example, a fluorinated polymer compound such as polyvinylidene fluoride and a copolymer of vinylidene fluoride and hexafluoropropylene, an ether polymer compound such as polyethylene oxide and a cross-linked compound containing polyethylene oxide, or polyacrylonitrile can be cited. In particular, in terms of redox stability, the fluorinated polymer compound is desirable.

Instead of the electrolyte layer 36 in which the electrolytic solution is held by the polymer compound, the electrolytic solution may be directly used. In this case, the electrolytic solution is impregnated in the separator 35.

The secondary battery including the gel electrolyte layer 36 is manufactured, for example, as follows.

First, a precursor solution containing a solvent, an electrolyte, a polymer compound, and a mixed solvent is prepared. Then, the cathode 33 and the anode 34 are respectively coated with the precursor solution. After that, the mixed solvent is volatilized to form the electrolyte layer 36. Subsequently, the cathode lead 31 is attached to an end of the cathode current collector 33A by welding, and the anode lead 32 is attached to an end of the anode current collector 34A by welding. Subsequently, the cathode 33 and the anode 34 formed with the electrolyte layer 36 are layered with the separator 35 in between to obtain a lamination. After the lamination is spirally wound in the longitudinal direction, a protective tape 37 is adhered to the outermost periphery thereof to form the spirally wound electrode body 30. Finally, for example, the spirally wound electrode body 30 is sandwiched between the package members 40, and outer edges of the package members 40 are contacted by thermal fusion bonding or the like to enclose the spirally wound electrode body 30. Then, the adhesive film 41 is inserted between the cathode lead 31/the anode lead 32 and the package member 40. Thereby, the secondary battery shown in FIG. 3 and FIG. 4 is fabricated.

Otherwise, the secondary battery including the gel electrolyte layer 36 may be manufactured as follows. First, the cathode 33 and the anode 34 are formed as described above, and the cathode lead 31 and the anode lead 32 are respectively attached on the cathode 33 and the anode 34. After that, the cathode 33 and the anode 34 are layered with the separator 35 in between and spirally wound. The protective tape 37 is adhered to the outermost periphery thereof, and thereby a spirally wound body as a precursor of the spirally wound electrode body 30 is formed. Subsequently, the spirally wound body is sandwiched between the package members 40, the peripheral edges other than one side are contacted by thermal fusion-bonding or the like to obtain a pouched state, and the spirally wound body is contained in the package member 40. Subsequently, a composition of matter for electrolyte containing a solvent, an electrolyte salt, a monomer as a raw material for a polymer compound, a polymerization initiator, and if necessary other material such as a polymerization inhibitor is prepared, which is injected into the package member 40. Finally, the opening of the package member 40 is hermetically sealed by thermal fusion bonding under the vacuum atmosphere. After that, the monomer is polymerized by applying heat to obtain a polymer compound. Thereby, the gel electrolyte layer 36 is formed. Consequently, the secondary battery shown in FIG. 3 and FIG. 4 is fabricated.

The secondary battery works as the first secondary battery does, and provides effects similar to those of the first secondary battery.

Third Battery

Figure 5:
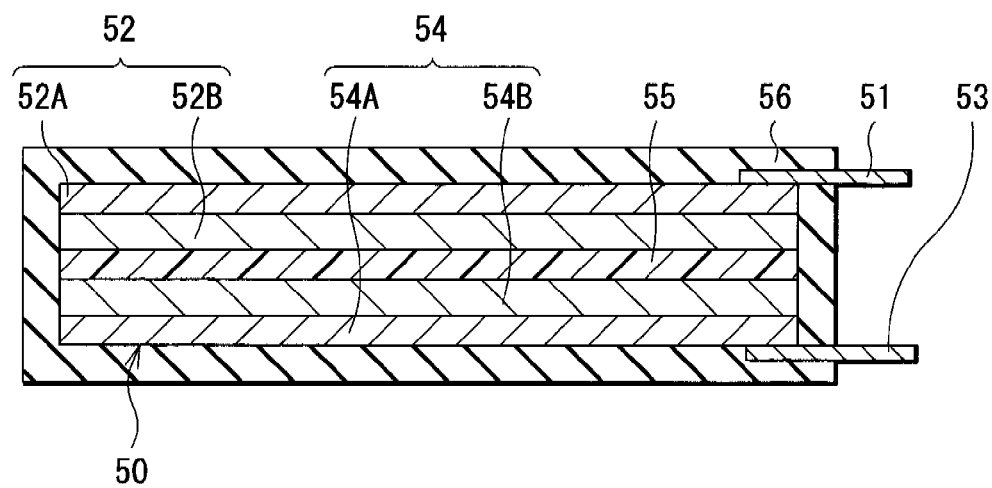
FIG. 5 is a cross section showing a structure of a third battery according to the first embodiment of the invention.

FIG. 5 shows a cross sectional structure of a third battery. The battery is a lithium ion secondary battery similar to the first battery. In the secondary battery, a tabular electrode body 50 in which a cathode 52 attached with a cathode lead 51 and an anode 54 attached with an anode lead 53 are oppositely arranged with an electrolyte layer 55 in between is contained in a film package member 56. The structure of the package member 56 is similar to that of the package member 40 in the foregoing second battery.

The cathode 52 has a structure in which a cathode current collector 52A is provided with a cathode active material layer 52B. The anode 54 has a structure in which an anode current collector 54A is provided with an anode active material layer 54B. Arrangement is made so that the anode active material layer 54B side is opposed to the cathode active material layer 52B. Structures of the cathode current collector 52A, the cathode active material layer 52B, the anode current collector 54A, and the anode active material layer 54B are respectively similar to those of the cathode current collector 21A, the cathode active material layer 21B, the anode current collector 22A, and the anode active material layer 22B in the first battery described above.

The electrolyte layer 55 is made of, for example, a solid electrolyte. As a solid electrolyte, for example, either an inorganic solid electrolyte or a polymer solid electrolyte can be used as long as the solid electrolyte is a material having lithium ion conductivity. As an inorganic solid electrolyte, the electrolyte containing lithium nitride, lithium iodide or the like can be cited. The polymer solid electrolyte is the electrolyte mainly composed of an electrolyte salt and a polymer compound dissolving the electrolyte salt. As the polymer compound of the polymer solid electrolyte, for example, an ether polymer compound such as polyethylene oxide and a cross-linked compound containing polyethylene oxide, an ester polymer compound such as polymethacrylate, or an acrylate polymer compound can be used singly, by mixing, or copolymerization thereof.

The polymer solid electrolyte can be formed by, for example, mixing a polymer compound, an electrolyte salt, and a mixed solvent, and then volatilizing the mixed solvent. Otherwise, the polymer solid electrolyte can be formed by dissolving an electrolyte salt, a monomer as a raw material for a polymer compound, a copolymerization initiator, and if necessary other material such as a polymerization inhibitor into a mixed solvent, volatilizing the mixed solvent, and then applying heat to polymerize the monomer to form the polymer compound.

The inorganic solid electrolyte can be formed, for example, on the surface of the cathode 52 or the anode 54 by a vapor-phase deposition method such as sputtering method, vacuum evaporation method, laser ablation method, ion plating method, and CVD (Chemical Vapor Deposition) method; or a liquid-phase deposition method such as sol-gel method.

The secondary battery works similarly to the first or the second secondary battery does, and effects similar to those of the first or the second secondary battery can be obtained.

Second Embodiment

An anode active material according to a second embodiment of the invention has a structure similar to that of the anode active material of the foregoing first embodiment, except that the anode active material according to the second embodiment contains iron in addition to tin, cobalt, carbon, and phosphorus as an element. The anode active material is formed by a method similar to that of the anode active material of the first embodiment.

The anode active material contains iron, since thereby the cycle characteristics are improved, compared to a case that an anode active material does not contain iron. The iron content is preferably in the range from 0.1 wt % to 5.9 wt %. If the iron content is small, sufficient cycle characteristics may not be obtained. Meanwhile, if the iron content is large, the tin content is lowered and a sufficient capacity may not be obtained.

The anode active material is used, for example, for the foregoing first to third batteries in the same manner as the anode active material of the first embodiment.

As described above, the anode active material according to this embodiment contains tin, cobalt, carbon, and phosphorus as an element. The cobalt ratio to the total of tin and cobalt is from 24 wt % to 70 wt %, the carbon content is from 9.9 wt % to 29.7 wt %, and the phosphorus content is from 0.1 wt % to 2.2 wt %. Therefore, due to the operation similar to that of the first embodiment, a high capacity can be achieved, and the cycle characteristics and the initial charge and discharge efficiency are improved. Further, the anode active material according to this embodiment further contains iron as an element, and the iron content is from 0.1 wt % to 5.9 wt %. Therefore, the cycle characteristics are more improved. Thereby, the cycle characteristics are more improved. In the result, in the battery according to this embodiment, since the foregoing anode active material is used, a high capacity can be achieved, and the superior cycle characteristics and the superior initial charge and discharge efficiency can be obtained. In this case, the cycle characteristics can be improved more, compared to the first embodiment.

Effects of the anode active material and the battery of this embodiment other than the foregoing are similar to those of the first embodiment.

EXAMPLES

Further, specific examples of the invention will be described in detail.

1. First, a description will be given of examples for the anode active material of the first embodiment and the battery using it, in the order of a case using a liquid electrolyte (electrolytic solution) and a case using a gel electrolyte.

1-1. Case Using Liquid Electrolyte (Electrolytic Solution)

Examples 1-1 to 1-7

First, anode active materials were formed. That is, as raw materials, cobalt powder, tin powder, carbon powder, and phosphorus powder were prepared. The cobalt powder and the tin powder were alloyed to obtain cobalt-tin alloy powder, to which the carbon powder and the phosphorus powder were added and the resultant was dry-blended. The ratios of the raw materials (raw material ratio: wt %) were changed as shown in Table 1. Specifically, the raw material ratio of phosphorus was set to the constant value of 1.5 wt %. The cobalt ratio to the total of tin and cobalt (hereinafter referred to as Co/(Sn+Co) ratio) was set to the constant value of 37 wt %. The raw material ration of carbon was changed in the range from 10 wt % to 30 wt %. Subsequently, 20 g of the foregoing mixture together with about 400 g of corundum being 9 mm in diameter was set into a reaction vessel of a planetary ball mill, ITO make. Subsequently, after inside of the reaction vessel was substituted with argon (Ar) atmosphere, 10-minute operation at a rotational speed of 250 rpm and 10-minute break were repeated until the total operation time became 30 hours. Finally, the reaction vessel was cooled down to room temperature, and the synthesized anode active material powder was taken out, from which coarse powder was removed through a 280-mesh screen.

The obtained anode active material was provided with composition analysis. The carbon content was measured by a carbon-sulfur analyzer, and the cobalt content, the tin content, and the phosphorus content were measured by ICP (Inductively Coupled Plasma) emission spectrometry. The analysis results (wt %) are shown in Table 1. All the raw material ratios and the analysis results shown in Table 1 are values obtained by rounding the hundredth. The same will be applied to the following examples and comparative examples. Further, for the anode active material, X-ray diffraction was performed. In the result, the diffraction peak having a wide half-width in 2θ=from 20 to 50 degrees was observed. The half-width (deg) of the diffraction peak is also shown in Table 1.

Figure 6:
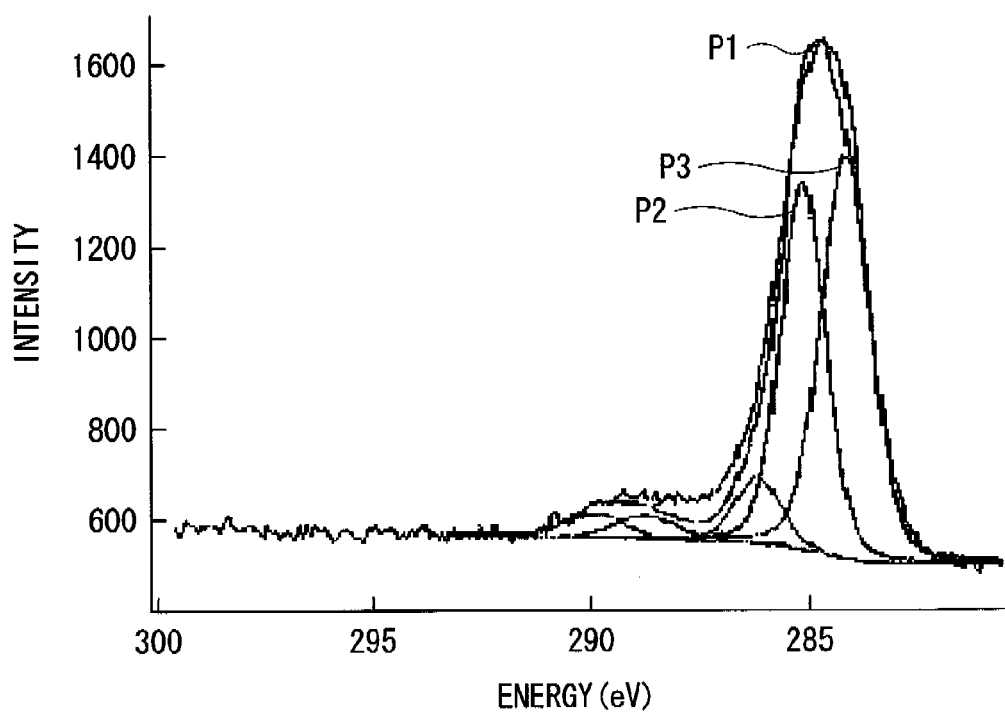
FIG. 6 is a diagram showing an example of peaks obtained by X-ray Photoelectron Spectroscopy for anode active materials formed in examples.

Further, XPS was performed. In the result, as shown in FIG. 6, peak P1 was obtained. When Peak P1 was analyzed, Peak P2 of the surface contamination carbon was obtained, and peak P3 of C1s in the anode active material on the energy side lower than that of Peak P2 were obtained. For all Examples 1-1 to 1-7, peak P3 was obtained in the region lower than 284.5 eV. That is, it was confirmed that the carbon in the anode active material was bonded to other element.

Figure 7:
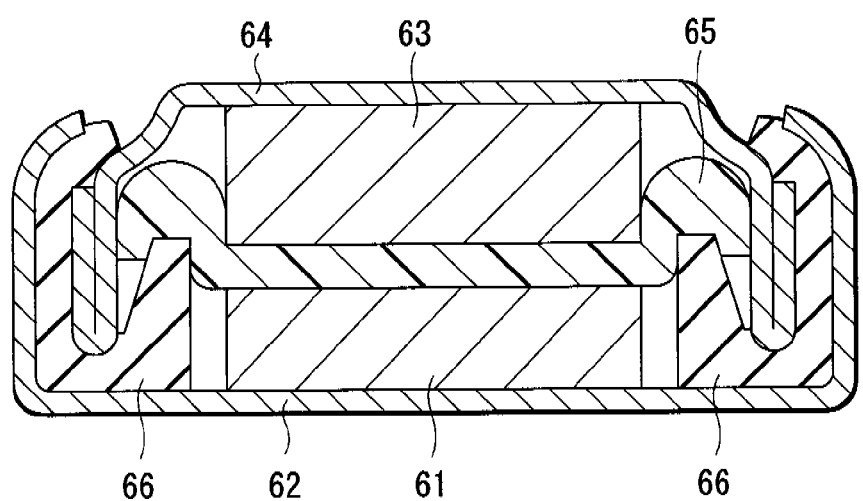
FIG. 7 is a cross section showing a structure of a coin type battery fabricated in examples.

Next, a coin type secondary battery shown in FIG. 7 was fabricated by using the foregoing anode active material powder. In the secondary battery, a test electrode 61 using the anode active material was contained in a cathode can 62, and a counter electrode 63 was attached to an anode can 64. These components were layered with a separator 65 impregnated with an electrolytic solution in between, and then the resultant was caulked with a gasket 66. When the test electrode 61 was formed, 70 parts by weight of anode active material powder, 20 parts by weight of graphite as an electrical conductor and other anode active material, 1 part by weight of acetylene black as an electrical conductor, and 4 parts by weight of polyvinylidene fluoride as a binder were mixed. The mixture was dispersed in an appropriate solvent to obtain slurry. After that, a copper foil current collector was coated with the slurry, which was then dried. The resultant was punched out into a pellet being 15.2 mm in diameter. As the counter electrode 63,

TABLE 1

Co/(Sn + Co) = 37 wt %

| | Raw material ratio (wt %) | | | | Analytical value (wt %) | | | | Half-width (deg) | Initial charge capacity (mAh/g) | 2 Cy. discharge capacity (mAh/cm³) | 300 Cy. discharge capacity (mAh/cm³) | Capacity retention ratio (%) |
|---|---|---|---|---|---|---|---|---|---|---|---|---|---|
| | Co | Sn | C | P | Co | Sn | C | P | | | | | |
| Example 1-1 | 32.7 | 55.8 | 10 | 1.5 | 32.4 | 55.2 | 9.9 | 1.5 | 4.2 | 520 | 124 | 84 | 68 |
| Example 1-2 | 32 | 54.5 | 12 | 1.5 | 31.7 | 54 | 11.9 | 1.5 | 4.6 | 525 | 130 | 90 | 69 |
| Example 1-3 | 30.9 | 52.6 | 15 | 1.5 | 30.6 | 52.1 | 14.9 | 1.5 | 5.1 | 535 | 134 | 94 | 70 |
| Example 1-4 | 30.2 | 51.3 | 17 | 1.5 | 29.9 | 50.8 | 16.8 | 1.5 | 5.3 | 541 | 139 | 103 | 74 |
| Example 1-5 | 29 | 49.5 | 20 | 1.5 | 28.8 | 49 | 19.8 | 1.5 | 5.6 | 545 | 141 | 106 | 75 |
| Example 1-6 | 27.2 | 46.3 | 25 | 1.5 | 26.9 | 45.8 | 24.8 | 1.5 | 5.7 | 546 | 140 | 106 | 76 |
| Example 1-7 | 25.3 | 43.2 | 30 | 1.5 | 25.1 | 42.7 | 29.7 | 1.5 | 5.8 | 530 | 130 | 90 | 69 |
| Comparative example 1-1 | 37 | 63 | 0 | 0 | 36.6 | 62.4 | 0 | 0 | 0.2 | 450 | 87 | 0 | 0 |
| Comparative example 1-2 | 36.4 | 62.1 | 0 | 1.5 | 36.1 | 61.4 | 0 | 1.5 | 0.4 | 470 | 89 | 0 | 0 |
| Comparative example 1-3 | 36.1 | 61.4 | 1 | 1.5 | 35.7 | 60.8 | 1 | 1.5 | 0.6 | 473 | 93 | 0 | 0 |
| Comparative example 1-4 | 34.6 | 58.9 | 5 | 1.5 | 34.2 | 58.3 | 5 | 1.5 | 2.1 | 495 | 100 | 0 | 0 |
| Comparative example 1-5 | 33.5 | 57 | 8 | 1.5 | 33.2 | 56.4 | 7.9 | 1.5 | 3.1 | 510 | 113 | 17 | 15 |
| Comparative example 1-6 | 21.6 | 36.9 | 40 | 1.5 | 21.4 | 36.5 | 39.6 | 1.5 | 5.8 | 480 | 95 | 20 | 21 |
| Comparative example 1-7 | 17.9 | 30.6 | 50 | 1.5 | 17.8 | 30.2 | 49.5 | 1.5 | 5.8 | 430 | 78 | 9 | 12 |
| Comparative example 1-8 | 16.1 | 27.4 | 55 | 1.5 | 15.9 | 27.1 | 54.5 | 1.5 | 5.8 | 400 | 74 | 7 | 10 | a punched-out metal lithium plate being 15.5 mm in diameter was used. Ethylene carbonate (EC), propylene carbonate (PC), and dimethyl carbonate (DMC) were mixed to obtain a mixed solvent, $LiPF_6$ as an electrolyte salt was dissolved in the mixed solvent, and the resultant was used as the electrolytic solution. The mixed solvent composition was EC:PC:DMC=30:10:60 at a weight ratio, and the concentration of the electrolyte salt was 1 mol/dm$^3$.

For the coin type secondary battery, the initial charge capacity (mAh/g) was examined. As the initial charge capacity, constant current charge was performed at the constant current of 1 mA until the battery voltage reached 0.2 mV. After that, constant voltage charge was performed at the constant voltage of 0.2 mV until the current reached 10 μA. Then, the charge capacity per unit weight resulting from subtracting the weight of the copper foil current collector and the binder from the weight of the test electrode 61 was obtained. "Charge" herein means lithium insertion reaction with the anode active material. The results are shown in Table 1 and FIG. 8.

Further, the cylindrical type secondary battery shown in FIG. 1 and FIG. 2 was fabricated by using the foregoing anode active material powder. That is, a cathode active material composed of a nickel oxide, Ketjen black as an electrical conductor, polyvinylidene fluoride as a binder were mixed at a weight ratio of nickel oxide : Ketjen black : polyvinylidene fluoride=94:3:3. The mixture was dispersed in N-methyl-2-pyrrolidone as a mixed solvent to obtain cathode mixture slurry. Subsequently, the both faces of the cathode current collector 21A made of a strip-shaped aluminum foil were uniformly coated with the cathode mixture slurry, which was dried. Then, the resultant was compression-molded by a rolling press machine to form the cathode active material layer 21B. Thereby, the cathode 21 was formed. After that, the cathode lead 25 made of aluminum was attached to an end of the cathode current collector 21A.

Further, the both faces of the anode current collector 22A made of a strip-shaped copper foil were uniformly coated with anode mixture slurry containing the foregoing anode active material, which was dried. Then, the resultant was compression-molded by a rolling press machine to form the anode active material layer 22B. Thereby, the anode 22 was formed. After that, the anode lead 26 made of nickel was attached to an end of the anode current collector 22A.

Subsequently, the separator 23 was prepared. The anode 22, the separator 23, the cathode 21, and the separator 23 were layered in this order. The resultant lamination was spirally wound several times, and thereby the spirally wound electrode body 20 was formed. Subsequently, the spirally wound electrode body 20 was sandwiched between the pair of insulating plates 12 and 13. The anode lead 26 was welded to the battery can 11, and the cathode lead 25 was welded to the safety valve mechanism 15. After that, the spirally wound electrode body 20 was contained in the battery can 11 made of iron plated by nickel. Finally, the foregoing electrolytic solution was injected into the battery can 11 by pressure reduction method, and thereby the cylindrical type secondary battery was completed.

For the cylindrical type secondary battery, the cycle characteristics were examined. In this case, first, after constant current charge at the constant current of 0.5 A was performed until the battery voltage reached 4.2 V, constant voltage charge at the constant voltage of 4.2 V was performed until the current reached 10 mA. Subsequently, constant current discharge at constant current of 0.25 A was performed until the battery voltage reached 2.6 V, and thereby the first cycle of charge and discharge was performed. On and after the second cycle, after constant current charge at the constant current of 1.4 A was performed until the battery voltage reached 4.2 V, constant voltage charge at the constant voltage of 4.2 V was performed until the current reached 10 mA. Subsequently, constant current discharge at constant current of 1.0 A was performed until the battery voltage reached 2.6 V. After that, to examine the cycle characteristics, the ratio of the discharge capacity at the 300th cycle (300 Cy. discharge capacity: mAh/cm$^3$) to the discharge capacity at the second cycle (2 Cy. discharge capacity: mAh/cm$^3$), that is, the capacity retention ratio (%)=(discharge capacity at the 300th cycle/discharge capacity at the second cycle)×100 was obtained. The results are shown in Table 1 and FIG. 8.

As Comparative example 1-1 relative to Examples 1-1 to 1-7, an anode active material and a secondary battery were formed in the same manner as in Examples 1-1 to 1-7, except that the carbon powder and the phosphorus powder were not used as a raw material. As Comparative example 1-2, an anode active material and a secondary battery were formed in the same manner as in Examples 1-1 to 1-7, except that only the carbon powder was not used. Further, as Comparative examples 1-3 to 1-8, anode active materials and a secondary batteries were formed in the same manner as in Examples 1-1 to 1-7, except that the raw material ratio of carbon was changed as shown in Table 1.

Figure 9:
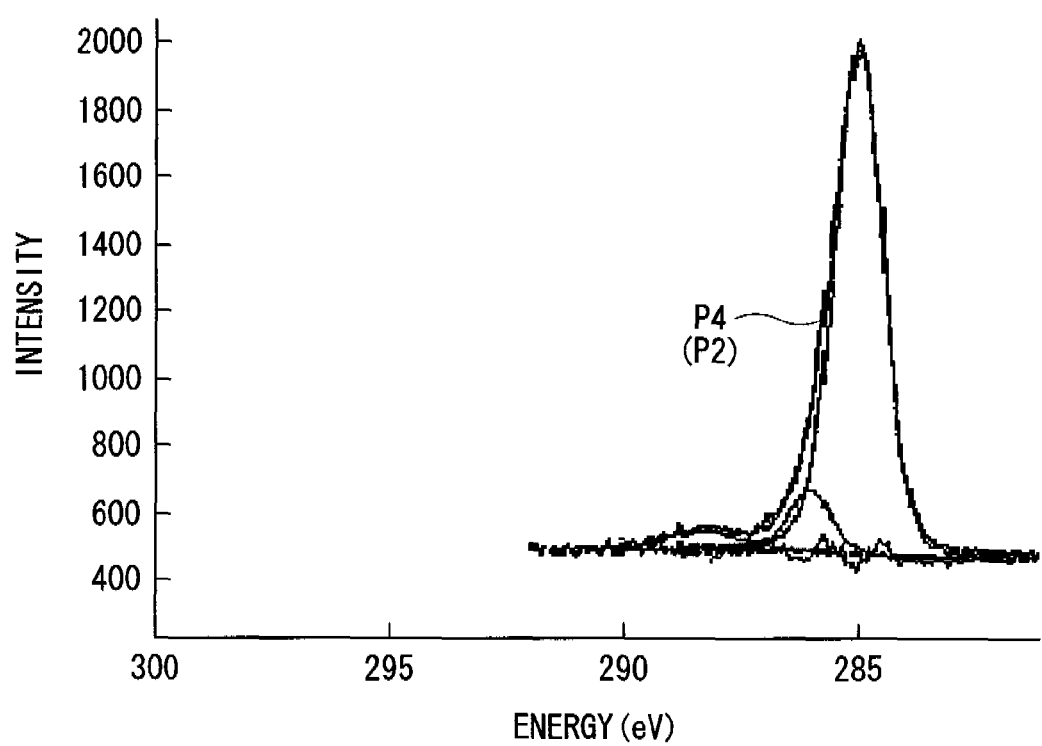
FIG. 9 is a diagram showing an example of a peak obtained by X-ray Photoelectron Spectroscopy for anode active materials formed in comparative examples.

For the anode active materials of Comparative examples 1-1 to 1-8, in the same manner as in Examples 1-1 to 1-7, the composition thereof was analyzed, and the half-width of the diffraction peak having a wide half-width shown in the range of 2θ=from 20 to 50 degrees was measured. The results are shown in Table 1. Further, when XPS was performed, in Comparative examples 1-4 to 1-8, peak P1 shown in FIG. 6 was obtained. When Peak P1 was analyzed, as in Examples 1-1 to 1-7, Peak P2 of the surface contamination carbon and peak P3 of C1s in the anode active material were obtained, and for all comparative examples, peak P3 was obtained in the region lower than 284.5 eV. That is, it was confirmed that at least part of carbon contained in the anode active material is bonded to other element. Meanwhile, in Comparative examples 1-1 and 1-2, as shown in FIG. 9, peak P4 was obtained. When Peak P4 was analyzed, only Peak P2 of the surface contamination carbon was obtained. Further, in Comparative example 1-3, since the carbon amount used as a raw material was small, only Peak P2 was obtained, and Peak P3 was hardly detected.

For the secondary batteries of Comparative examples 1-1 to 1-8, the initial charge capacity and the cycle characteristics were examined in the same manner as in Examples 1-1 to 1-7. The results are shown in Table 1 and FIG. 8.

Figure 8:
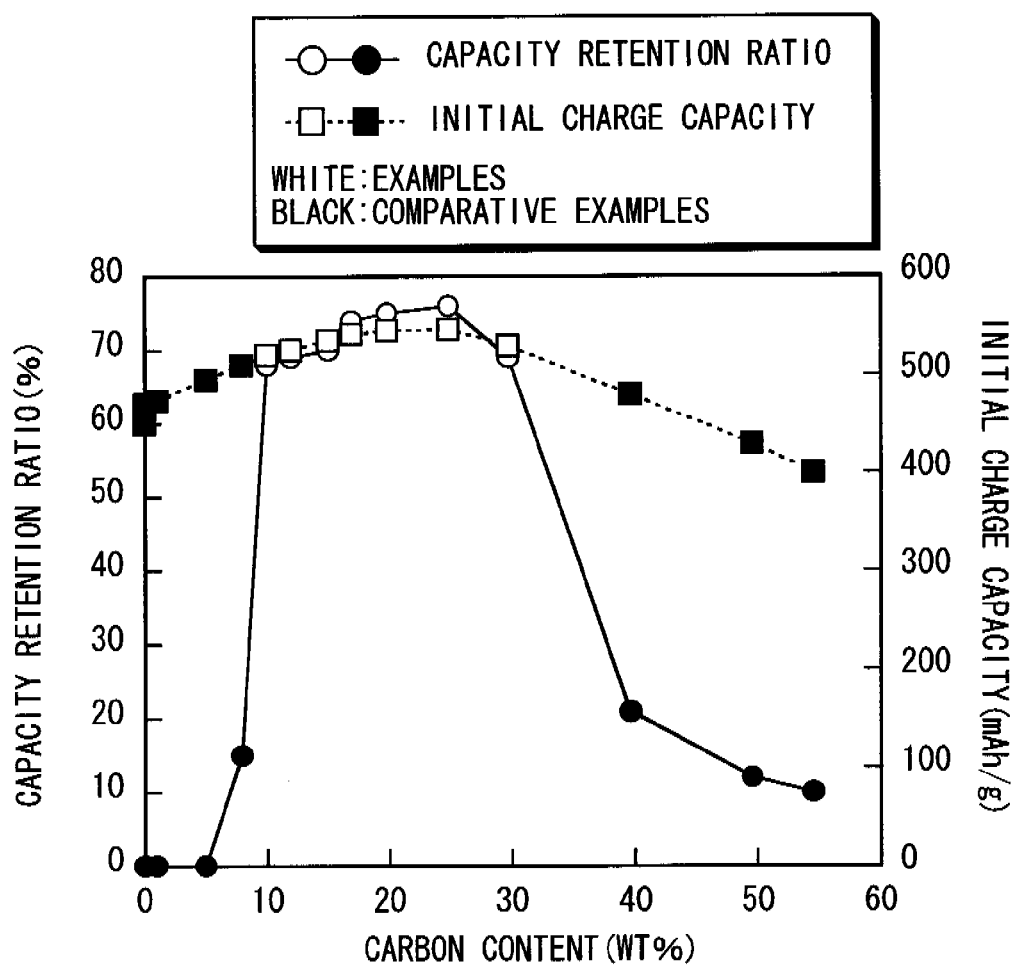
FIG. 8 is a characteristics diagram showing a relation between carbon contents in anode active materials of batteries according to the first embodiment (liquid electrolyte) and capacity retention ratios/initial charge capacities.

As evidenced by Table 1 and FIG. 8, in Examples 1-1 to 1-7 in which the carbon content in the anode active material was in the range from 9.9 wt % to 29.7 wt %, the capacity retention ratio thereof was more significantly improved than that of Comparative examples 1-1 to 1-8 in which the carbon content was out of the range. In this case, the initial charge capacity and the discharge capacity were improved as well.

Further, if the carbon content was in the range from 14.9 wt % to 29.7 wt %, and more particularly in the range from 16.8 wt % to 24.8 wt %, higher values were obtained.

That is, it was found that if the carbon content was from 9.9 wt % to 29.7 wt %, the capacity and the cycle characteristics could be improved. It was also found that the carbon content was preferably in the range from 14.9 wt % to 29.7 wt %, and was more preferably in the range from 16.8 wt % to 24.8 wt %.

Examples 2-1 to 2-11

Anode active materials and secondary batteries were formed in the same manner as in Examples 1-1 to 1-7, except that the raw material ratios of cobalt, tin, carbon, and phosphorus were changed as shown in Table 2. Specifically, the raw material ratio of carbon was set to the constant value of 10 wt %, the raw material ratio of phosphorus was set to the constant value of 1.5 wt %, and the Co/(Sn+Co) ratio was changed in the range from 24 wt % to 70 wt %.

Figure 10:
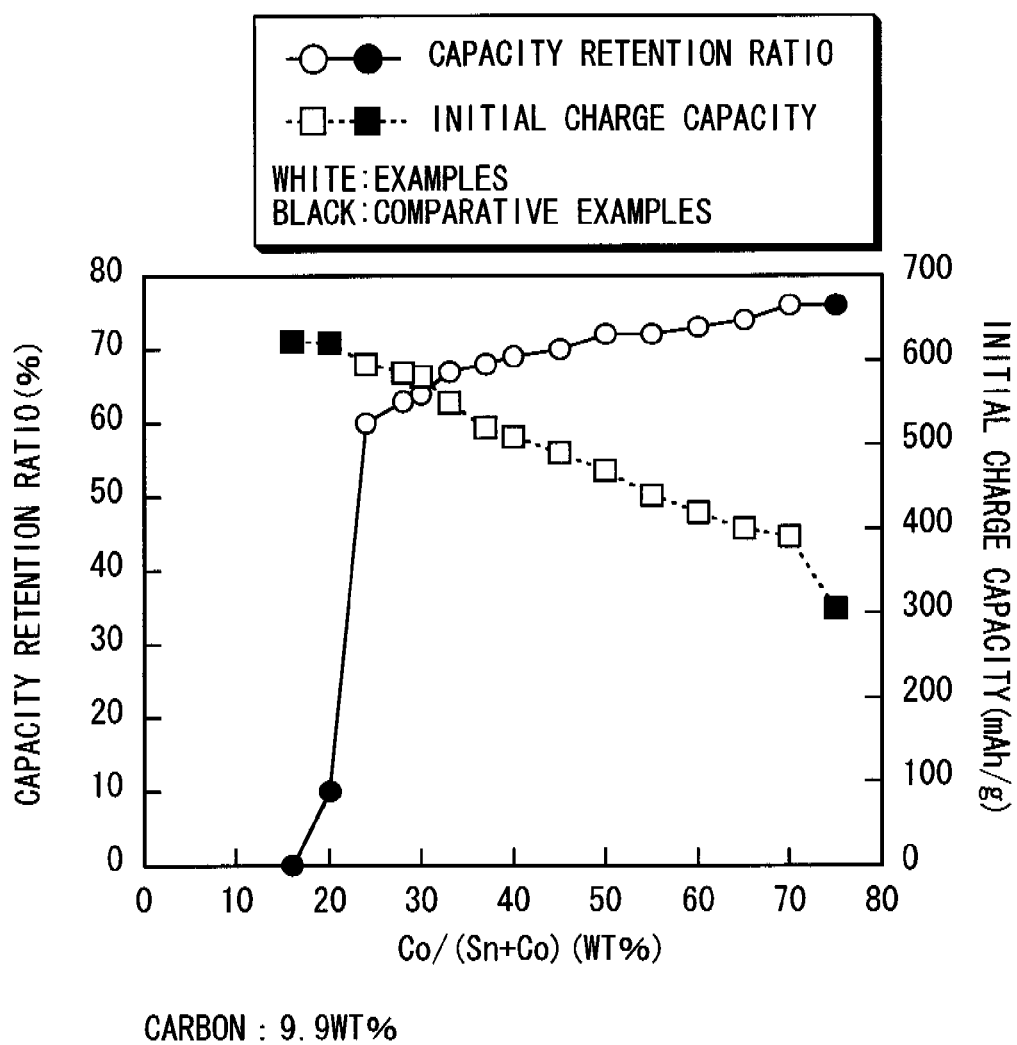
FIG. 10 is a characteristics diagram showing a relation between cobalt ratios to the total of tin and cobalt in anode active materials of the batteries according to the first embodiment (liquid electrolyte) and capacity retention ratios/initial charge capacities.

As evidenced by Table 2 and FIG. 10, in Examples 2-1 to 2-11 in which the Co/(Sn+Co) ratio was in the range from 24 wt % to 70 wt %, the initial charge capacity was more outstandingly improved than that of Comparative example 2-1 in which the Co/(Sn+Co) ratio was over 70 wt %, and the capacity retention ratio was more outstandingly improved than that

TABLE 2

| | Raw material ratio (wt %) | | | | Analytical value (wt %) | | | | Co/(SN + Co) (wt %) | Half-width (deg) | Initial charge capacity (mAh/g) | 2 Cy. discharge capacity (mAh/cm³) | 300 Cy. discharge capacity | Capacity retention ratio (%) |
|---|---|---|---|---|---|---|---|---|---|---|---|---|---|---|
| | Co | Sn | C | P | Co | Sn | C | P | | | | | | |
| Example 2-1 | 62 | 26.6 | 10 | 1.5 | 61.3 | 26.3 | 9.9 | 1.5 | 70 | 4.5 | 391 | 97 | 74 | 76 |
| Example 2-2 | 57.5 | 31 | 10 | 1.5 | 56.9 | 30.7 | 9.9 | 1.5 | 65 | 4.5 | 400 | 101 | 75 | 74 |
| Example 2-3 | 53.1 | 35.4 | 10 | 1.5 | 52.6 | 35 | 9.9 | 1.5 | 60 | 4.5 | 419 | 103 | 75 | 73 |
| Example 2-4 | 48.7 | 39.8 | 10 | 1.5 | 48.2 | 39.4 | 9.9 | 1.5 | 55 | 4.4 | 440 | 106 | 76 | 72 |
| Example 2-5 | 44.3 | 44.3 | 10 | 1.5 | 43.8 | 43.8 | 9.9 | 1.5 | 50 | 4.3 | 469 | 108 | 78 | 72 |
| Example 2-6 | 39.8 | 48.7 | 10 | 1.5 | 39.4 | 48.2 | 9.9 | 1.5 | 45 | 4.3 | 490 | 114 | 80 | 70 |
| Example 2-7 | 35.4 | 53.1 | 10 | 1.5 | 35 | 52.6 | 9.9 | 1.5 | 40 | 4.2 | 509 | 119 | 82 | 69 |
| Example 1-1 | 32.7 | 55.8 | 10 | 1.5 | 32.4 | 55.2 | 9.9 | 1.5 | 37 | 4.2 | 520 | 124 | 84 | 68 |
| Example 2-8 | 29.2 | 59.3 | 10 | 1.5 | 28.9 | 58.7 | 9.9 | 1.5 | 33 | 4.2 | 550 | 125 | 84 | 67 |
| Example 2-9 | 26.6 | 62 | 10 | 1.5 | 26.3 | 61.3 | 9.9 | 1.5 | 30 | 4.2 | 580 | 126 | 81 | 64 |
| Example 2-10 | 24.8 | 63.7 | 10 | 1.5 | 24.5 | 63.1 | 9.9 | 1.5 | 28 | 4.1 | 585 | 126 | 79 | 63 |
| Example 2-11 | 21.2 | 67.3 | 10 | 1.5 | 21 | 66.6 | 9.9 | 1.5 | 24 | 4 | 595 | 120 | 72 | 60 |
| Comparative example 2-1 | 66.4 | 22.1 | 10 | 1.5 | 65.7 | 21.9 | 9.9 | 1.5 | 75 | 4.5 | 305 | 72 | 55 | 76 |
| Comparative example 2-2 | 17.7 | 70.8 | 10 | 1.5 | 17.5 | 70.1 | 9.9 | 1.5 | 20 | 3 | 620 | 111 | 11 | 10 |
| Comparative example 2-3 | 14.2 | 74.3 | 10 | 1.5 | 14 | 73.6 | 9.9 | 1.5 | 16 | 2.5 | 622 | 100 | 0 | 0 |

As Comparative examples 2-3 relative to Examples 2-1 to 2-11, anode active materials and secondary batteries were formed in the same manner as in Example 2-1 to 1-11 except that the Co/(Sn+Co) ratio was changes as shown in Table 2. Specifically, the Co/(Sn+Co) ratio in Comparative examples 2-1 to 2-3 was respectively 75 wt %, 20 wt %, and 16 wt %.

For the anode active materials of Examples 2-1 to 2-11 and Comparative examples 2-1 to 2-3, the composition thereof was analyzed and the half-width was measured in the same manner as in Examples 1-1 to 1-7. The results are shown in Table 2. Further, when XPS was performed and the obtained peak was analyzed, as in Examples 1-1 to 1-7, Peak P2 of the surface contamination carbon, and peak P3 of C1s in the anode active material were obtained, and for all examples, peak P3 was obtained in the region lower than 284.5 eV. That is, it was confirmed that at least part of carbon contained in the anode active material was bonded to other element. Further, for the secondary batteries, the initial charge capacity and the cycle characteristics were examined in the same manner as in Examples 1-1 to 1-7. The results are shown in Table 2 and FIG. 10.

of Comparative examples 2-2 and 2-3 in which the Co/(Sn+Co) ratio was under 24 wt %. In particular, when the Co/(Sn+Co) ratio was 60 wt % or less, a high initial charge capacity was obtained.

That is, it was found that if the Co/(Sn+Co) ratio was from 24 wt % to 70 wt %, the capacity and the cycle characteristics could be improved. It was also found that the Co/(Sn+Co) ratio was more preferably 60 wt % or less.

Examples 3-1 to 3-11

Anode active materials and secondary batteries were formed in the same manner as in Examples 1-1 to 1-7, except that the raw material ratios of cobalt, tin, carbon, and phosphorus were changed as shown in Table 3. Specifically, the raw material ration of carbon was set to the constant value of 20 wt %, the raw material ration of phosphorus was set to the constant value of 1.5 wt %, and the Co/(Sn+Co) ration was changed in the range from 24 wt % to 70 wt %.

TABLE 3

| | Raw material ratio (wt %) | | | | Analytical value (wt %) | | | | Co/(SN + Co) (wt %) | Half-width (deg) | Initial charge capacity (mAh/g) | 2 Cy. discharge capacity (mAh/cm³) | 300 Cy. discharge capacity | Capacity retention ratio (%) |
|---|---|---|---|---|---|---|---|---|---|---|---|---|---|---|
| | Co | Sn | C | P | Co | Sn | C | P | | | | | | |
| Example 3-1 | 55 | 23.6 | 20 | 1.5 | 54.4 | 23.3 | 19.8 | 1.5 | 70 | 5.8 | 390 | 99 | 85 | 86 |
| Example 3-2 | 51 | 27.5 | 20 | 1.5 | 50.5 | 27.2 | 19.8 | 1.5 | 65 | 5.8 | 400 | 101 | 87 | 86 |
| Example 3-3 | 47.1 | 31.4 | 20 | 1.5 | 46.6 | 31.1 | 19.8 | 1.5 | 60 | 5.7 | 420 | 107 | 91 | 85 |
| Example 3-4 | 43.2 | 35.3 | 20 | 1.5 | 42.7 | 35 | 19.8 | 1.5 | 55 | 5.7 | 440 | 113 | 95 | 84 |
| Example 3-5 | 39.3 | 39.3 | 20 | 1.5 | 38.9 | 38.9 | 19.8 | 1.5 | 50 | 5.7 | 470 | 119 | 98 | 82 |
| Example 3-6 | 35.3 | 43.2 | 20 | 1.5 | 35 | 42.7 | 19.8 | 1.5 | 45 | 5.6 | 500 | 129 | 101 | 78 |
| Example 3-7 | 31.4 | 47.1 | 20 | 1.5 | 31.1 | 46.6 | 19.8 | 1.5 | 40 | 5.6 | 525 | 134 | 102 | 76 |
| Example 1-5 | 29 | 49.5 | 20 | 1.5 | 28.8 | 49 | 19.8 | 1.5 | 37 | 5.6 | 545 | 141 | 106 | 75 |
| Example 3-8 | 25.9 | 52.6 | 20 | 1.5 | 25.6 | 52.1 | 19.8 | 1.5 | 33 | 5.6 | 565 | 142 | 102 | 72 |

TABLE 3-continued

|  | Raw material ratio (wt %) | | | | Analytical value (wt %) | | | | Co/(SN + Co) (wt %) | Half-width (deg) | Initial charge capacity (mAh/g) | 2 Cy. discharge capacity (mAh/cm³) | 300 Cy. discharge capacity (mAh/cm³) | Capacity retention ratio (%) |
|---|---|---|---|---|---|---|---|---|---|---|---|---|---|---|
|  | Co | Sn | C | P | Co | Sn | C | P |  |  |  |  |  |  |
| Example 3-9 | 23.6 | 55 | 20 | 1.5 | 23.3 | 54.4 | 19.8 | 1.5 | 30 | 5.5 | 580 | 143 | 102 | 71 |
| Example 3-10 | 22 | 56.5 | 20 | 1.5 | 21.8 | 56 | 19.8 | 1.5 | 28 | 5.4 | 585 | 144 | 101 | 70 |
| Example 3-11 | 18.8 | 59.7 | 20 | 1.5 | 18.7 | 59.1 | 19.8 | 1.5 | 24 | 5.3 | 595 | 145 | 94 | 65 |
| Comparative example 3-1 | 58.9 | 19.6 | 20 | 1.5 | 58.3 | 19.4 | 19.8 | 1.5 | 75 | 5.8 | 279 | 67 | 58 | 87 |
| Comparative example 3-2 | 15.7 | 62.8 | 20 | 1.5 | 15.5 | 62.2 | 19.8 | 1.5 | 20 | 5 | 620 | 128 | 38 | 30 |
| Comparative example 3-3 | 12.6 | 65.9 | 20 | 1.5 | 12.4 | 65.3 | 19.8 | 1.5 | 16 | 4.6 | 625 | 100 | 20 | 20 |

As Comparative examples 3-1 to 3-3 relative to Examples 3-1 to 3-11, anode active materials and secondary batteries were formed in the same manner as in Examples 3-1 to 3-11, except that the Co/(Sn+Co) ratio was changed as shown in Table 3. Specifically, the Co/(Sn+Co) ratio in Comparative examples 3-1 to 3-3 was respectively 75 wt %, 20 wt %, and 16 wt %.

For the anode active materials of Examples 3-1 to 3-11 and Comparative examples 3-1 to 3-3, the composition thereof was analyzed and the half-width was measured in the same manner as in Examples 1-1 to 1-7. The results are shown in Table 3. Further, when XPS was performed and the obtained peak was analyzed, as in Examples 1-1 to 1-7, Peak P2 of the surface contamination carbon and peak P3 of C1s in the anode active material were obtained, and for all examples, peak P3 was obtained in the region lower than 284.5 eV. That is, it was confirmed that at least part of carbon contained in the anode active material was bonded to other element. Further, for the secondary batteries, the initial charge capacity and the cycle characteristics were examined in the same manner as in Examples 1-1 to 1-7. The results are shown in Table 3 and FIG. 11.

Figure 11:
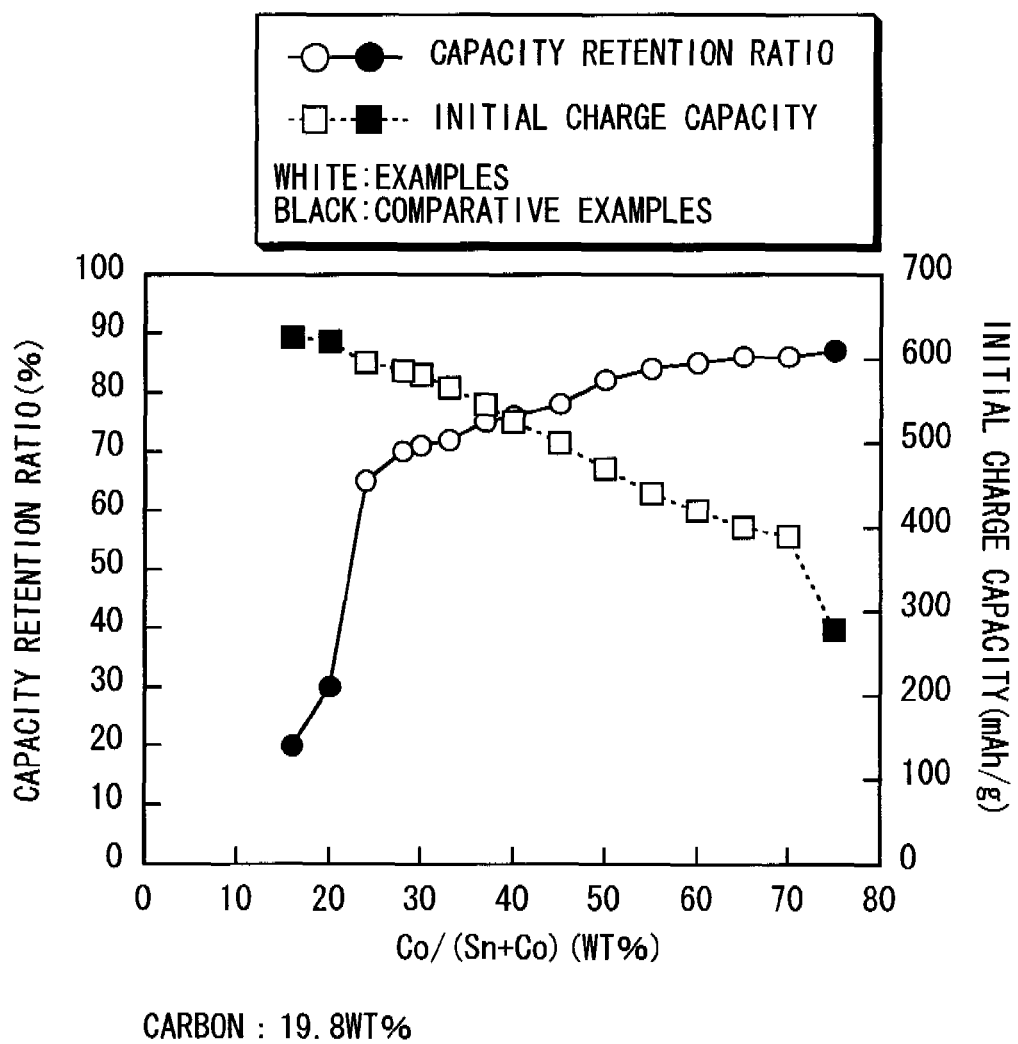
FIG. 11 is another characteristics diagram showing a relation between cobalt ratios to the total of tin and cobalt in anode active materials of the batteries according to the first embodiment (liquid electrolyte) and capacity retention ratios/initial charge capacities.

As evidenced by Table 3 and FIG. 11, results similar to those of Examples 2-1 to 2-11 were obtained. That is, it was found that when the Co/(Sn+Co) ratio was in the range from 24 wt % to 70 wt %, the capacity and the cycle characteristics could be improved even if the carbon content was 19.8 wt %.

Examples 4-1 to 4-11

Secondary batteries were fabricated in the same manner as in Examples 1-1 to 1-7, except that the raw material ratios of cobalt, tin, carbon, and phosphorus were changed as shown in Table 4. Specifically, the raw material ratio of carbon was set to the constant value of 30 wt %, and the raw material ratio of phosphorus was set to the constant value of 1.5 wt %. The Co/(Sn+Co) ration was change from 24 wt % to 70 wt %.

TABLE 4

|  | Raw material ratio (wt %) | | | | Analytical value (wt %) | | | | Co/(SN + Co) (wt %) | Half-width (deg) | Initial charge capacity (mAh/g) | 2 Cy. discharge capacity (mAh/cm³) | 300 Cy. discharge capacity (mAh/cm³) | Capacity retention ratio (%) |
|---|---|---|---|---|---|---|---|---|---|---|---|---|---|---|
|  | Co | Sn | C | P | Co | Sn | C | P |  |  |  |  |  |  |
| Example 4-1 | 48 | 20.6 | 30 | 1.5 | 47.5 | 20.3 | 29.7 | 1.5 | 70 | 6.4 | 344 | 83 | 72 | 87 |
| Example 4-2 | 44.5 | 24 | 30 | 1.5 | 44.1 | 23.7 | 29.7 | 1.5 | 65 | 6.3 | 422 | 106 | 88 | 83 |
| Example 4-3 | 41.1 | 27.4 | 30 | 1.5 | 40.7 | 27.1 | 29.7 | 1.5 | 60 | 6.2 | 441 | 112 | 88 | 79 |
| Example 4-4 | 37.7 | 30.8 | 30 | 1.5 | 37.3 | 30.5 | 29.7 | 1.5 | 55 | 6.1 | 450 | 118 | 90 | 76 |
| Example 4-5 | 34.3 | 34.3 | 30 | 1.5 | 33.9 | 33.9 | 29.7 | 1.5 | 50 | 6 | 479 | 123 | 90 | 73 |
| Example 4-6 | 30.8 | 37.7 | 30 | 1.5 | 30.5 | 37.3 | 29.7 | 1.5 | 45 | 5.9 | 492 | 125 | 90 | 72 |
| Example 4-7 | 27.4 | 41.1 | 30 | 1.5 | 27.1 | 40.7 | 29.7 | 1.5 | 40 | 5.9 | 519 | 128 | 90 | 70 |
| Example 1-7 | 25.3 | 43.2 | 30 | 1.5 | 25.1 | 42.7 | 29.7 | 1.5 | 37 | 5.8 | 530 | 130 | 90 | 69 |
| Example 4-8 | 22.6 | 45.9 | 30 | 1.5 | 22.4 | 45.4 | 29.7 | 1.5 | 33 | 5.8 | 539 | 133 | 89 | 67 |
| Example 4-9 | 20.6 | 48 | 30 | 1.5 | 20.3 | 47.5 | 29.7 | 1.5 | 30 | 5.7 | 545 | 135 | 89 | 66 |
| Example 4-10 | 19.2 | 49.3 | 30 | 1.5 | 19 | 48.8 | 29.7 | 1.5 | 28 | 5.7 | 554 | 136 | 87 | 64 |
| Example 4-11 | 16.4 | 52.1 | 30 | 1.5 | 16.3 | 51.5 | 29.7 | 1.5 | 24 | 5.6 | 565 | 136 | 82 | 60 |
| Comparative example 4-1 | 51.4 | 17.1 | 30 | 1.5 | 50.9 | 17 | 29.7 | 1.5 | 75 | 6.5 | 290 | 69 | 62 | 90 |
| Comparative example 4-2 | 13.7 | 54.8 | 30 | 1.5 | 13.6 | 54.3 | 29.7 | 1.5 | 20 | 4.9 | 572 | 115 | 24 | 21 |
| Comparative example 4-3 | 11 | 57.5 | 30 | 1.5 | 10.9 | 57 | 29.7 | 1.5 | 16 | 4.6 | 580 | 92 | 0 | 0 |

As Comparative examples 4-1 to 4-3 relative to Examples 4-1 to 4-11, anode active materials and secondary batteries were formed in the same manner as in Examples 4-1 to 4-11, except that the Co/(Sn+Co) ratio was changed as shown in Table 4. Specifically, the Co/(Sn+Co) ratio in Comparative examples 4-1 to 4-3 was respectively 75 wt %, 20 wt %, and 16 wt %.

For the anode active materials of Examples 4-1 to 4-11 and Comparative examples 4-1 to 4-3, the composition thereof was analyzed and the half-width was measured in the same manner as in Examples 1-1 to 1-7. The results are shown in Table 4. Further, when XPS was performed and the obtained peak was analyzed, as in Examples 1-1 to 1-7, Peak P2 of the surface contamination carbon and peak P3 of C1s in the anode active material were obtained, and for all examples, peak P3 was obtained in the region lower than 284.5 eV. That is, it was confirmed that at least part of carbon contained in the anode active material was bonded to other element. Further, for the secondary batteries, the initial charge capacity and the cycle characteristics were examined in the same manner as in Examples 1-1 to 1-7. The results are shown in Table 4 and FIG. 12.

Figure 12:
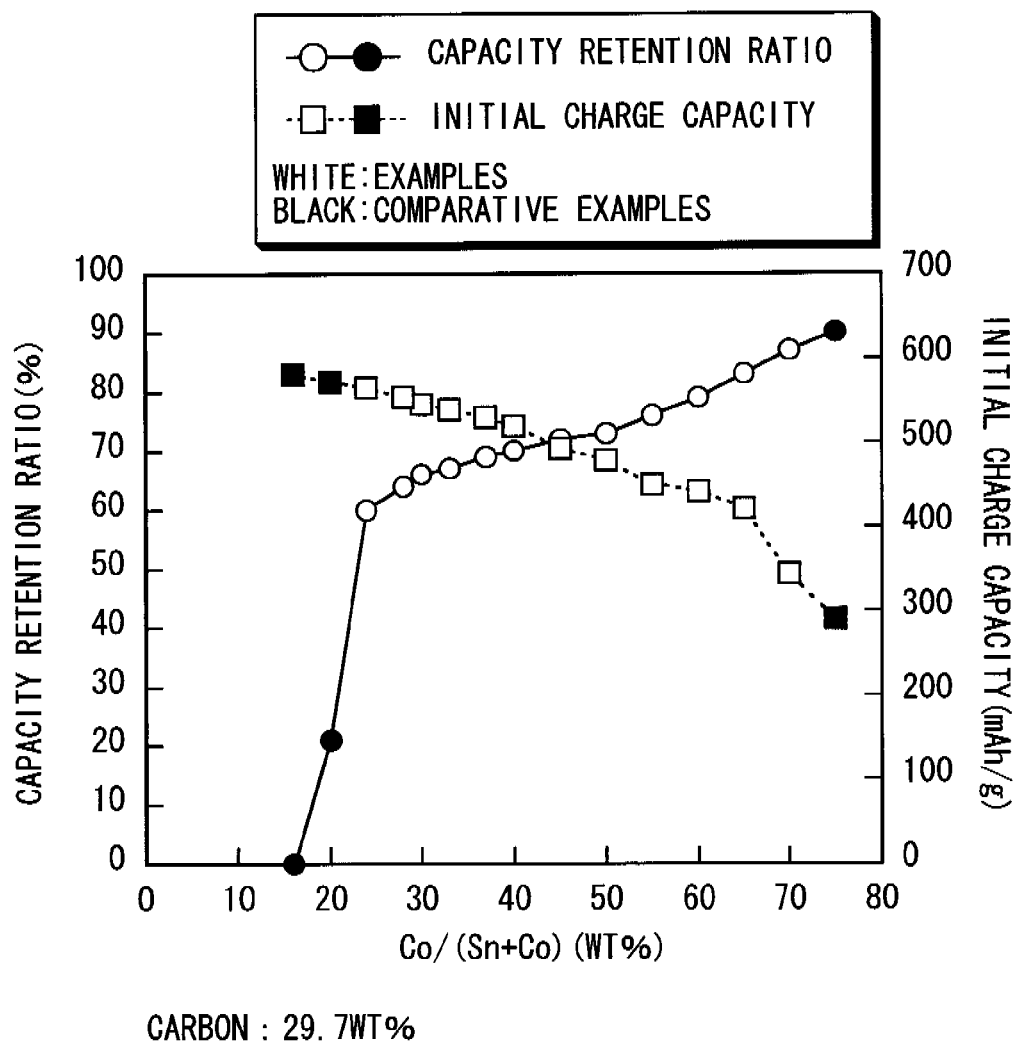
FIG. 12 is still another characteristics diagram showing a relation between cobalt ratios to the total of tin and cobalt in anode active materials of the batteries according to the first embodiment (liquid electrolyte) and capacity retention ratios/initial charge capacities.

As evidenced by Table 4 and FIG. 12, results similar to those of Examples 2-1 to 2-11 were obtained. That is, it was found that if the Co/(Sn+Co) ratio was in the range from 24 wt % to 70 wt %, the capacity and the cycle characteristics could be improved even if the carbon content was 29.7 wt %.

Examples 5-1 to 5-5

Anode active materials and secondary batteries were formed in the same manner as in Examples 1-1 to 1-7, except that the raw material ratios of cobalt, tin, carbon, and phosphorus were changed as shown in Table 5. Specifically, the raw material ratio of carbon was set to the constant value of 20 wt %, the Co/(Sn+Co) ratio was set to the constant value of 37 wt %, and the raw material ratio of phosphorus was changed in the range from 0.1 wt % to 2.2 wt %.

characteristics were examined in the same manner as in Examples 1-1 to 1-7. The results are shown in Table 5 and FIG. 13.

In particular, for the secondary batteries of Examples 5-1 to 5-5 and Comparative examples 5-1 to 5-3. the ratio of the discharge capacity at the first cycle to the charge capacity at the first cycle, that is, the initial charge and discharge efficiency (%)=(discharge capacity at the first cycle/charge capacity at the first cycle)×100 was examined. The charge and discharge conditions in the case were similar to those in examining the cycle characteristics. The results are shown in Table 5 and FIG. 14.

Figure 13:
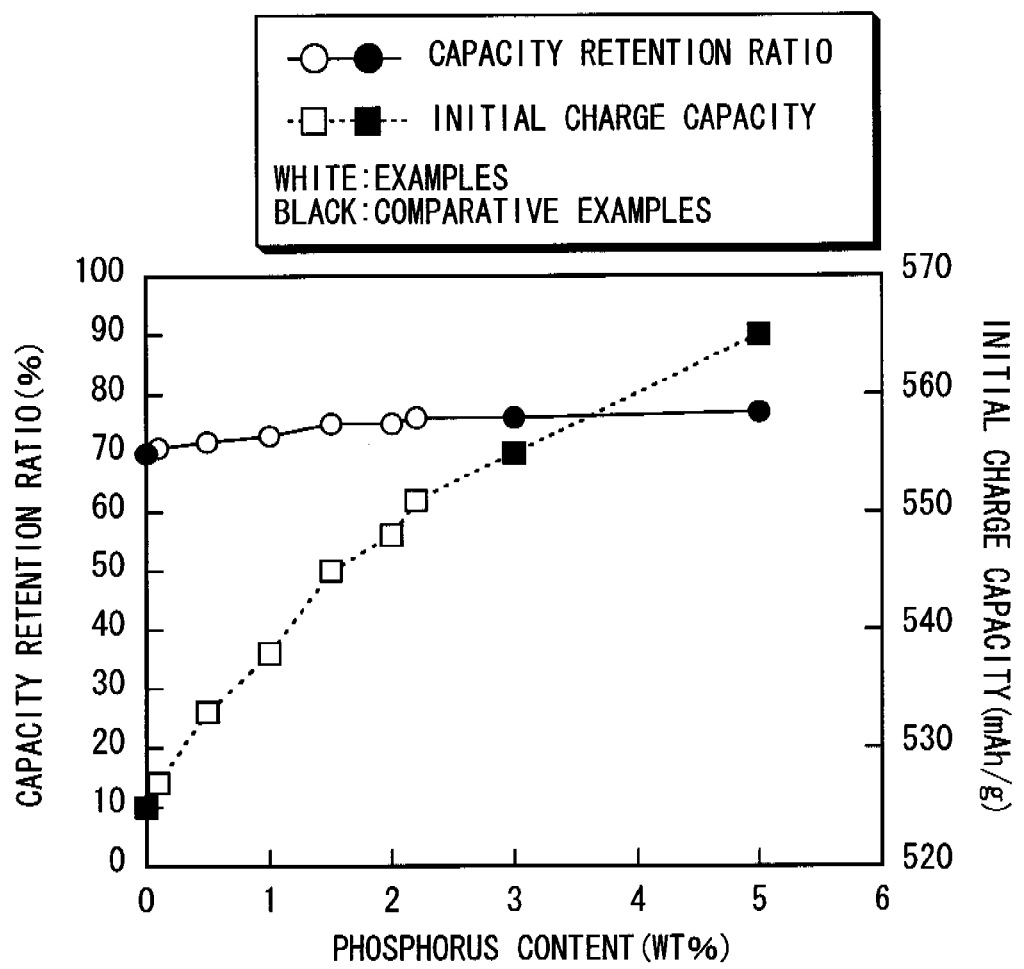
FIG. 13 is a characteristics diagram showing a relation between phosphorus contents in anode active materials of the batteries according to the first embodiment (liquid electrolyte) and capacity retention ratios/initial charge capacities.

As evidenced by Table 5 and FIG. 13, in Examples 5-1 to 5-5 in which the phosphorus content was in the range from 0.1 wt % to 2.2 wt %, the capacity retention ratio almost equal to that of Comparative examples 5-1 to 5-3 in which the phosphorus content was out of the range was obtained. In this case, the initial charge capacity and the discharge capacity were almost equal to those of Comparative examples 5-1 to 5-3 as well.

Figure 14:
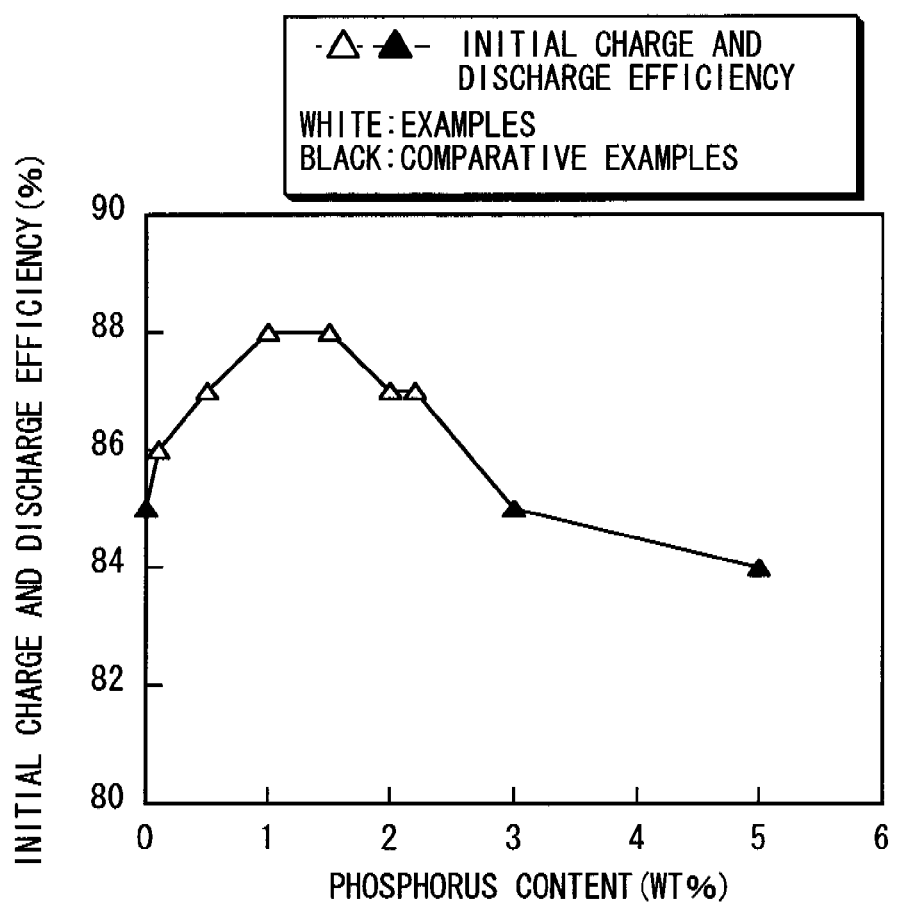
FIG. 14 is a characteristics diagram showing a relation between the phosphorus contents in the anode active materials of the batteries according to the first embodiment (liquid electrolyte) and initial charge and discharge efficiencies.

Further, as evidenced by Table 5 and FIG. 14, in Examples 5-1 to 5-5 in which the phosphorus content was in the range from 0.1 wt % to 2.2 wt %, the initial charge and discharge efficiency was more improved than that of Comparative examples 5-1 to 5-3 in which the phosphorus content was out of the range.

TABLE 5

| | Co/(Sn + Co) = 37 wt % | | | | | | | | | | | | |
|---|---|---|---|---|---|---|---|---|---|---|---|---|---|
| | Raw material ratio (wt %) | | | | Analytical value (wt %) | | | | Half-width | Initial charge capacity | Initial charge and discharge efficiency | 2 Cy. discharge capacity | 300 Cy. discharge capacity | Capacity retention ratio |
| | Co | Sn | C | P | Co | Sn | C | P | (deg) | (mAh/g) | (%) | (mAh/cm³) | | (%) |
| Example 5-1 | 29.6 | 50.3 | 20 | 0.1 | 29.3 | 49.8 | 19.8 | 0.1 | 4.9 | 527 | 86 | 140 | 99 | 71 |
| Example 5-2 | 29.4 | 50.1 | 20 | 0.5 | 29.1 | 49.6 | 19.8 | 0.5 | 5.2 | 533 | 87 | 140 | 101 | 72 |
| Example 5-3 | 29.2 | 49.8 | 20 | 1 | 28.9 | 49.3 | 19.8 | 1 | 5.4 | 538 | 88 | 141 | 103 | 73 |
| Example 1-5 | 29 | 49.5 | 20 | 1.5 | 28.8 | 49 | 19.8 | 1.5 | 5.6 | 545 | 88 | 141 | 106 | 75 |
| Example 5-4 | 28.9 | 49.1 | 20 | 2 | 28.6 | 48.6 | 19.8 | 2 | 5.7 | 548 | 87 | 142 | 107 | 75 |
| Example 5-5 | 28.8 | 49 | 20 | 2.2 | 28.5 | 48.5 | 19.8 | 2.2 | 5.8 | 551 | 87 | 142 | 108 | 76 |
| Comparative example 5-1 | 29.6 | 50.4 | 20 | 0 | 29.3 | 49.9 | 19.8 | 0 | 4.8 | 525 | 85 | 140 | 98 | 70 |
| Comparative example 5-2 | 28.5 | 48.5 | 20 | 3 | 28.2 | 48 | 19.8 | 3 | 5.9 | 555 | 85 | 143 | 109 | 76 |
| Comparative example 5-3 | 27.8 | 47.3 | 20 | 5 | 27.5 | 46.8 | 19.8 | 5 | 6.3 | 565 | 84 | 144 | 111 | 77 |

As Comparative example 5-1 relative to Examples 5-1 to 5-5. anode active materials and secondary batteries were formed in the same manner as in Examples 1-1 to 1-7, except that phosphorus was not contained. As Comparative examples 5-2 and 5-3, anode active materials and secondary batteries were formed in the same manner as in Examples 1-1 to 1-7, except that the raw material ration of phosphorus was changed as shown in Table 5. Specifically, the raw material ration of phosphorus in Comparative examples 5-2 and 5-3 was respectively 3 wt % and 5 wt %.

For the anode active materials of Examples 5-1 to 5-5 and Comparative examples 5-1 to 5-3, the composition thereof was analyzed and the half-width was measured in the same manner as in Examples 1-1 to 1-7. The results are shown in Table 5. Further, when XPS was performed and the obtained peak was analyzed, as in Examples 1-1 to 1-7, Peak P2 of the surface contamination carbon and peak P3 of C1s in the anode active material were obtained, and for all examples, peak P3 was obtained in the region lower than 284.5 eV. That is, it was confirmed that at least part of carbon contained in the anode active material was bonded to other element. Further, for the secondary batteries, the initial charge capacity and the cycle Further, when the phosphorus content was in the range from 0.5 wt % to 2 wt %, higher effects could be obtained.

That is, it was found that if the phosphorus content was in the range from 0.1 wt % to 2.2 wt %, the initial charge and discharge efficiency could be improved as well as the capacity and the cycle characteristics could, and the phosphorus content was more preferably in the range from 0.5 wt % to 2 wt %.

Examples 6-1 to 6-6 and 7-1 to 7-6

Anode active materials and secondary batteries were formed in the same manner as in Examples 1-1 to 1-7, except that the operation time and the rotational frequency in synthesizing the anode active material were changed and the half-width of the diffraction peak having a wide half-width shown in the range of 2θ=from 20 to 50 degrees was changed. In Examples 6-1 to 6-6 and 7-1 to 7-6, the raw material ratio of phosphorus was set to the constant value of 1.5 wt %, the Co/(Sn+Co) ratio was set to the constant value of 37 wt %, and the raw material ratios of cobalt, tin, and carbon were changed as shown in Table 6.

TABLE 6

Co/(Sn + Co) = 37 wt %

| | Raw material ratio (wt %) | | | | Analytical value (wt %) | | | | Half-width (deg) | Capacity retention ratio (%) |
|---|---|---|---|---|---|---|---|---|---|---|
| | Co | Sn | C | P | Co | Sn | C | P | | |
| Example 6-1 | 32.7 | 55.8 | 10 | 1.5 | 32.4 | 55.2 | 9.9 | 1.5 | 1.0 | 40 |
| Example 6-2 | 32.7 | 55.8 | 10 | 1.5 | 32.4 | 55.2 | 9.9 | 1.5 | 1.4 | 46 |
| Example 6-3 | 32.7 | 55.8 | 10 | 1.5 | 32.4 | 55.2 | 9.9 | 1.5 | 1.7 | 53 |
| Example 6-4 | 32.7 | 55.8 | 10 | 1.5 | 32.4 | 55.2 | 9.9 | 1.5 | 2.2 | 55 |
| Example 6-5 | 32.7 | 55.8 | 10 | 1.5 | 32.4 | 55.2 | 9.9 | 1.5 | 3.2 | 60 |
| Example 6-6 | 32.7 | 55.8 | 10 | 1.5 | 32.4 | 55.2 | 9.9 | 1.5 | 4.2 | 68 |
| Example 7-1 | 25.3 | 43.2 | 30 | 1.5 | 25.1 | 42.7 | 29.7 | 1.5 | 1.0 | 45 |
| Example 7-2 | 25.3 | 43.2 | 30 | 1.5 | 25.1 | 42.7 | 29.7 | 1.5 | 1.4 | 50 |
| Example 7-3 | 25.3 | 43.2 | 30 | 1.5 | 25.1 | 42.7 | 29.7 | 1.5 | 2.3 | 58 |
| Example 7-4 | 25.3 | 43.2 | 30 | 1.5 | 25.1 | 42.7 | 29.7 | 1.5 | 3.4 | 62 |
| Example 7-5 | 25.3 | 43.2 | 30 | 1.5 | 25.1 | 42.7 | 29.7 | 1.5 | 4.5 | 64 |
| Example 7-6 | 25.3 | 43.2 | 30 | 1.5 | 25.1 | 42.7 | 29.7 | 1.5 | 5.8 | 69 |

For the anode active materials Examples 6-1 to 6-6 and 7-1 to 7-6, the composition thereof was analyzed and the half-width was measured in the same manner as in Examples 1-1 to 1-7. The results are shown in Table 6. Further, when XPS was performed and the obtained peak was analyzed, as in Examples 1-1 to 1-7, Peak P2 of the surface contamination carbon and peak P3 of C1s in the anode active material were obtained, and for all examples, peak P3 was obtained in the region lower than 284.5 eV. That is, it was confirmed that at least part of carbon contained in the anode active material was boned to other element. Further, for the secondary batteries, the initial charge capacity and the cycle characteristics were examined in the same manner as in Examples 1-1 to 1-7. The results are shown in Table 6.

As evidenced by Table 6. in all Examples 6-1 to 6-6 and 7-1 to 7-6, as the half-width was increased, the capacity retention ratio was improved. That is, it was found that when the reactive phase with a larger half-width of the diffraction peak was included, the cycle characteristics could be improved.

Examples 8-1 to 8-11

Anode active materials and secondary batteries were formed in the same manner as in Examples 1-1 to 1-7, except that silicon powder was further used as a raw material, and the raw material ratios of cobalt, tin, carbon, phosphorus, and silicon were changed as shown in Table 7. Specifically, the raw material ratio of carbon was set to the constant value of 20 wt %, the raw material ratio of phosphorus was set to the constant value of 1.5 wt %, the Co/(Sn+Co) ratio was set to the constant value of 37 wt %, and the raw material ratio of silicon was changed in the range from 0.3 wt % to 10 wt %. For the secondary batteries of Examples 8-1 to 8-11, the composition thereof was analyzed in the same manner as in Examples 1-1 to 1-7. Then, the silicon content was measured by ICP emission spectrometry. The results are shown in Table 7. Further, when XPS was performed and the obtained peak was analyzed, as in Examples 1-1 to 1-7, Peak P2 of the surface contamination carbon and peak P3 of C1s in the anode active material were obtained, and for all examples, peak P3 was obtained in the region lower than 284.5 eV. That is, it was confirmed that at least part of carbon contained in the anode active material was bonded to other element. Further, for the secondary batteries, the initial charge capacity and the cycle characteristics were examined in the same manner as in Examples 1-1 to 1-7. The results are shown in Table 8.

TABLE 7

Co/(Sn + Co) = 37 wt %

| | Raw material ratio (wt %) | | | | | | Analytical value (wt %) | | | | | |
|---|---|---|---|---|---|---|---|---|---|---|---|---|
| | Co | Sn | C | P | Si | (Sn + Si) | Co | Sn | C | P | Si | (Sn + Si) |
| Example 1-5 | 29 | 49.5 | 20 | 1.5 | 0 | 49.5 | 28.8 | 49 | 19.8 | 1.5 | 0 | 49 |
| Example 8-1 | 28.9 | 49.3 | 20 | 1.5 | 0.3 | 49.6 | 28.6 | 48.8 | 19.8 | 1.5 | 0.3 | 49.1 |
| Example 8-2 | 28.9 | 49.1 | 20 | 1.5 | 0.5 | 49.6 | 28.6 | 48.6 | 19.8 | 1.5 | 0.5 | 49.1 |
| Example 8-3 | 28.7 | 48.8 | 20 | 1.5 | 1 | 49.8 | 28.4 | 48.3 | 19.8 | 1.5 | 1 | 49.3 |
| Example 8-4 | 28.3 | 48.2 | 20 | 1.5 | 2 | 50.2 | 28 | 47.7 | 19.8 | 1.5 | 2 | 49.7 |
| Example 8-5 | 27.6 | 46.9 | 20 | 1.5 | 4 | 50.9 | 27.3 | 46.5 | 19.8 | 1.5 | 4 | 50.4 |
| Example 8-6 | 26.8 | 45.7 | 20 | 1.5 | 6 | 51.7 | 26.6 | 45.2 | 19.8 | 1.5 | 5.9 | 51.2 |
| Example 8-7 | 26.5 | 45 | 20 | 1.5 | 7 | 52 | 26.2 | 44.6 | 19.8 | 1.5 | 6.9 | 51.5 |
| Example 8-8 | 26.1 | 44.4 | 20 | 1.5 | 8 | 52.4 | 25.8 | 44 | 19.8 | 1.5 | 7.9 | 51.9 |
| Example 8-9 | 25.9 | 44.1 | 20 | 1.5 | 8.5 | 52.6 | 25.6 | 43.7 | 19.8 | 1.5 | 8.4 | 52.1 |
| Example 8-10 | 25.7 | 43.8 | 20 | 1.5 | 9 | 52.8 | 25.5 | 43.3 | 19.8 | 1.5 | 8.9 | 52.3 |
| Example 8-11 | 25.3 | 43.2 | 20 | 1.5 | 10 | 53.2 | 25.1 | 42.7 | 19.8 | 1.5 | 9.9 | 52.6 |

TABLE 8

Co/(Sn + Co) = 37 wt %

|  | Initial charge capacity (mAh/g) | 2 Cy. discharge capacity (mAh/cm$^3$) | 300 Cy. discharge capacity (mAh/cm$^3$) | Capacity retention ratio (%) |
|---|---|---|---|---|
| Example 1-5 | 545 | 141 | 106 | 75 |
| Example 8-1 | 546 | 141 | 106 | 75 |
| Example 8-2 | 550 | 143 | 104 | 73 |
| Example 8-3 | 571 | 146 | 105 | 72 |
| Example 8-4 | 582 | 147 | 103 | 70 |
| Example 8-5 | 596 | 149 | 103 | 69 |
| Example 8-6 | 621 | 153 | 104 | 68 |
| Example 8-7 | 631 | 158 | 106 | 67 |
| Example 8-8 | 642 | 161 | 98 | 61 |
| Example 8-9 | 655 | 161 | 74 | 46 |
| Example 8-10 | 680 | 162 | 50 | 31 |
| Example 8-11 | 711 | 164 | 28 | 17 |

As evidenced by Table 7 and Table 8. in Examples 8-1 to 8-11 in which silicon was contained, the initial charge capacity was more improved than in Example 1-5 in which silicon was not contained. However, there was a tendency that as the silicon content was increased, the capacity retention ratio was lowered.

That is, it was found that if the anode active material contained silicon, the capacity could be improved. It was found that in this case, if the silicon content was in the range from 0.5 wt % to 7.9 wt %, a sufficient initial charge capacity and a sufficient capacity retention ratio could be obtained.

Examples 9-1 to 9-12

In Example 9-1, an anode active material and a secondary battery were formed in the same manner as in Examples 1-1 to 1-7, except that the raw material ratios of cobalt, tin, carbon, and phosphorus were changed as shown in Table 9. In Examples 9-2 to 9-12, anode active materials and secondary batteries were formed in the same manner as in Examples 1-1 to 1-7, except that as raw materials, cobalt powder, tin powder, carbon powder, phosphorus powder, and titanium powder were prepared, and the raw material ratios thereof were changed as shown in Table 9. Specifically, the raw material ratio of carbon was set to the constant value of 20 wt %, the raw material ratio of phosphorus was set to the constant value of 1.5 wt %, the Co/(Sn+Co) ratio was set to the constant value of 37 wt %, and the raw material ratio of titanium was changed in the range from 0 wt % to 16 wt %. When the anode active material was formed, the cobalt powder, the tin powder, the phosphorus powder, and the titanium powder were alloyed to obtain cobalt-tin-phosphorus-titanium alloy powder, and then the carbon powder was mixed therewith. For the anode active materials of Examples 9-1 to 9-12. the composition thereof was analyzed in the same manner as in Examples 1-1 to 1-7. The titanium content was measured by ICP emission spectrometry. The results are shown in Table 9. Further, when XPS was performed and the obtained peak was analyzed, as in Examples 1-1 to 1-7, Peak P2 of the surface contamination carbon and peak P3 of C1s in the anode active material were obtained, and for all examples, peak P3 was obtained in the region lower than 284.5 eV. That is, it was confirmed that at least part of carbon contained in the anode active material was bonded to other element. Further, for the secondary batteries, the initial charge capacity and the cycle characteristics were examined in the same manner as in Examples 1-1 to 1-7. The results are shown in Table 9 and FIG. 15.

TABLE 9

Co/(Sn + Co) = 37 wt %

|  | Raw material ratio (wt %) | | | | | Analytical value (wt %) | | | | | Initial charge capacity | 2 Cy. discharge capacity | 300 Cy. discharge capacity | Capacity retention ratio |
|---|---|---|---|---|---|---|---|---|---|---|---|---|---|---|
|  | Co | Sn | C | P | Ti | Co | Sn | C | P | Ti | (mAh/g) | (mAh/cm$^3$) | | (%) |
| Example 9-1 | 27.5 | 51 | 20 | 1.5 | 0 | 27.2 | 50.5 | 19.8 | 1.5 | 0 | 556 | 142 | 105 | 74 |
| Example 9-2 | 27.2 | 50.5 | 20 | 1.5 | 0.8 | 26.9 | 50 | 19.8 | 1.5 | 0.8 | 565 | 145 | 113 | 78 |
| Example 9-3 | 27 | 50.1 | 20 | 1.5 | 1.5 | 26.7 | 49.5 | 19.8 | 1.5 | 1.5 | 567 | 145 | 116 | 80 |
| Example 9-4 | 26.6 | 49.5 | 20 | 1.5 | 2.4 | 26.4 | 49 | 19.8 | 1.5 | 2.4 | 571 | 146 | 118 | 81 |
| Example 9-5 | 26.5 | 49.2 | 20 | 1.5 | 2.8 | 26.2 | 48.7 | 19.8 | 1.5 | 2.8 | 578 | 148 | 126 | 85 |
| Example 9-6 | 26.1 | 48.4 | 20 | 1.5 | 4 | 25.8 | 47.9 | 19.8 | 1.5 | 4 | 580 | 149 | 128 | 86 |
| Example 9-7 | 25.7 | 47.7 | 20 | 1.5 | 5.1 | 25.4 | 47.2 | 19.8 | 1.5 | 5 | 589 | 152 | 131 | 86 |
| Example 9-8 | 24.9 | 46.2 | 20 | 1.5 | 7.5 | 24.6 | 45.7 | 19.8 | 1.5 | 7.4 | 592 | 152 | 129 | 85 |
| Example 9-9 | 24 | 44.5 | 20 | 1.5 | 10 | 23.7 | 44.1 | 19.8 | 1.5 | 9.9 | 589 | 152 | 129 | 85 |
| Example 9-10 | 22.9 | 42.6 | 20 | 1.5 | 13 | 22.7 | 42.1 | 19.8 | 1.5 | 12.9 | 584 | 151 | 127 | 84 |
| Example 9-11 | 22.2 | 41.3 | 20 | 1.5 | 15 | 22 | 40.9 | 19.8 | 1.5 | 14.9 | 559 | 147 | 119 | 81 |
| Example 9-12 | 21.9 | 40.6 | 20 | 1.5 | 16 | 21.7 | 40.2 | 19.8 | 1.5 | 15.8 | 518 | 130 | 90 | 69 |

Figure 15:
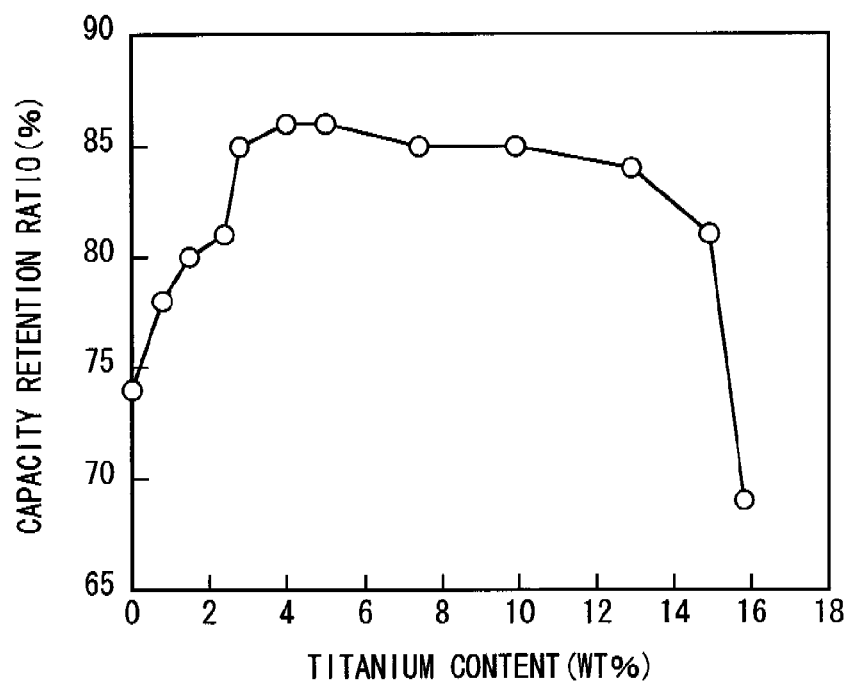
FIG. 15 is a characteristics diagram showing a relation between titanium contents in anode active materials of the batteries according to the first embodiment (liquid electrolyte) and capacity retention ratios.

As evidenced by Table 9 and FIG. 15, in Examples 9-2 to 9-11 in which titanium was contained in the range of 14.9 wt % or less, the capacity retention ration was more improved than those of Example 9-1 in which titanium was not contained and Example 9-12 in which titanium was contained in the range over 14.9 wt %. In this case, if the titanium content was 1.5 wt % or more, in particular, in the range from 2.8 wt % to 12.9 wt %, the capacity retentioin ration was significantly high.

That is, it waas found that if the anode active material contained titanium in the range of 14.9 wt % or less, the cycle characteristics could be more improved. In addition, it was found that the titanium content was preferably in the range of 1.5 wt % or more, and was in particular, more preferably in the range from 2.8 wt % to 2.9 wt %.

Examples 10-1 to 10-11

Anode active materials and secondary batteries were formed in the same manner as in Examples 1-1 to 1-7, except that as raw materials, cobalt powder, tin powder, carbon powder, phosphorus powder, and bismuth powder were prepared, and the raw material ratios thereof were changed as shown in Table 10. Specifically, the raw material ratio of carbon was set to the constant value of 20 wt %, the raw material ratio of phosphorus was set to the constant value of 1.5 wt %, the Co/(Sn+Co) ratio was set to the constant value of 37 wt %, and the raw material ratio of bismuth was changed in the range from 0.8 wt % to 16 wt %. When the anode active material was formed, the cobalt powder, the tin powder, the phosphorus powder, and the bismuth powder were alloyed to obtain cobalt-tin-phosphorus-bismuth alloy powder, and then the carbon powder was mixed therewith. For the anode active materials of Examples 10-1 to 10-11, the composition thereof was analyzed in the same manner as in Examples 1-1 to 1-7. The bismuth content was measured by ICP emission spectrometry. The results are shown in Table 10. Further, when XPS was performed and the obtained peak was analyzed, as in Examples 1-1 to 1-7, Peak P2 of the surface contamination carbon and peak P3 of C1s in the anode active material were obtained, and for all examples, peak P3 was obtained in the region lower than 284.5 eV. That is, it was confirmed that at least part of carbon contained in the anode active material was bonded to other element. Further, for the secondary batteries, the initial charge capacity and the cycle characteristics were examined in the same manner as in Examples 1-1 to 1-7. The results are shown in Table 10 and FIG. 16.

In addition, it was found that the bismuth content was more preferably 1.5 wt % or more.

Examples 11-1 to 11-10

Anode active materials and secondary batteries were formed in the same manner as in Examples 1-1 to 1-7, except that molybdenum powder, niobium powder, germanium powder, indium powder, and gallium powder were used together with cobalt powder, tin powder, carbon powder, and phosphorus powder as a raw material, and the raw material ratios of cobalt, tin, carbon, phosphorus, molybdenum, niobium, germanium, indium, and gallium were changed as shown in Table 11. Specifically, the raw material ratio of phosphorus was set to the constant value of 1.5 wt %, the Co/(Sn+Co) ratio was set to the constant value of 37 wt %, and the raw material ratio of molybdenum or the like was one of 3 wt %, 4 wt %, 5 wt %, and 6 wt %. When the anode active material was formed, the cobalt powder, the tin powder, and the phosphorus powder were alloyed to obtain cobalt-tin-phosphorus alloy powder, and then the carbon powder, the molybdenum powder and the like were mixed therewith. For the anode active materials of Examples 11-1 to 11-10. the composition thereof was analyzed in the same manner as in Examples 1-1 to 1-7. The molybdenum content and the like were measured by ICP emission spectrometry. The results are shown in Table 11. Further, when XPS was performed and the obtained peak was analyzed, as in Examples 1-1 to 1-7, Peak P2 of the surface contamination carbon and peak P3 of C1s in the anode active material were obtained, and for all examples, peak P3 was obtained in the region lower than 284.5 eV. That is, it was confirmed that at least part of carbon contained in the anode active material was bonded to other element. Further, for the secondary batteries, the initial charge capacity and the cycle characteristics were examined in the same manner as in Examples 1-1 to 1-7. The results are shown in Table 12.

TABLE 10

| | Co/(Sn + Co) = 37 wt % | | | | | | | | | | | | |
|---|---|---|---|---|---|---|---|---|---|---|---|---|---|
| | Raw material ratio (wt %) | | | | | Analytical value (wt %) | | | | | Initial charge capacity | 2 Cy. discharge capacity | 300 Cy. discharge capacity | Capacity retention ratio |
| | Co | Sn | C | P | Bi | Co | Sn | C | P | Bi | (mAh/g) | (mAh/cm³) | | (%) |
| Example 9-1 | 27.5 | 51 | 20 | 1.5 | 0 | 27.2 | 50.5 | 19.8 | 1.5 | 0 | 556 | 142 | 105 | 74 |
| Example 10-1 | 27.2 | 50.5 | 20 | 1.5 | 0.8 | 26.9 | 50 | 19.8 | 1.5 | 0.8 | 550 | 141 | 107 | 76 |
| Example 10-2 | 27 | 50.1 | 20 | 1.5 | 1.5 | 26.7 | 49.5 | 19.8 | 1.5 | 1.5 | 549 | 141 | 116 | 82 |
| Example 10-3 | 26.6 | 49.5 | 20 | 1.5 | 2.4 | 26.4 | 49 | 19.8 | 1.5 | 2.4 | 548 | 140 | 115 | 82 |
| Example 10-4 | 26.5 | 49.2 | 20 | 1.5 | 2.8 | 26.2 | 48.7 | 19.8 | 1.5 | 2.8 | 547 | 140 | 120 | 86 |
| Example 10-5 | 26.1 | 48.4 | 20 | 1.5 | 4 | 25.8 | 47.9 | 19.8 | 1.5 | 4 | 547 | 140 | 123 | 88 |
| Example 10-6 | 25.7 | 47.7 | 20 | 1.5 | 5.1 | 25.4 | 47.2 | 19.8 | 1.5 | 5 | 540 | 139 | 121 | 87 |
| Example 10-7 | 24.9 | 46.2 | 20 | 1.5 | 7.5 | 24.6 | 45.7 | 19.8 | 1.5 | 7.4 | 537 | 138 | 120 | 87 |
| Example 10-8 | 24 | 44.5 | 20 | 1.5 | 10 | 23.7 | 44.1 | 19.8 | 1.5 | 9.9 | 536 | 138 | 119 | 86 |
| Example 10-9 | 22.9 | 42.6 | 20 | 1.5 | 13 | 22.7 | 42.1 | 19.8 | 1.5 | 12.9 | 531 | 138 | 115 | 83 |
| Example 10-10 | 22.2 | 41.3 | 20 | 1.5 | 15 | 22 | 40.9 | 19.8 | 1.5 | 14.9 | 528 | 135 | 109 | 81 |
| Example 10-11 | 21.9 | 40.6 | 20 | 1.5 | 16 | 21.7 | 40.2 | 19.8 | 1.5 | 15.8 | 517 | 128 | 90 | 70 |

Figure 16:
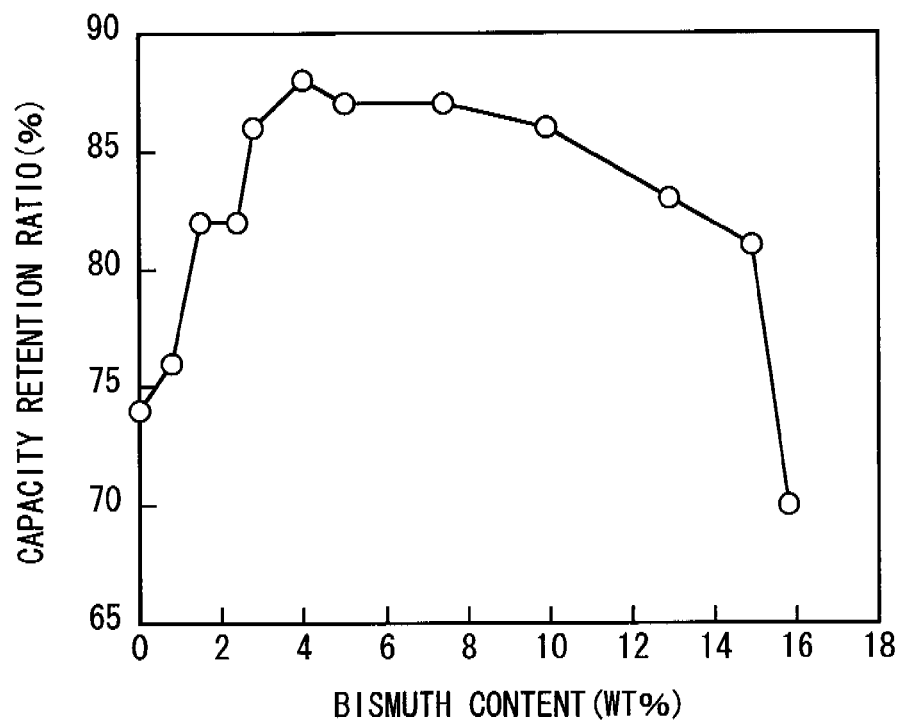
FIG. 16 is a characteristics diagram showing a relation between bismuth contents in anode active materials of the batteries according to the first embodiment (liquid electrolyte) and capacity retention ratios.

As evidenced by Table 10 and FIG. 16, in Examples 10-1 to 10-11 in which bismuth was contained, results similar to those of Examples 9-2 to 9-12 in which titanium was contained were obtained. That is, it was found that if the anode active material contained bismuth in the range of 14.9 wt % or less, the cycle characteristics could be more improved as well.

TABLE 11

Co/(Sn + Co) = 37 wt %

| | Raw material ratio (wt %) | | | | | | | | | Analytical value (wt %) | | | | | | | | |
|---|---|---|---|---|---|---|---|---|---|---|---|---|---|---|---|---|---|---|
| | Co | Sn | C | P | Mo | Nb | Ge | In | Ga | Co | Sn | C | P | Mo | Nb | Ge | In | Ga |
| Example 9-1 | 27.5 | 51 | 20 | 1.5 | — | — | — | — | — | 27.2 | 50.5 | 19.8 | 1.5 | — | — | — | — | — |
| Example 11-1 | 26.1 | 48.4 | 20 | 1.5 | 4 | — | — | — | — | 25.8 | 47.9 | 19.8 | 1.5 | 4 | — | — | — | — |
| Example 11-2 | 26.1 | 48.4 | 18 | 1.5 | 6 | — | — | — | — | 25.8 | 47.9 | 17.8 | 1.5 | 5.9 | — | — | — | — |
| Example 11-3 | 26.1 | 48.4 | 20 | 1.5 | — | 4 | — | — | — | 25.8 | 47.9 | 19.8 | 1.5 | — | 4 | — | — | — |
| Example 11-4 | 26.4 | 49.1 | 18 | 1.5 | — | 5 | — | — | — | 26.2 | 48.6 | 17.8 | 1.5 | — | 5 | — | — | — |
| Example 11-5 | 25.7 | 47.8 | 19 | 1.5 | — | 6 | — | — | — | 25.5 | 47.3 | 18.8 | 1.5 | — | 5.9 | — | — | — |
| Example 11-6 | 25.4 | 47.1 | 20 | 1.5 | — | — | 6 | — | — | 25.1 | 46.7 | 19.8 | 1.5 | — | — | 5.9 | — | — |
| Example 11-7 | 27.1 | 50.4 | 18 | 1.5 | — | — | — | 3 | — | 26.9 | 49.9 | 17.8 | 1.5 | — | — | — | 3 | — |
| Example 11-8 | 26.8 | 49.7 | 18 | 1.5 | — | — | — | 4 | — | 26.5 | 49.2 | 17.8 | 1.5 | — | — | — | 4 | — |
| Example 11-9 | 25.4 | 47.1 | 20 | 1.5 | — | — | — | 6 | — | 25.1 | 46.7 | 19.8 | 1.5 | — | — | — | 5.9 | — |
| Example 11-10 | 25.4 | 47.1 | 20 | 1.5 | — | — | — | — | 6 | 25.1 | 46.7 | 19.8 | 1.5 | — | — | — | — | 5.9 |

TABLE 12

Co/(Sn + Co) = 37 wt %

| | Initial charge capacity (mAh/g) | 2 Cy. discharge capacity (mAh/cm³) | 300 Cy. discharge capacity (mAh/cm³) | Capacity retention ratio (%) |
|---|---|---|---|---|
| Example 9-1 | 556 | 142 | 105 | 74 |
| Example 11-1 | 530 | 137 | 114 | 83 |
| Example 11-2 | 528 | 139 | 118 | 85 |
| Example 11-3 | 555 | 142 | 119 | 84 |
| Example 11-4 | 550 | 140 | 118 | 84 |
| Example 11-5 | 552 | 139 | 117 | 84 |
| Example 11-6 | 560 | 143 | 117 | 82 |
| Example 11-7 | 560 | 140 | 112 | 80 |
| Example 11-8 | 564 | 141 | 114 | 81 |
| Example 11-9 | 570 | 145 | 122 | 84 |
| Example 11-10 | 545 | 139 | 114 | 82 |

As evidenced in Table 11 and Table 12. in Examples 11-1 to 11-10, the cycle characteristics were improved as in Examples 9-2 to 9-12 and 10-1 to 10-11. That is, it was found that if the anode active material contained at least one selected from the group consisting of molybdenum, niobium, germanium, indium, and gallium, the cycle characteristics could be more improved.

Examples 12-1 to 12-4

Anode active materials and secondary batteries were formed in the same manner as in Examples 1-1 to 1-7, except that cobalt powder, tin powder, carbon powder, phosphorus powder, silicon powder, and titanium powder were prepared as a raw material, and the raw material ratios thereof were changed as shown in Table 13. Specifically, the raw material ratio of carbon was set to the constant value of 18 wt %, the raw material ratio of phosphorus was set to the constant value of 1.5 wt %, the raw material ratio of silicon was set to the constant value of 3 wt %, the Co/(Sn+Co) ratio was set to the constant value of 37 wt %, and the raw material ratio of titanium was changed in the range from 0 wt % to 7.5 wt %. When the anode active material was formed, the cobalt powder, the tin powder, and the phosphorus powder were alloyed to obtain cobalt-tin-phosphorus alloy powder, or the cobalt powder, the tin powder, the phosphorus powder, and the titanium powder were alloyed to obtain cobalt-tin-phosphorus-titanium alloy powder. After that, the carbon powder and the silicon powder were mixed with the foregoing alloy powder. For the anode active materials of Examples 12-1 to 12-4. the composition thereof was analyzed in the same manner as in Examples 1-1 to 1-7. The silicon content and the titanium content were measured by ICP emission spectrometry. The results are shown in Table 13. Further, when XPS was performed and the obtained peak was analyzed, as in Examples 1-1 to 1-7, Peak P2 of the surface contamination carbon and peak P3 of C1s in the anode active material were obtained, and for all examples, peak P3 was obtained in the region lower than 284.5 eV. That is, it was confirmed that at least part of carbon contained in the anode active material was bonded to other element. Further, for the secondary batteries, the initial charge capacity and the cycle characteristics were examined in the same manner as in Examples 1-1 to 1-7. The results are shown in Table 13.

TABLE 13

Co/(Sn + Co) = 37 wt %

| | Raw material ratio (wt %) | | | | | | Analytical value (wt %) | | | | | | Initial charge capacity | 2 Cy. discharge capacity | 300 Cy. discharge capacity | Capacity retention ratio |
|---|---|---|---|---|---|---|---|---|---|---|---|---|---|---|---|---|
| | Co | Sn | C | P | Si | Ti | Co | Sn | C | P | Si | Ti | (mAh/g) | (mAh/cm³) | (mAh/cm³) | (%) |
| Example 9-1 | 27.5 | 51 | 20 | 1.5 | — | — | 27.2 | 50.5 | 19.8 | 1.5 | — | — | 556 | 142 | 105 | 74 |
| Example 12-1 | 27.1 | 50.4 | 18 | 1.5 | 3 | 0 | 26.9 | 49.9 | 17.8 | 1.5 | 3 | 0 | 582 | 147 | 103 | 70 |
| Example 12-2 | 25.7 | 47.8 | 18 | 1.5 | 3 | 4 | 25.5 | 47.3 | 17.8 | 1.5 | 3 | 4 | 601 | 148 | 112 | 76 |
| Example 12-3 | 25.3 | 47.1 | 18 | 1.5 | 3 | 5.1 | 25.1 | 46.6 | 17.8 | 1.5 | 3 | 5 | 618 | 149 | 116 | 78 |
| Example 12-4 | 24.5 | 45.5 | 18 | 1.5 | 3 | 7.5 | 24.3 | 45.0 | 17.8 | 1.5 | 3 | 7.4 | 621 | 149 | 116 | 78 |

As evidenced by Table 13, in Examples 12-2 to 12-4 in which titanium was contained in addition to silicon, the initial charge capacity and the capacity retention ratio were more improved than those of Examples 9-1 and 12-1 in which silicon and titanium were not contained.

That is, it was found that when the anode active material contained at least one selected from the group consisting of titanium, molybdenum, niobium, germanium, indium, and gallium in addition to silicon, the capacity and the cycle characteristics could be more improved.

Examples 13-1 to 13-3

Secondary batteries were formed in the same manner as in Examples 1-5, 8-5, and 12-2, except that 4-fluoro-1,3-dioxolane-2-one (FEC) was added to the solvent of the electrolytic solution, and the solvent composition was FEC:EC:PC:DMC=20:10:10:60 at a weight ratio. Further, the capacity retention ratio was examined in the same manner as in Examples 1-1 to 1-7. The results are shown in Table 14.

TABLE 14

Co/(Sn + Co) = 37 wt %

| | Raw material ratio (wt %) | | | | | | Analytical value (wt %) | | | | | | | Capacity retention ratio (%) |
|---|---|---|---|---|---|---|---|---|---|---|---|---|---|---|
| | Co | Sn | C | P | Si | Ti | Co | Sn | C | P | Si | Ti | Solvent | |
| Example 1-5 | 29 | 49.5 | 20 | 1.5 | — | — | 28.8 | 49 | 19.8 | 1.5 | — | — | EC + PC + DMC | 75 |
| Example 8-5 | 27.6 | 46.9 | 20 | 1.5 | 4 | — | 27.3 | 46.5 | 19.8 | 1.5 | 4 | — | EC + PC + DMC | 69 |
| Example 12-2 | 25.7 | 47.8 | 18 | 1.5 | 3 | 4 | 25.5 | 47.3 | 17.8 | 1.5 | 3 | 4 | EC + PC + DMC | 76 |
| Example 13-1 | 29 | 49.5 | 20 | 1.5 | — | — | 28.8 | 49 | 19.8 | 1.5 | — | — | FEC + EC + PC + DMC | 90 |
| Example 13-2 | 27.6 | 46.9 | 20 | 1.5 | 4 | — | 27.3 | 46.5 | 19.8 | 1.5 | 4 | — | FEC + EC + PC + DMC | 79 |
| Example 13-3 | 25.7 | 47.8 | 18 | 1.5 | 3 | 4 | 25.5 | 47.3 | 17.8 | 1.5 | 3 | 4 | FEC + EC + PC + DMC | 86 |

As evidenced by Table 14, in Examples 13-1 to 13-3 in which FEC was added to the solvent, the capacity retention ratio was more improved than those of Examples 1-5, 8-5, and 12-2 in which FEC was not added to the solvent. That is, it was found that if FEC was added to the solvent, the cycle characteristics could be more improved.

Examples 14-1 to 14-16

Cylindrical type secondary batteries were fabricated in the same manner as in Examples 1-5 and 13-1, except that the solvent composition was changed as shown in Table 15. For the secondary batteries of Examples 14-1 to 14-16, the capacity retention ratio was examined in the same manner as in Examples 1-1 to 1-7. The results are shown in Table 15.

TABLE 15

Co/(Sn + Co) = 37 wt %

| | Raw material ratio (wt %) | | | | Analytical value (wt %) | | | | Solvent (wt %) | | | | Capacity retention ratio (%) |
|---|---|---|---|---|---|---|---|---|---|---|---|---|---|
| | Co | Sn | C | P | Co | Sn | C | P | FEC | EC | PC | DMC | |
| Example 1-5 | 29 | 49.5 | 20 | 1.5 | 28.8 | 49 | 19.8 | 1.5 | 0 | 30 | 10 | 60 | 75 |
| Example 14-1 | 29 | 49.5 | 20 | 1.5 | 28.8 | 49 | 19.8 | 1.5 | 1 | 29 | 10 | 60 | 83 |
| Example 14-2 | 29 | 49.5 | 20 | 1.5 | 28.8 | 49 | 19.8 | 1.5 | 5 | 25 | 10 | 60 | 85 |
| Example 14-3 | 29 | 49.5 | 20 | 1.5 | 28.8 | 49 | 19.8 | 1.5 | 10 | 20 | 10 | 60 | 88 |
| Example 14-4 | 29 | 49.5 | 20 | 1.5 | 28.8 | 49 | 19.8 | 1.5 | 15 | 15 | 10 | 60 | 89 |
| Example 13-1 | 29 | 49.5 | 20 | 1.5 | 28.8 | 49 | 19.8 | 1.5 | 20 | 10 | 10 | 60 | 90 |
| Example 14-5 | 29 | 49.5 | 20 | 1.5 | 28.8 | 49 | 19.8 | 1.5 | 25 | 5 | 10 | 60 | 91 |
| Example 14-6 | 29 | 49.5 | 20 | 1.5 | 28.8 | 49 | 19.8 | 1.5 | 30 | 0 | 10 | 60 | 92 |
| Example 14-7 | 29 | 49.5 | 20 | 1.5 | 28.8 | 49 | 19.8 | 1.5 | 35 | 0 | 5 | 60 | 93 |
| Example 14-8 | 29 | 49.5 | 20 | 1.5 | 28.8 | 49 | 19.8 | 1.5 | 40 | 0 | 0 | 60 | 93 |
| Example 14-9 | 29 | 49.5 | 20 | 1.5 | 28.8 | 49 | 19.8 | 1.5 | 50 | 0 | 0 | 50 | 90 |
| Example 14-10 | 29 | 49.5 | 20 | 1.5 | 28.8 | 49 | 19.8 | 1.5 | 60 | 0 | 0 | 40 | 88 |
| Example 14-11 | 29 | 49.5 | 20 | 1.5 | 28.8 | 49 | 19.8 | 1.5 | 65 | 0 | 0 | 35 | 84 |
| Example 14-12 | 29 | 49.5 | 20 | 1.5 | 28.8 | 49 | 19.8 | 1.5 | 20 | 20 | 0 | 60 | 88 |
| Example 14-13 | 29 | 49.5 | 20 | 1.5 | 28.8 | 49 | 19.8 | 1.5 | 30 | 10 | 0 | 60 | 90 |
| Example 14-14 | 29 | 49.5 | 20 | 1.5 | 28.8 | 49 | 19.8 | 1.5 | 70 | 0 | 0 | 30 | 82 |
| Example 14-15 | 29 | 49.5 | 20 | 1.5 | 28.8 | 49 | 19.8 | 1.5 | 80 | 0 | 0 | 20 | 74 |
| Example 14-16 | 29 | 49.5 | 20 | 1.5 | 28.8 | 49 | 19.8 | 1.5 | 90 | 0 | 0 | 10 | 55 |

As evidenced by Table 15, the capacity retention ratio was increased, showed the maximum value, and the was lowered as the FEC content was increased.

That is, it was found that if the solvent contained FEC, the cycle characteristics could be improved regardless of the composition of the solvent, and in particular, higher effects could be obtained if FEC was contained in the range from 1 wt % to 80 wt %.

Examples 15-1 to 15-6

Cylindrical secondary batteries were fabricated in the same manner as in Example 13-1, except that other cyclic ester carbonate derivative having a halogen atom was used instead of FEC. In Example 15-1, 4-difluoro-1,3-dioxolane-2-one (DFEC) was used. In Example 15-2, 4-difluoro-5-fluoro-1,3-dioxolane-2-one (Tri-FEC) was used. In Example 15-3, 4-chloro-1,3-dioxolane-2-one (Cl-EC) was used. In Example 15-4, 4-bromo-1,3-dioxolane-2-one (Br-EC) was used. In Example 15-5, 4-iodine-1,3-dioxolane-2-one (I-EC) was used. In Example 15-6, 4-fluoromethyl-1,3-dioxolane-2-one (F-PC) was used.

For the secondary batteries of Examples 15-1 to 15-6, the capacity retention ratio was examined in the same manner as in Examples 1-1 to 1-7. The results are shown in Table 16.

1-2 Using Gel Electrolyte

Examples 16-1 to 16-7

Coin type secondary batteries were fabricated in the same manner as in Examples 1-1 to 1-7, except that an electrolyte layer composed of a gel electrolyte instead of the liquid electrolyte (electrolytic solution) was formed on the surface of the test electrode 61 and the counter electrode 63. That is, as shown in Table 17, for the test electrode 61, anode active materials whose raw material ratios of cobalt, tin, carbon, and phosphorus were similar to those of Examples 1-1 to 1-7 were used. The procedure of forming the electrolyte layer was as follows. First, EC and PC as a solvent and $LiPF_6$ as an electrolyte salt were mixed at a weight ratio of $EC:PC:LiPF_6$ =11.5:11.5:4 to obtain an electrolytic solution. A copolymer of vinylidene fluoride and hexafluoropropylene as a polymer compound (molecular weight=600000) and diethyl carbonate (DEC) as a mixed solvent were mixed with the foregoing electrolytic solution at a weigh ratio of electrolytic solution: polymer compound:mixed solvent=27:10:60 to form a precursor solution. Then, the precursor solution was uniformly

TABLE 16

| | Co/(Sn + Co) = 37 wt % | | | | | | | | | |
|---|---|---|---|---|---|---|---|---|---|---|
| | Raw material ratio (wt %) | | | | Analytical value (wt %) | | | | | Capacity retention ratio |
| | Co | Sn | C | P | Co | Sn | C | P | Solvent | (%) |
| Example 1-5 | 29 | 49.5 | 20 | 1.5 | 28.8 | 49 | 19.8 | 1.5 | EC + PC + DMC | 75 |
| Example 13-1 | 29 | 49.5 | 20 | 1.5 | 28.8 | 49 | 19.8 | 1.5 | FEC + EC + PC + DMC | 90 |
| Example 15-1 | 29 | 49.5 | 20 | 1.5 | 28.8 | 49 | 19.8 | 1.5 | DFEC + EC + PC + DMC | 80 |
| Example 15-2 | 29 | 49.5 | 20 | 1.5 | 28.8 | 49 | 19.8 | 1.5 | Tri-FEC + EC + PC + DMC | 76 |
| Example 15-3 | 29 | 49.5 | 20 | 1.5 | 28.8 | 49 | 19.8 | 1.5 | Cl-EC + PC + DMC | 81 |
| Example 15-4 | 29 | 49.5 | 20 | 1.5 | 28.8 | 49 | 19.8 | 1.5 | Br-EC + PC + DMC | 74 |
| Example 15-5 | 29 | 49.5 | 20 | 1.5 | 28.8 | 49 | 19.8 | 1.5 | I-EC + EC + PC + DMC | 73 |
| Example 15-6 | 29 | 49.5 | 20 | 1.5 | 28.8 | 49 | 19.8 | 1.5 | F-PC + EC + PC + DMC | 83 |

As evidenced by Table 16, even if other cyclic ester carbonate derivative having a halogen atom was used, the cycle characteristics were improved as in Example 13-1. However, in Example 13-1 in which FEC was used, the capacity retention ratio was particularly improved. That is, it was found that if the solvent contained a cyclic ester carbonate derivative having a halogen atom, the cycle characteristics could be improved, and if the solvent contained FEC, it was particularly effective.

coated with each face where the test electrode 61 was opposed to the counter electrode 63. After that, the resultant was left at ambient temperature for 6 hours to volatilize DEC. Thereby, a gel electrolyte layer was formed.

For the obtained coin type secondary batteries, the initial charge capacity was examined in the same manner as in Examples 1-1 to 1-7. The results are shown in Table 17 and FIG. 17.

TABLE 17

| | Co/(Sn + Co) = 37 wt % | | | | | | | | | | | | |
|---|---|---|---|---|---|---|---|---|---|---|---|---|---|
| | Raw material ratio (wt %) | | | | Analytical value (wt %) | | | | Half-width | Initial charge capacity | 2 Cy. discharge capacity | 300 Cy. discharge capacity | Capacity retention ratio |
| | Co | Sn | C | P | Co | Sn | C | P | (deg) | (mAh/g) | (mAh/cm³) | | (%) |
| Example 16-1 | 32.7 | 55.8 | 10 | 1.5 | 32.4 | 55.2 | 9.9 | 1.5 | 4.2 | 501 | 110 | 73 | 66 |
| Example 16-2 | 32 | 54.5 | 12 | 1.5 | 31.7 | 54 | 11.9 | 1.5 | 4.6 | 503 | 110 | 75 | 68 |
| Example 16-3 | 30.9 | 52.6 | 15 | 1.5 | 30.6 | 52.1 | 14.9 | 1.5 | 5.1 | 512 | 111 | 77 | 69 |
| Example 16-4 | 30.2 | 51.3 | 17 | 1.5 | 29.9 | 50.8 | 16.8 | 1.5 | 5.3 | 519 | 115 | 84 | 73 |
| Example 16-5 | 29 | 49.5 | 20 | 1.5 | 28.8 | 49 | 19.8 | 1.5 | 5.6 | 522 | 116 | 86 | 74 |
| Example 16-6 | 27.2 | 46.3 | 25 | 1.5 | 26.9 | 45.8 | 24.8 | 1.5 | 5.7 | 524 | 118 | 89 | 75 |
| Example 16-7 | 25.3 | 43.2 | 30 | 1.5 | 25.1 | 42.7 | 29.7 | 1.5 | 5.8 | 511 | 117 | 78 | 67 |

TABLE 17-continued

Co/(Sn + Co) = 37 wt %

|  | Raw material ratio (wt %) | | | | Analytical value (wt %) | | | | Half-width (deg) | Initial charge capacity (mAh/g) | 2 Cy. discharge capacity | 300 Cy. discharge capacity | Capacity retention ratio (%) |
| --- | --- | --- | --- | --- | --- | --- | --- | --- | --- | --- | --- | --- | --- |
|  | Co | Sn | C | P | Co | Sn | C | P |  |  | (mAh/cm³) | | |
| Comparative example 16-1 | 36.4 | 62.1 | 0 | 1.5 | 36.1 | 61.4 | 0 | 1.5 | 0.4 | 452 | 80 | 0 | 0 |
| Comparative example 16-2 | 36.1 | 61.4 | 1 | 1.5 | 35.7 | 60.8 | 1 | 1.5 | 0.6 | 456 | 83 | 0 | 0 |
| Comparative example 16-3 | 34.6 | 58.9 | 5 | 1.5 | 34.2 | 58.3 | 5 | 1.5 | 2.1 | 476 | 90 | 0 | 0 |
| Comparative example 16-4 | 33.5 | 57 | 8 | 1.5 | 33.2 | 56.4 | 7.9 | 1.5 | 3.1 | 482 | 94 | 13 | 14 |
| Comparative example 16-5 | 21.6 | 36.9 | 40 | 1.5 | 21.4 | 36.5 | 39.6 | 1.5 | 5.8 | 462 | 86 | 17 | 20 |
| Comparative example 16-6 | 17.9 | 30.6 | 50 | 1.5 | 17.8 | 30.2 | 49.5 | 1.5 | 5.8 | 412 | 83 | 12 | 15 |
| Comparative example 16-7 | 16.1 | 27.4 | 55 | 1.5 | 15.9 | 27.1 | 54.5 | 1.5 | 5.8 | 383 | 65 | 5 | 8 |

The laminated film type secondary batteries shown in FIG. 3 and FIG. 4 was fabricated by the following procedure. First, in the same manner as in Examples 1-1 to 1-7, after the cathode 33 and the anode 34 were formed, the cathode lead 31 and the anode lead 32 were attached thereto. Subsequently, the cathode 33 and the anode 34 were uniformly coated with the foregoing precursor solution. After that, the resultant was left at ambient temperature for 6 hours to volatilize DEC. Thereby, the gel electrolyte layer 36 was formed. Subsequently, the cathode 33 and the anode 34 were layered with the separator 35 in between so that the faces on which the electrolyte layer 36 was formed were opposed to each other, and then the lamination was spirally wound. Thereby, the spirally wound electrode body 30 was formed. Finally, the spirally wound electrode body 30 was vacuum-inserted into the package member 40 made of a dampproof aluminum laminated film, and thereby the secondary battery was fabricated.

For these secondary batteries, the capacity retention ratio was examined in the same manner as in Examples 1-1 to 1-7. The results are shown in Table 17 and FIG. 17.

As Comparative examples 16-1 to 16-7 relative to Examples 16-1 to 16-7, secondary batteries were formed in the same manner as in Examples 16-1 to 16-7, except that anode active materials in which the raw material ratios of cobalt, tin, carbon, and phosphorus were as shown in Table 17 were used, that is, anode active materials similar to those of Comparative examples 1-1 to 1-7 were used.

For the obtained secondary batteries of Comparative examples 16-1 to 16-7, the initial charge capacity and the capacity retention ratio were also examined. The results are shown in Table 17 and FIG. 17.

Figure 17:
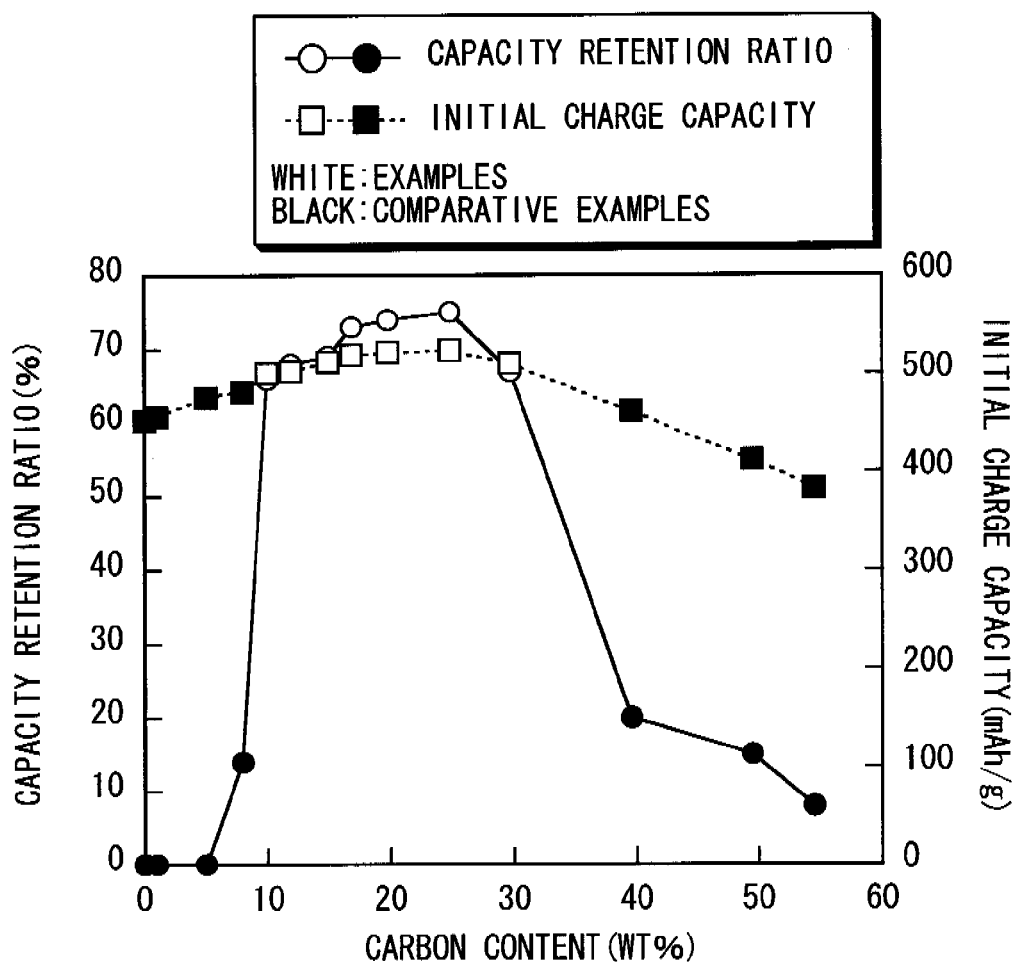
FIG. 17 is another characteristics diagram showing a relation between carbon contents in anode active materials of batteries according to the first embodiment (gel electrolyte) and capacity retention ratios/initial charge capacities.

As evidenced by Table 17 and FIG. 17, results similar to those of Examples 1-1 to 1-7 were obtained. That is, it was found that even in the case that the gel electrolyte was used, if the carbon content was in the range from 9.9 wt % to 29.7 wt %, the capacity and the cycle characteristics could be improved, the carbon content was more preferably in the range from 14.9 wt % to 29.7 wt %, and much more preferably in the range from 16.8 wt % to 24.8 wt %.

Examples 17-1 to 17-11, 18-1 to 18-11, and 19-1 to 19-11

As Examples 17-1 to 17-11, as shown in table 18, anode active materials and secondary batteries were formed in the same manner as in Examples 16-1 to 16-7, except that the raw material ratio of carbon was set to the constant value of 10 wt %, the raw material ratio of phosphorus was set to the constant value of 1.5 wt %, and the Co/(Sn+Co) ratio was changed in the range from 24 wt % to 70 wt %, that is, the raw material ratios were similar to those of Examples 2-1 to 2-11. As Comparative examples 17-1 to 17-3 relative to Examples 17-1 to 17-11, anode active materials and secondary batteries were formed in the same manner as in Examples 17-1 to 17-11, except that, as shown in Table 18, the Co/(Sn+Co) ratio was 75 wt %, 20 wt %, and 16 wt % respectively, that is, the raw material ratios were similar to those of Comparative examples 2-1 to 2-3.

TABLE 18

|  | Raw material ratio (wt %) | | | | Analytical value (wt %) | | | | Co/(SN + Co) (wt %) | Half-width (deg) | Initial charge capacity (mAh/g) | 2 Cy. discharge capacity | 300 Cy. discharge capacity | Capacity retention ratio (%) |
| --- | --- | --- | --- | --- | --- | --- | --- | --- | --- | --- | --- | --- | --- | --- |
|  | Co | Sn | C | P | Co | Sn | C | P |  |  |  | (mAh/cm³) | | |
| Example 17-1 | 62 | 26.6 | 10 | 1.5 | 61.3 | 26.3 | 9.9 | 1.5 | 70 | 4.5 | 370 | 82 | 62 | 75 |
| Example 17-2 | 57.5 | 31 | 10 | 1.5 | 56.9 | 30.7 | 9.9 | 1.5 | 65 | 4.5 | 380 | 83 | 61 | 73 |
| Example 17-3 | 53.1 | 35.4 | 10 | 1.5 | 52.6 | 35 | 9.9 | 1.5 | 60 | 4.5 | 398 | 85 | 61 | 72 |
| Example 17-4 | 48.7 | 39.8 | 10 | 1.5 | 48.2 | 39.4 | 9.9 | 1.5 | 55 | 4.4 | 421 | 86 | 61 | 71 |

TABLE 18-continued

| | Raw material ratio (wt %) | | | | Analytical value (wt %) | | | | Co/(SN + Co) (wt %) | Half-width (deg) | Initial charge capacity (mAh/g) | 2 Cy. discharge capacity | 300 Cy. discharge capacity | Capacity retention ratio (%) |
|---|---|---|---|---|---|---|---|---|---|---|---|---|---|---|
| | Co | Sn | C | P | Co | Sn | C | P | | | | (mAh/cm$^3$) | | |
| Example 17-5 | 44.3 | 44.3 | 10 | 1.5 | 43.8 | 43.8 | 9.9 | 1.5 | 50 | 4.3 | 448 | 88 | 62 | 71 |
| Example 17-6 | 39.8 | 48.7 | 10 | 1.5 | 39.4 | 48.2 | 9.9 | 1.5 | 45 | 4.3 | 471 | 95 | 65 | 68 |
| Example 17-7 | 35.4 | 53.1 | 10 | 1.5 | 35 | 52.6 | 9.9 | 1.5 | 40 | 4.2 | 489 | 105 | 71 | 68 |
| Example 16-1 | 32.7 | 55.8 | 10 | 1.5 | 32.4 | 55.2 | 9.9 | 1.5 | 37 | 4.2 | 501 | 110 | 73 | 66 |
| Example 17-8 | 29.2 | 59.3 | 10 | 1.5 | 28.9 | 58.7 | 9.9 | 1.5 | 33 | 4.2 | 532 | 113 | 73 | 65 |
| Example 17-9 | 26.6 | 62 | 10 | 1.5 | 26.3 | 61.3 | 9.9 | 1.5 | 30 | 4.2 | 561 | 114 | 72 | 63 |
| Example 17-10 | 24.8 | 63.7 | 10 | 1.5 | 24.5 | 63.1 | 9.9 | 1.5 | 28 | 4.1 | 563 | 115 | 71 | 62 |
| Example 17-11 | 21.2 | 67.3 | 10 | 1.5 | 21 | 66.6 | 9.9 | 1.5 | 24 | 4 | 571 | 117 | 69 | 59 |
| Comparative example 17-1 | 66.4 | 22.1 | 10 | 1.5 | 65.7 | 21.9 | 9.9 | 1.5 | 75 | 4.5 | 324 | 65 | 46 | 70 |
| Comparative example 17-2 | 17.7 | 70.8 | 10 | 1.5 | 17.5 | 70.1 | 9.9 | 1.5 | 20 | 3 | 603 | 48 | 7 | 15 |
| Comparative example 17-3 | 14.2 | 74.3 | 10 | 1.5 | 14 | 73.6 | 9.9 | 1.5 | 16 | 2.5 | 604 | 44 | 0 | 0 |

As Examples 18-1 to 18-11, anode active materials and secondary batteries were formed in the same manner as in Examples 16-1 to 16-7, except that, as shown in table 19, the raw material ratio of carbon was set to the constant value of 20 wt %, the raw material ratio of phosphorus was set to the constant value of 1.5 wt %, and the Co/(Sn+Co) ratio was changed in the range from 24 wt% to 70 wt %, that is, the raw material ratios were similar to those of Examples 3-1 to 3-11. As Comparative examples 18-1 to 18-3 relative to Examples 18-1 to 18-11, anode active materials and secondary batteries were formed in the same manner as in Examples 18-1 to 18-11, except that, as shown in Table 19, the Co/(Sn+Co) ratio was 75 wt %, 20 wt %, and 16 wt % respectively, that is, the raw material ratios were similar to those of Comparative examples 3-1 to 3-3.

As Examples 19-1 to 19-11, anode active materials and secondary batteries were formed in the same manner as in Examples 16-1 to 16-7, except that, as shown in Table 20, the raw material ratio of carbon was set to the constant value of 30 wt %, the raw material ratio of phosphorus was set to the constant value of 1.5 wt %, and the Co/(Sn+Co) ratio was changed in the range from 24 wt % to 70 wt %, that is raw material ratios were similar to those of Examples 4-1 to 4-11. As Comparative examples 19-1 to 19-3 relative to Examples 19-1 to 19-11, anode active materials and secondary batteries were formed in the same manner as in Examples 19-1 to 19-11, except that, as shown in Table 20, the Co/(Sn+Co) ratio was 75 wt %, 20 wt %, and 16 wt % respectively, that is, raw material ratios were similar to those of Comparative examples 4-1 to 4-3.

TABLE 19

| | Raw material ratio (wt %) | | | | Analytical value (wt %) | | | | Co/(SN + Co) (wt %) | Half-width (deg) | Initial charge capacity (mAh/g) | 2 Cy. discharge capacity | 300 Cy. discharge capacity | Capacity retention ratio (%) |
|---|---|---|---|---|---|---|---|---|---|---|---|---|---|---|
| | Co | Sn | C | P | Co | Sn | C | P | | | | (mAh/cm$^3$) | | |
| Example 18-1 | 55 | 23.6 | 20 | 1.5 | 54.4 | 23.3 | 19.8 | 1.5 | 70 | 5.8 | 370 | 80 | 68 | 85 |
| Example 18-2 | 51 | 27.5 | 20 | 1.5 | 50.5 | 27.2 | 19.8 | 1.5 | 65 | 5.8 | 381 | 82 | 70 | 85 |
| Example 18-3 | 47.1 | 31.4 | 20 | 1.5 | 46.6 | 31.1 | 19.8 | 1.5 | 60 | 5.7 | 401 | 87 | 73 | 84 |
| Example 18-4 | 43.2 | 35.3 | 20 | 1.5 | 42.7 | 35 | 19.8 | 1.5 | 55 | 5.7 | 421 | 95 | 79 | 83 |
| Example 18-5 | 39.3 | 39.3 | 20 | 1.5 | 38.9 | 38.9 | 19.8 | 1.5 | 50 | 5.7 | 453 | 96 | 78 | 81 |
| Example 18-6 | 35.3 | 43.2 | 20 | 1.5 | 35 | 42.7 | 19.8 | 1.5 | 45 | 5.6 | 481 | 105 | 83 | 79 |
| Example 18-7 | 31.4 | 47.1 | 20 | 1.5 | 31.1 | 46.6 | 19.8 | 1.5 | 40 | 5.6 | 504 | 108 | 83 | 77 |
| Example 16-5 | 29 | 49.5 | 20 | 1.5 | 28.8 | 49 | 19.8 | 1.5 | 37 | 5.6 | 522 | 116 | 86 | 74 |
| Example 18-8 | 25.9 | 52.6 | 20 | 1.5 | 25.6 | 52.1 | 19.8 | 1.5 | 33 | 5.6 | 545 | 116 | 82 | 71 |
| Example 18-9 | 23.6 | 55 | 20 | 1.5 | 23.3 | 54.4 | 19.8 | 1.5 | 30 | 5.5 | 560 | 116 | 81 | 70 |
| Example 18-10 | 22 | 56.5 | 20 | 1.5 | 21.8 | 56 | 19.8 | 1.5 | 28 | 5.4 | 564 | 110 | 76 | 69 |
| Example 18-11 | 18.8 | 59.7 | 20 | 1.5 | 18.7 | 59.1 | 19.8 | 1.5 | 24 | 5.3 | 574 | 108 | 69 | 64 |
| Comparative example 18-1 | 58.9 | 19.6 | 20 | 1.5 | 58.3 | 19.4 | 19.8 | 1.5 | 75 | 5.8 | 258 | 61 | 52 | 86 |
| Comparative example 18-2 | 15.7 | 62.8 | 20 | 1.5 | 15.5 | 62.2 | 19.8 | 1.5 | 20 | 5 | 602 | 46 | 13 | 28 |
| Comparative example 18-3 | 12.6 | 65.9 | 20 | 1.5 | 12.4 | 65.3 | 19.8 | 1.5 | 16 | 4.6 | 604 | 44 | 8 | 18 |

TABLE 20

| | Raw material ratio (wt %) | | | | Analytical value (wt %) | | | | Co/(SN + Co) (wt %) | Half-width (deg) | Initial charge capacity (mAh/g) | 2 Cy. discharge capacity | 300 Cy. discharge capacity | Capacity retention ratio (%) |
|---|---|---|---|---|---|---|---|---|---|---|---|---|---|---|
| | Co | Sn | C | P | Co | Sn | C | P | | | | (mAh/cm³) | | |
| Example 19-1 | 48 | 20.6 | 30 | 1.5 | 47.5 | 20.3 | 29.7 | 1.5 | 70 | 6.4 | 324 | 63 | 54 | 86 |
| Example 19-2 | 44.5 | 24 | 30 | 1.5 | 44.1 | 23.7 | 29.7 | 1.5 | 65 | 6.3 | 402 | 80 | 66 | 82 |
| Example 19-3 | 41.1 | 27.4 | 30 | 1.5 | 40.7 | 27.1 | 29.7 | 1.5 | 60 | 6.2 | 421 | 84 | 66 | 78 |
| Example 19-4 | 37.7 | 30.8 | 30 | 1.5 | 37.3 | 30.5 | 29.7 | 1.5 | 55 | 6.1 | 430 | 90 | 68 | 75 |
| Example 19-5 | 34.3 | 34.3 | 30 | 1.5 | 33.9 | 33.9 | 29.7 | 1.5 | 50 | 6 | 459 | 93 | 67 | 72 |
| Example 19-6 | 30.8 | 37.7 | 30 | 1.5 | 30.5 | 37.3 | 29.7 | 1.5 | 45 | 5.9 | 472 | 94 | 67 | 71 |
| Example 19-7 | 27.4 | 41.1 | 30 | 1.5 | 27.1 | 40.7 | 29.7 | 1.5 | 40 | 5.9 | 499 | 99 | 67 | 68 |
| Example 16-7 | 25.3 | 43.2 | 30 | 1.5 | 25.1 | 42.7 | 29.7 | 1.5 | 37 | 5.8 | 511 | 117 | 74 | 67 |
| Example 19-8 | 22.6 | 45.9 | 30 | 1.5 | 22.4 | 45.4 | 29.7 | 1.5 | 33 | 5.8 | 519 | 118 | 77 | 65 |
| Example 19-9 | 20.6 | 48 | 30 | 1.5 | 20.3 | 47.5 | 29.7 | 1.5 | 30 | 5.7 | 525 | 119 | 76 | 64 |
| Example 19-10 | 19.2 | 49.3 | 30 | 1.5 | 19 | 48.8 | 29.7 | 1.5 | 28 | 5.7 | 534 | 119 | 75 | 63 |
| Example 19-11 | 16.4 | 52.1 | 30 | 1.5 | 16.3 | 51.5 | 29.7 | 1.5 | 24 | 5.6 | 545 | 122 | 71 | 58 |
| Comparative example 19-1 | 51.4 | 17.1 | 30 | 1.5 | 50.9 | 17 | 29.7 | 1.5 | 75 | 6.5 | 272 | 61 | 54 | 88 |
| Comparative example 19-2 | 13.7 | 54.8 | 30 | 1.5 | 13.6 | 54.3 | 29.7 | 1.5 | 20 | 4.9 | 556 | 46 | 7 | 15 |
| Comparative example 19-3 | 11 | 57.5 | 30 | 1.5 | 10.9 | 57 | 29.7 | 1.5 | 16 | 4.6 | 561 | 43 | 0 | 0 |

For the secondary batteries of Examples 17-1 to 17-11, 18-1 to 18-11, and 19-1 to 19-11 and Comparative examples 17-1 to 17-3, 18-1 to 18-3, and 19-1 to 19-3, the initial charge capacity and the capacity retention ratio were examined in the same manner as in Examples 16-1 to 16-7. The results are shown in Table 18 to Table 20 and FIG. 8 to FIG. 20.

Figure 18:
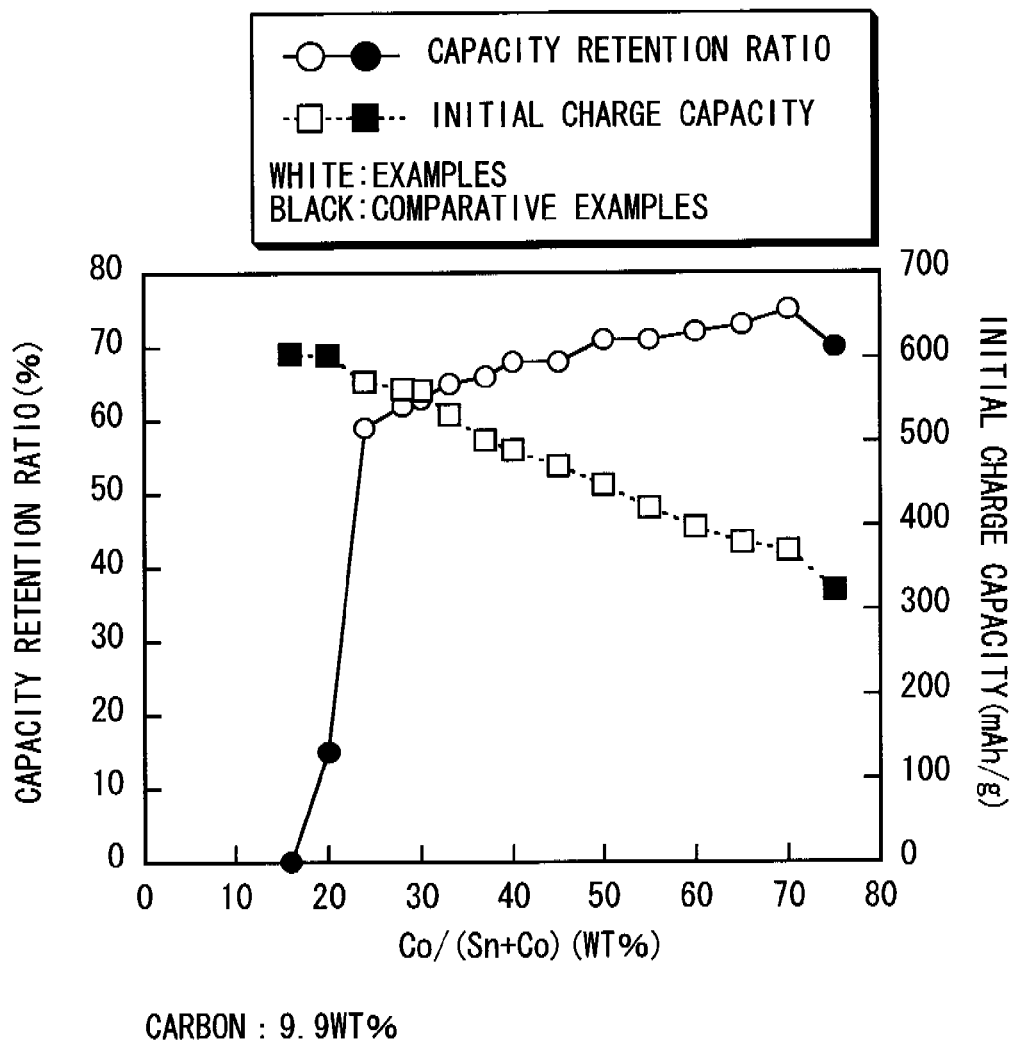
FIG. 18 is a characteristics diagram showing a relation between cobalt ratios to the total of tin and cobalt in anode active materials of the batteries according to the first embodiment (gel electrolyte) and capacity retention ratios/initial charge capacities.
Figure 19:
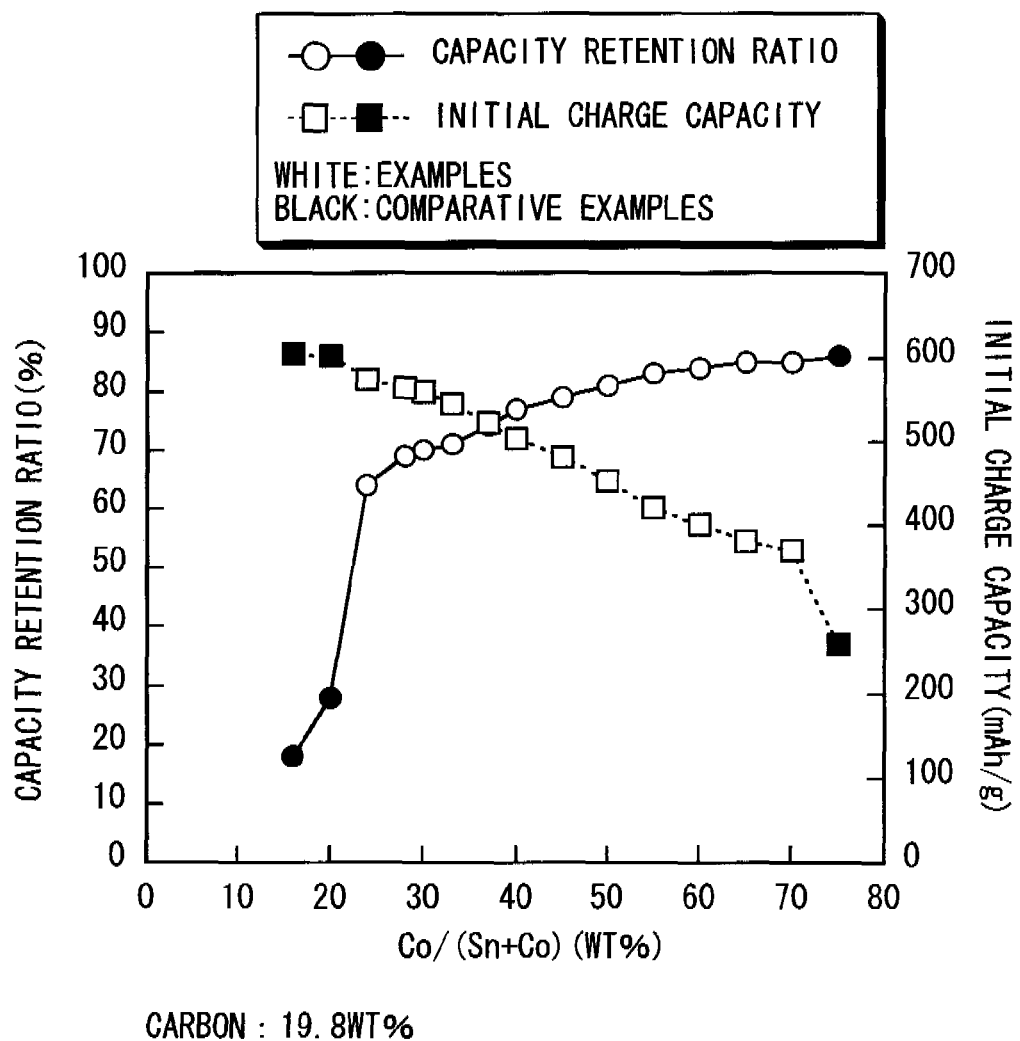
FIG. 19 is another characteristics diagram showing a relation between cobalt ratios to the total of tin and cobalt in anode active materials of the batteries according to the first embodiment (gel electrolyte) and capacity retention ratios/initial charge capacities.
Figure 20:
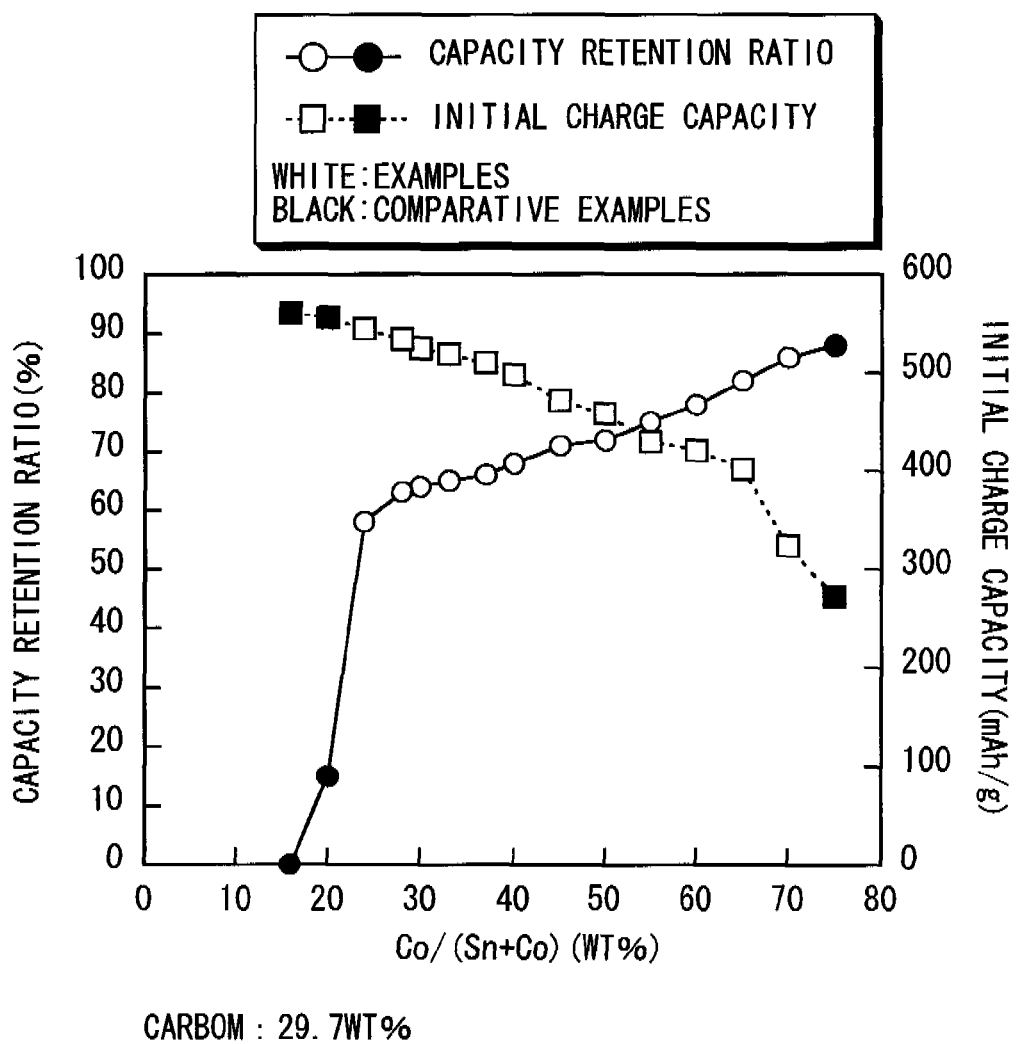
FIG. 20 is still another characteristics diagram showing a relation between cobalt ratios to the total of tin and cobalt in anode active materials of the batteries according to the first embodiment (gel electrolyte) and capacity retention ratios/initial charge capacities.

As evidenced by Table 18 to Table 20 and FIG. 18 to FIG. 20, results similar to those of Examples 2-1 to 2-11, 3-1 to 3-11, and 4-1 to 4-11 were obtained. That is, it was found that if the Co/(Sn+Co) ratio was in the range from 24 wt % to 70 wt %, even in the case that the gel electrolyte was used, the capacity and the cycle characteristics could be improved, and the Co/(Sn+Co) ration was preferably 60 wt % or less.

Examples 20-1 to 20-5

Anode active materials and secondary batteries were formed in the same manner as in Examples 16-1 to 16-7, except that the raw material ratio of carbon was set to the constant value of 20 wt %, the Co/(Sn+Co) ratio was set to the constant value of 37 wt %, and the raw material ratio of phosphorus was changed in the range from 0.1 wt % to 2.2 wt %, that is, the raw material ratios were similar to those of Examples 5-1 to 5-5. Further, as Comparative examples 20-1 to 20-3 relative to Examples 20-1 to 20-5, anode active materials and secondary batteries were formed in the same manner as in Examples 20-1 to 20-5, except that the raw material ratio of phosphorus was 0 wt %, 3 wt %, and 5 wt %, respectively, that is, the raw material ratios were similar to those of Comparative Examples 5-1 to 5-3.

TABLE 21

Co/(Sn + Co) = 37 wt %

| | Raw material ratio (wt %) | | | | Analytical value (wt %) | | | | Half-width (deg) | Initial charge capacity (mAh/g) | Initial charge and discharge efficiency (%) | 2 Cy. discharge capacity | 300 Cy. discharge capacity | Capacity retention ratio (%) |
|---|---|---|---|---|---|---|---|---|---|---|---|---|---|---|
| | Co | Sn | C | P | Co | Sn | C | P | | | | (mAh/cm³) | | |
| Example 20-1 | 29.6 | 50.3 | 20 | 0.1 | 29.3 | 49.8 | 19.8 | 0.1 | 4.9 | 505 | 81 | 113 | 79 | 70 |
| Example 20-2 | 29.4 | 50.1 | 20 | 0.5 | 29.1 | 49.6 | 19.8 | 0.5 | 5.2 | 514 | 82 | 115 | 84 | 73 |
| Example 20-3 | 29.2 | 49.8 | 20 | 1 | 28.9 | 49.3 | 19.8 | 1 | 5.4 | 519 | 82 | 116 | 85 | 73 |
| Example 16-5 | 29 | 49.5 | 20 | 1.5 | 28.8 | 49 | 19.8 | 1.5 | 5.6 | 522 | 82 | 116 | 86 | 74 |
| Example 20-4 | 28.9 | 49.1 | 20 | 2 | 28.6 | 48.6 | 19.8 | 2 | 5.7 | 526 | 82 | 116 | 86 | 74 |
| Example 20-5 | 28.8 | 49 | 20 | 2.2 | 28.5 | 48.5 | 19.8 | 2.2 | 5.8 | 530 | 81 | 117 | 88 | 75 |
| Comparative example 20-1 | 29.6 | 50.4 | 20 | 0 | 29.3 | 49.9 | 19.8 | 0 | 4.8 | 500 | 80 | 112 | 80 | 71 |
| Comparative example 20-2 | 28.5 | 48.5 | 20 | 3 | 28.2 | 48 | 19.8 | 3 | 5.9 | 535 | 80 | 117 | 88 | 75 |
| Comparative example 20-3 | 27.8 | 47.3 | 20 | 5 | 27.5 | 46.8 | 19.8 | 5 | 6.3 | 545 | 80 | 118 | 90 | 76 |

For the secondary batteries of Examples 20-1 to 20-5 and Comparative examples 20-1 to 20-3, the initial charge capacity, the initial charge and discharge efficiency, and the capacity retention ratio were examined in the same manner as in Examples 5-1 to 5-5. The results are shown in Table 21, FIG. 21, and FIG. 22.

Figure 22:
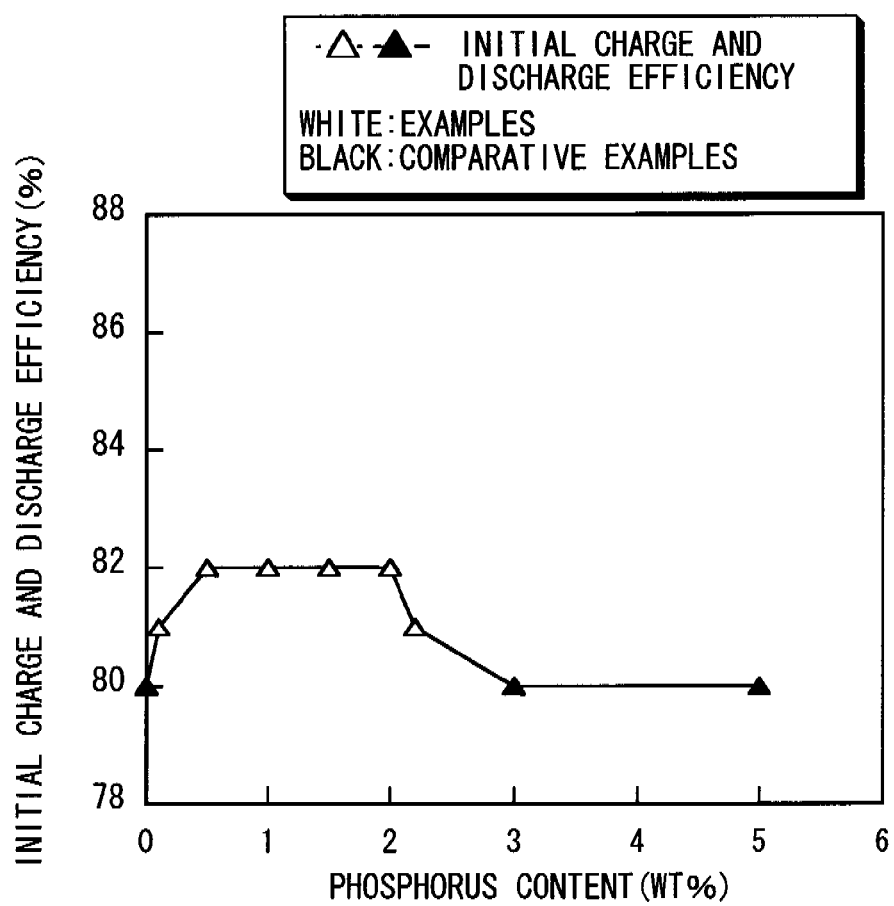
FIG. 22 is a characteristics diagram showing a relation between the phosphorus contents in the anode active materials of the batteries according to the first embodiment (gel electrolyte) and initial charge and discharge efficiencies.

As evidenced by Table 21, FIG. 21, and FIG. 22, results similar to those of Examples 5-1 to 5-5 were changed. That is, it was found that if the phosphorus content was in the range from 0.1 wt % to 2.2 wt %, the initial charge and discharge efficiency could be improved as well as the capacity and the cycle characteristics could, and the phosphorus content was more preferably in the range from 0.5 wt % to 2 wt %.

Examples 21-1 to 21-11

Anode active materials and secondary batteries were formed in the same manner as in Examples 16-1 to 16-7, except that, as shown in Table 22, the raw material ration of carbon was set to the constant value of 20 wt %, the raw material ration of phosphorus was set to the constant value of 1.5 wt %, and the raw material ration of silicon was changed in the range from 0.3 wt % to 10 wt %, that is, the raw material ratios were similar to those of Examples 8-1 to 8-11.

For the secondary batteries of Examples 21-1 to 21-11, the initial charge capacity and the capacity retention ratio were examined in the same manner as in Examples 16-1 to 16-7. The results are shown in Table 23.

TABLE 22

| | Raw material ratio (wt %) | | | | | | Analytical value (wt %) | | | | | |
|---|---|---|---|---|---|---|---|---|---|---|---|---|
| | Co | Sn | C | P | Si | Sn + Si | Co | Sn | C | P | Si | Sn + Si |
| Example 16-5 | 29 | 49.5 | 20 | 1.5 | 0 | 49.5 | 28.8 | 49 | 19.8 | 1.5 | 0 | 49 |
| Example 21-1 | 28.9 | 49.3 | 20 | 1.5 | 0.3 | 49.6 | 28.6 | 48.8 | 19.8 | 1.5 | 0.3 | 49.1 |
| Example 21-2 | 28.9 | 49.1 | 20 | 1.5 | 0.5 | 49.6 | 28.6 | 48.6 | 19.8 | 1.5 | 0.5 | 49.1 |
| Example 21-3 | 28.7 | 48.8 | 20 | 1.5 | 1 | 49.8 | 28.4 | 48.3 | 19.8 | 1.5 | 1 | 49.3 |
| Example 21-4 | 28.3 | 48.2 | 20 | 1.5 | 2 | 50.2 | 28 | 47.7 | 19.8 | 1.5 | 2 | 49.7 |
| Example 21-5 | 27.6 | 46.9 | 20 | 1.5 | 4 | 50.9 | 27.3 | 46.5 | 19.8 | 1.5 | 4 | 50.4 |
| Example 21-6 | 26.8 | 45.7 | 20 | 1.5 | 6 | 51.7 | 26.6 | 45.2 | 19.8 | 1.5 | 5.9 | 51.2 |
| Example 21-7 | 26.5 | 45 | 20 | 1.5 | 7 | 52 | 26.2 | 44.6 | 19.8 | 1.5 | 6.9 | 51.5 |
| Example 21-8 | 26.1 | 44.4 | 20 | 1.5 | 8 | 52.4 | 25.8 | 44 | 19.8 | 1.5 | 7.9 | 51.9 |
| Example 21-9 | 25.9 | 44.1 | 20 | 1.5 | 8.5 | 52.6 | 25.6 | 43.7 | 19.8 | 1.5 | 8.4 | 52.1 |
| Example 21-10 | 25.7 | 43.8 | 20 | 1.5 | 9 | 52.8 | 25.5 | 43.3 | 19.8 | 1.5 | 8.9 | 52.3 |
| Example 21-11 | 25.3 | 43.2 | 20 | 1.5 | 10 | 53.2 | 25.1 | 42.7 | 19.8 | 1.5 | 9.9 | 52.6 |

TABLE 23

| | Initial charge capacity (mAh/g) | 2 Cy. discharge capacity (mAh/cm$^3$) | 300 Cy. discharge capacity (mAh/cm$^3$) | Capacity retention ratio (%) |
|---|---|---|---|---|
| Example 16-5 | 522 | 116 | 76 | 74 |
| Example 21-1 | 525 | 116 | 80 | 74 |
| Example 21-2 | 530 | 117 | 78 | 72 |
| Example 21-3 | 552 | 118 | 79 | 71 |
| Example 21-4 | 562 | 119 | 78 | 69 |
| Example 21-5 | 575 | 120 | 75 | 67 |
| Example 21-6 | 601 | 122 | 75 | 67 |
| Example 21-7 | 611 | 125 | 75 | 66 |
| Example 21-8 | 623 | 127 | 69 | 60 |
| Example 21-9 | 634 | 128 | 48 | 45 |
| Example 21-10 | 661 | 131 | 27 | 30 |
| Example 21-11 | 691 | 134 | 14 | 16 |

As evidenced by Table 22 and Table 23, results similar to those of Examples 8-1 to 8-11 were obtained. That is, it was found that even in the case that the gel electrolyte was used, if the anode active material contained silicon, the capacity could be improved, and the silicon content was preferably in the range from 0.5 wt % to 7.9 wt %.

Exampls 22-1 to 22-12

Anode active materials and secondary batteries were formed in the same manner as in Examples 16-1 to 16-7, except that, as shown in Table 24, the raw material ration of carbon was set to the constant value of 20 wt %, the raw material ration of phosphorus was set to the constant value of 1.5 wt %, and the raw material ration of titanium was changed in the range from 0 wt % to 16 wt %, that is, the raw material ratios were similar to those of Examples 9-1 to 9-12.

TABLE 24

| | Raw material ratio (wt %) | | | | | Analytical value (wt %) | | | | | Initial charge capacity | 2 Cy. discharge capacity | 300 Cy. discharge capacity | Capacity retention ratio |
|---|---|---|---|---|---|---|---|---|---|---|---|---|---|---|
| | Co | Sn | C | P | Ti | Co | Sn | C | P | Ti | (mAh/g) | (mAh/cm$^3$) | | (%) |
| Example 22-1 | 27.5 | 51 | 20 | 1.5 | 0 | 27.2 | 50.5 | 19.8 | 1.5 | 0 | 522 | 116 | 86 | 74 |
| Example 22-2 | 27.2 | 50.5 | 20 | 1.5 | 0.8 | 26.9 | 50 | 19.8 | 1.5 | 0.8 | 535 | 116 | 88 | 76 |
| Example22-3 | 27 | 50.1 | 20 | 1.5 | 1.5 | 26.7 | 49.5 | 19.8 | 1.5 | 1.5 | 537 | 118 | 93 | 79 |
| Example 22-4 | 26.6 | 49.5 | 20 | 1.5 | 2.4 | 26.4 | 49 | 19.8 | 1.5 | 2.4 | 541 | 119 | 95 | 80 |
| Example 22-5 | 26.5 | 49.2 | 20 | 1.5 | 2.8 | 26.2 | 48.7 | 19.8 | 1.5 | 2.8 | 548 | 119 | 100 | 83 |
| Example 22-6 | 26.1 | 48.4 | 20 | 1.5 | 4 | 25.8 | 47.9 | 19.8 | 1.5 | 4 | 550 | 120 | 102 | 85 |
| Example 22-7 | 25.7 | 47.7 | 20 | 1.5 | 5.1 | 25.4 | 47.2 | 19.8 | 1.5 | 5 | 559 | 120 | 102 | 85 |
| Example 22-8 | 24.9 | 46.2 | 20 | 1.5 | 7.5 | 24.6 | 45.7 | 19.8 | 1.5 | 7.4 | 562 | 121 | 102 | 84 |
| Example 22-9 | 24 | 44.5 | 20 | 1.5 | 10 | 23.7 | 44.1 | 19.8 | 1.5 | 9.9 | 559 | 119 | 100 | 84 |
| Example 22-10 | 22.9 | 42.6 | 20 | 1.5 | 13 | 22.7 | 42.1 | 19.8 | 1.5 | 12.9 | 554 | 118 | 98 | 83 |
| Example 22-11 | 22.2 | 41.3 | 20 | 1.5 | 15 | 22 | 40.9 | 19.8 | 1.5 | 14.9 | 529 | 118 | 94 | 80 |
| Example 22-12 | 21.9 | 40.6 | 20 | 1.5 | 16 | 21.7 | 40.2 | 19.8 | 1.5 | 15.8 | 488 | 100 | 68 | 68 |

For the secondary batteries of Examples 22-1 to 22-12, the initial charge capacity and the capacity retention ratio were examined in the same manner as in Examples 16-1 to 16-7. The results are shown in Table 24 and FIG. 23.

Figure 23:
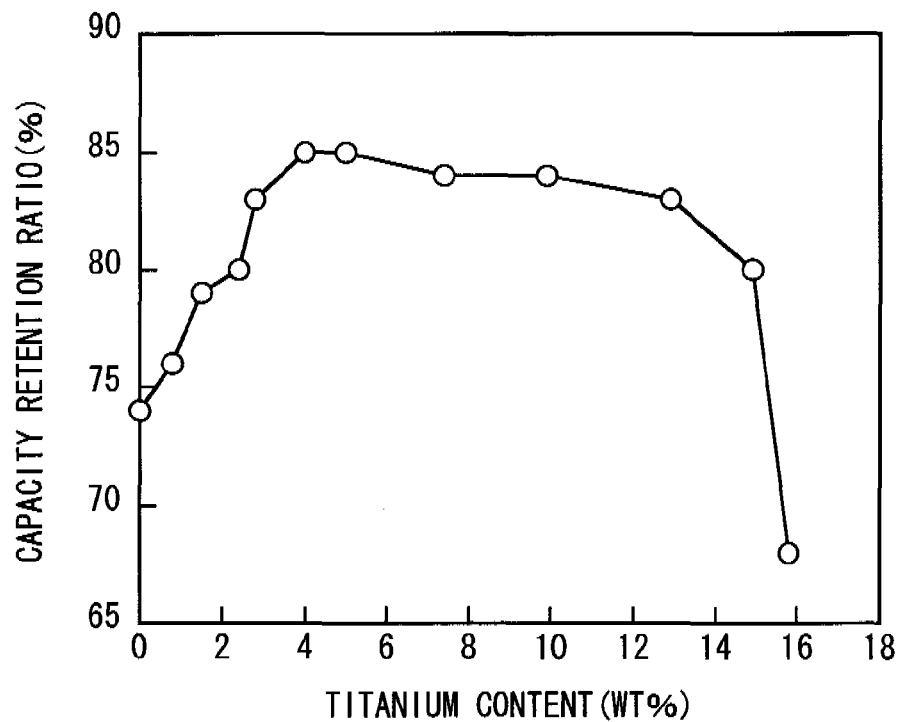
FIG. 23 is a characteristics diagram showing a relation between titanium contents in anode active materials of the batteries according to the first embodiment (gel electrolyte) and capacity retention ratios.

As evidenced by Table 24 and FIG. 23, results similar to those of Examples 9-1 to 9-12 were obtained. That is, it was found that even in the case that the gel electrolyte was used, if the anode active material contained titanium in the range of 14.9 wt % or lses, the cycle characteristics could be more improved. In addition, it was found that the titanium content was more preferably 1.5 wt % or more, and was much more preferably in the range from 2.8 wt % to 12.9 wt %.

Examples 23-1 to 23-3

Anode active materials and secondary batteries were formed in the same manner as in Example 16-5, except that FEC was added to the solvent of the electrolytic solution. The mixed solvent composition was respectively FEC:EC:PC=1: 10.5:11.5, 5:6.5:11.5, and 10:1.5:11.5 at a weight ratio.

For the secondary batteries of Examples 23-1 to 23-3, the capacity retention ratio was examined in the same manner as in Examples 16-1 to 16-7. The results are shown in Table 25.

TABLE 25

| | Raw material ratio (wt %) | | | | Analytical value (wt %) | | | | Solvent (wt %) | | | Capacity retention ratio (%) |
|---|---|---|---|---|---|---|---|---|---|---|---|---|
| | Co | Sn | C | P | Co | Sn | C | P | FEC | EC | PC | |
| Example 16-5 | 29 | 49.5 | 20 | 1.5 | 28.8 | 49 | 19.8 | 1.5 | 0 | 11.5 | 11.5 | 74 |
| Example 23-1 | 29 | 49.5 | 20 | 1.5 | 28.8 | 49 | 19.8 | 1.5 | 1 | 10.5 | 11.5 | 76 |
| Example 23-2 | 29 | 49.5 | 20 | 1.5 | 28.8 | 49 | 19.8 | 1.5 | 5 | 6.5 | 11.5 | 86 |
| Example 23-3 | 29 | 49.5 | 20 | 1.5 | 28.8 | 49 | 19.8 | 1.5 | 10 | 1.5 | 11.5 | 92 |

As evidenced by Table 25, in Examples 23-1 to 23-3 in which FEC was added to the solvent, the capacity retention ratio was more improved than that of Example 16-5 in which FEC was not added to the solvent. That is, it was found that if the solvent contained a cyclic ester carbonate having a halogen atom, the cycle characteristics could be more improved even when the gel electrolyte was used.

2. Next, a description will be given of examples for the anode active material of the second embodiment and the battery using it, in the order of a case using a liquid electrolyte (electrolytic solution) and a case using a gel electrolyte.

2-1. Case Using Liquid Electrolyte (Electrolytic Solution)

Examples 24-1 to 24-7

Anode active materials and secondary batteries were formed in the same manner as in Examples 1-1 to 1-7, except that iron powder was further used as a raw material, and the raw material ratios of cobalt, tin, carbon, phosphorus, and iron were changed as shown in Table 26. Specifically, the raw material ratio of phosphorus was set to the constant value of 1.5 wt %, the raw material ratio of iron was set to the constant value of 0.8 wt %, the Co/(Sn+Co) ratio was set to the constant value of 37 wt %, and the raw material ratio of carbon was changed in the range from 10 wt % to 30 wt %. When the anode active material was formed, as raw materials, cobalt powder, tin powder, carbon powder, phosphorus powder, and iron powder were prepared. The cobalt powder, the tin powder, and the iron powder were alloyed to obtain cobalt-tin-iron alloy powder, and then the carbon powder and the phosphorus powder were added to the foregoing alloy powder, and the resultant was dry-mixed.

For the obtained anode active materials, the composition thereof was analyzed. The analytical values are shown in Table 26. Further, when X-ray diffraction was performed for the anode active materials, the diffraction peak having the wide half-width in the range of 2θ=from 20 to 50 degrees was observed. The half-width of the diffraction peak is also shown in Table 26. Further, when XPS was performed, Peak P1 to Peak P3 shown in FIG. 6 were obtained. That is, it was confirmed that for all Examples 24-1 to 24-7, the carbon in the anode active material was bonded to other element.

TABLE 26

| | Co/(Sn + Co) = 37 wt % | | | | | | | | | | | | | |
|---|---|---|---|---|---|---|---|---|---|---|---|---|---|---|
| | Raw material ratio (wt %) | | | | | Analytical value (wt %) | | | | | Half-width | Initial charge capacity | 2 Cy. discharge capacity | 300 Cy. discharge capacity | Capacity retention ratio |
| | Co | Sn | C | P | Fe | Co | Sn | C | P | Fe | (deg) | (mAh/g) | (mAh/cm³) | | (%) |
| Example 24-1 | 32.4 | 55.3 | 10 | 1.5 | 0.8 | 32.1 | 54.7 | 9.9 | 1.5 | 0.8 | 4.2 | 517 | 124 | 87 | 70 |
| Example 24-2 | 31.7 | 54 | 12 | 1.5 | 0.8 | 31.4 | 53.5 | 11.9 | 1.5 | 0.8 | 4.6 | 522 | 130 | 92 | 71 |
| Example 24-3 | 30.6 | 52.1 | 15 | 1.5 | 0.8 | 30.3 | 51.6 | 14.9 | 1.5 | 0.8 | 5.1 | 532 | 134 | 96 | 72 |
| Example 24-4 | 29.9 | 50.8 | 17 | 1.5 | 0.8 | 29.6 | 50.3 | 16.8 | 1.5 | 0.8 | 5.3 | 538 | 139 | 107 | 77 |
| Example 24-5 | 28.7 | 49 | 20 | 1.5 | 0.8 | 28.5 | 48.5 | 19.8 | 1.5 | 0.8 | 5.6 | 542 | 141 | 111 | 79 |
| Example 24-6 | 26.9 | 45.8 | 25 | 1.5 | 0.8 | 26.6 | 45.3 | 24.8 | 1.5 | 0.8 | 5.7 | 543 | 140 | 109 | 78 |
| Example 24-7 | 25 | 42.7 | 30 | 1.5 | 0.8 | 24.8 | 42.2 | 29.7 | 1.5 | 0.8 | 5.8 | 527 | 130 | 94 | 72 |
| Comparative example 24-1 | 36.7 | 62.5 | 0 | 0 | 0.8 | 36.3 | 61.9 | 0 | 0 | 0.8 | 0.2 | 447 | 86 | 0 | 0 |
| Comparative example 24-2 | 36.1 | 61.6 | 0 | 1.5 | 0.8 | 35.8 | 60.9 | 0 | 1.5 | 0.8 | 0.4 | 467 | 89 | 0 | 0 |
| Comparative example 24-3 | 35.8 | 60.9 | 1 | 1.5 | 0.8 | 35.4 | 60.3 | 1 | 1.5 | 0.8 | 0.6 | 470 | 93 | 0 | 0 |
| Comparative example 24-4 | 34.3 | 58.4 | 5 | 1.5 | 0.8 | 34 | 57.8 | 5 | 1.5 | 0.8 | 2.1 | 492 | 100 | 0 | 0 |
| Comparative example 24-5 | 33.2 | 56.5 | 8 | 1.5 | 0.8 | 32.9 | 55.9 | 7.9 | 1.5 | 0.8 | 3.1 | 506 | 113 | 19 | 17 |
| Comparative example 24-6 | 21.3 | 36.4 | 40 | 1.5 | 0.8 | 21.1 | 36 | 39.6 | 1.5 | 0.8 | 5.8 | 477 | 95 | 22 | 23 |
| Comparative example 24-7 | 17.6 | 30.1 | 50 | 1.5 | 0.8 | 17.5 | 29.8 | 49.5 | 1.5 | 0.8 | 5.8 | 427 | 78 | 10 | 13 |
| Comparative example 24-8 | 15.8 | 26.9 | 55 | 1.5 | 0.8 | 15.6 | 26.6 | 54.5 | 1.5 | 0.8 | 5.8 | 397 | 74 | 7 | 10 |

Next, the coin type secondary battery shown in FIG. 7 was fabricated in the same manner as in Examples 1-1 to 1-7 by using the anode active material powder of Examples 24-1 to 24-7, and the initial charge capacity was examined. The results are shown in Table 26 and FIG. 24.

Further, the cylindrical type secondary batteries shown in FIG. 1 and FIG. 2 was fabricated in the same manner as in Examples 1-1 to 1-7 by using the anode active material powder of Examples 24-1 to 24-7. For the obtained secondary batteries, the capacity retention ratio was examined. The results are shown in Table 26 and FIG. 24.

As Comparative example 24-1 relative to Examples 24-1 to 24-7, an anode active material and a secondary battery were formed in the same manner as in Examples 24-1 to 24-7, except that the carbon powder and the phosphorus powder were not used as a raw material. Further, as Comparative example 24-2, an anode active material and a secondary battery were formed in the same manner as in Examples 24-1 to 24-7, except that only the carbon powder was not used. Further, as Comparative examples 24-3 to 24-8, anode active materials and secondary batteries were formed in the same manner as in Examples 24-1 to 24-7, except that the raw material ratio of carbon was changed as shown in Table 26. For the anode active materials of Comparative examples 24-1 to 24-8, the composition thereof was analyzed, and the half-width was measured in the same manner as in Examples 24-1 to 24-7. The results are shown in Table 26. Further, when XPS was performed, in Comparative examples 24-4 to 24-8, Peak P1 to Peak P3 shown in FIG. 6 were obtained, and it was confirmed that at least part of carbon contained in the anode active material was bonded to other element. Meanwhile, in Comparative examples 24-1 and 24-2, peak P4 (P2) shown in FIG. 9 was obtained. In Comparative example 24-3, only Peak P2 was obtained, and Peak P3 was hardly detected.

For the secondary batteries of Comparative examples 24-1 to 24-8, the initial charge capacity and the capacity retention ratio were examined in the same manner as in Examples 1-1 to 1-7. The results are shown in Table 26 and FIG. 24.

Figure 24:
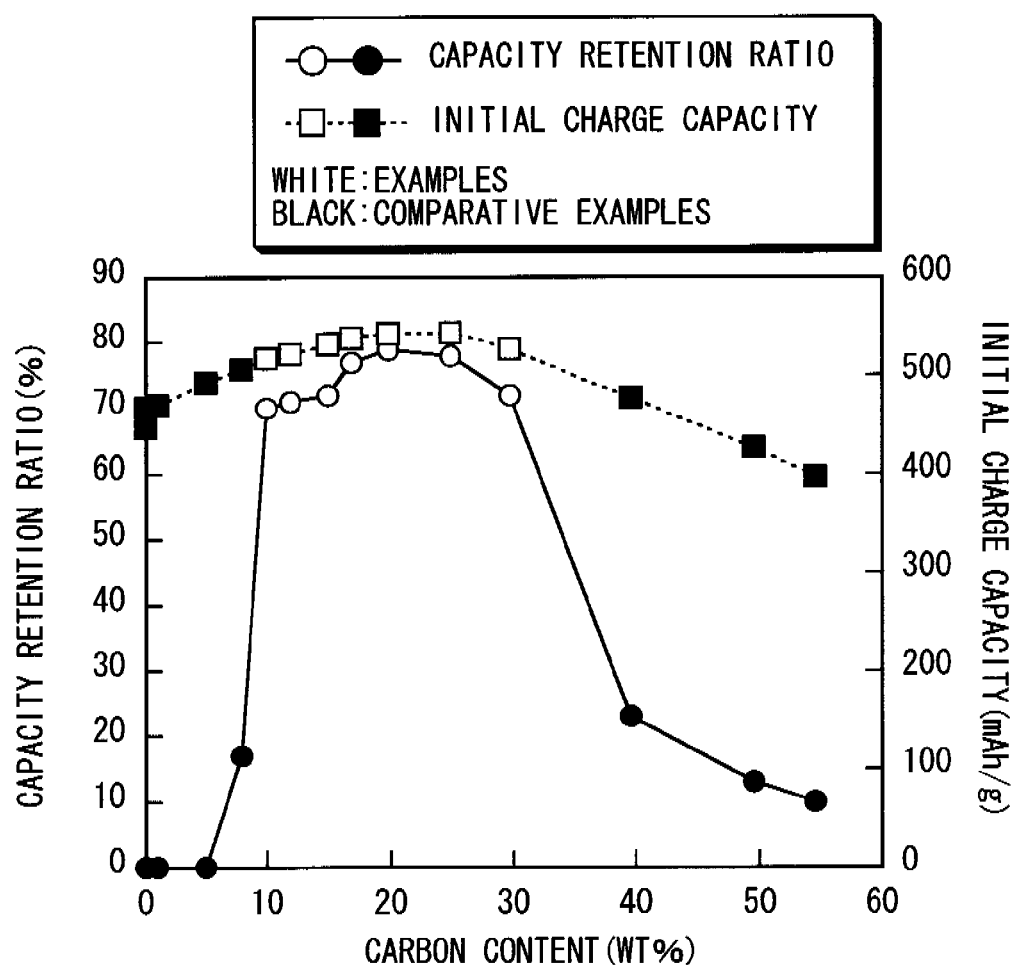
FIG. 24 is a characteristics diagram showing a relation between carbon contents in anode active materials of batteries according to a second embodiment (liquid electrolyte) and capacity retention ratios/initial charge capacities.

As evidenced by Table 26 and FIG. 24, in Examples 24-1 to 24-7 in which the carbon content in the anode active material was in the range from 9.9 wt % to 29.7 wt %, the capacity retention ratio thereof was improved more outstandingly than that of Comparative examples 24-1 to 24-8 in which the carbon content was out of the range. In this case, the initial charge capacity and the discharge capacity were improved as well.

Further, if the carbon content was in the range from 14.9 wt % to 29.7 wt %, and more particularly in the range from 16.8 wt % to 24.8 wt %, higher values were obtained.

That is, it was found that if the carbon content was in the range from 9.9 wt % to 29.7 wt %, the capacity and the cycle characteristics could be improved. It was also found that the carbon content was preferably in the range from 14.9 wt % to 29.7 wt %, and was more preferably in the range from 16.8 wt % to 24.8 wt %

Examples 25-1 to 25-11

Anode active materials and secondary batteries were formed in the same manner as in Example 24-1 to 24-7, except that the raw material ratios of cobalt, tin, carbon, phosphorus, and iron were changed as shown in Table 27. Specifically, the raw material ratio of carbon was set to the constant value of 10 wt %, the raw material ratio of phosphorus was set to the constant value of 1.5 wt %, the raw material ratio of iron was set to the constant value of 0.8 wt %, and the Co/(Sn+Co) ratio was changed in the range from 24 wt % to 70 wt %.
if anode active material was bonded to other element. Further, for the secondary batteries, the initial charge capacity and the capacity retention ratio were examined in the same manner as in Examples 24-1 to 24-7. The results are shown in Table 27 and FIG. 25.

Figure 25:
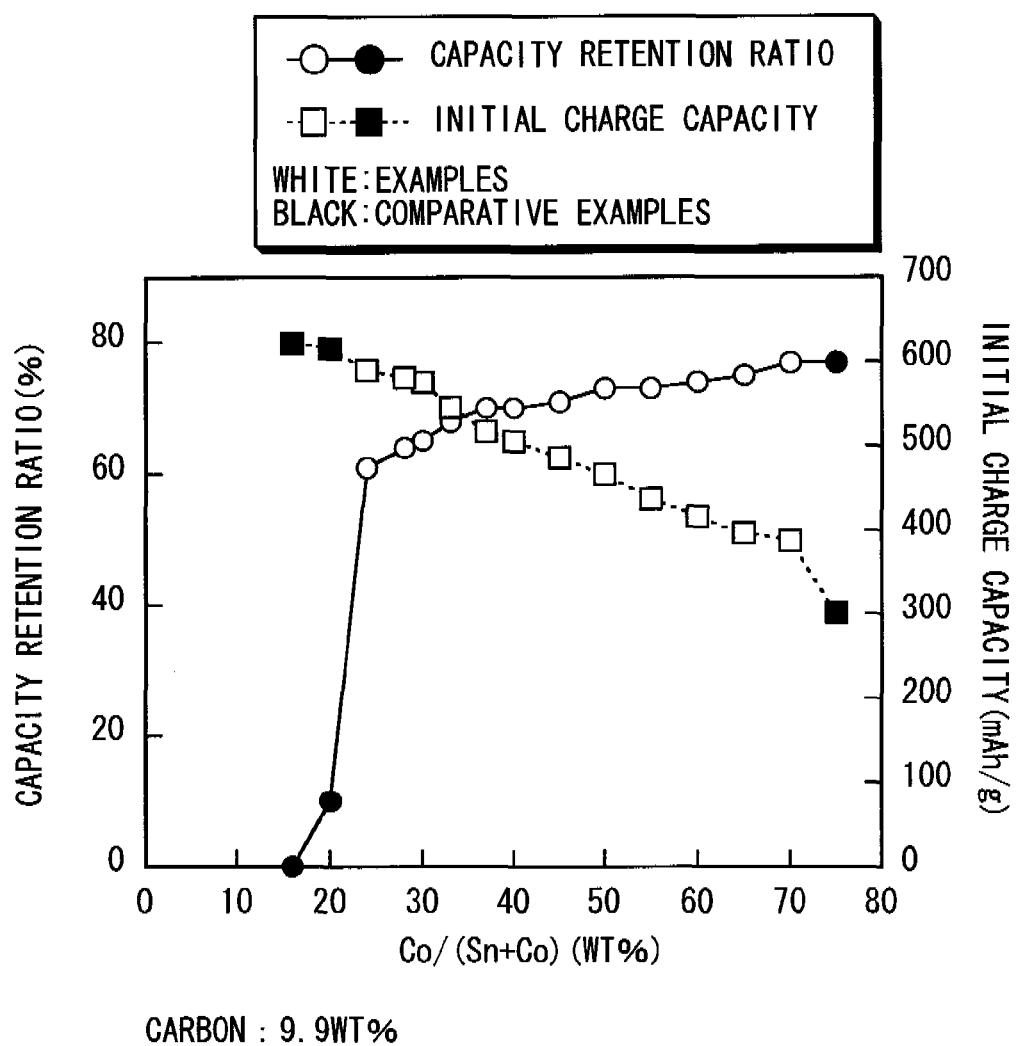
FIG. 25 is a characteristics diagram showing a relation between cobalt ratios to the total of tin and cobalt in anode active materials of the batteries according to the second embodiment (liquid electrolyte) and capacity retention ratios/initial charge capacities.

As evidenced by Table 27 and FIG. 25, in Examples 25-1 to 25-11 in which the Co/(Sn+Co) ratio was in the range from 24 wt % to 70 wt %, the initial charge capacity was more outstandingly improved than that of Comparative example 25-1 in which the Co/(Sn+Co) ratio was over 70 wt %, and the capacity retention ratio was more outstandingly improved than that of Comparative examples 25-2 and 25-3 in which the Co/(Sn+Co) ratio was under 24 wt %. In particular, if the Co/(Sn+Co) ratio was 60 wt % or less, a high initial charge capacity was obtained.

TABLE 27

|  | Raw material ratio (wt %) | | | | | Analytical value (wt %) | | | | | Co/(Sn + Co) | Half-width | Initial charge capacity | 2 Cy. discharge capacity | 300 Cy. discharge capacity | Capacity retention ratio |
| --- | --- | --- | --- | --- | --- | --- | --- | --- | --- | --- | --- | --- | --- | --- | --- | --- |
|  | Co | Sn | C | P | Fe | Co | Sn | C | P | Fe | (wt %) | (deg) | (mAh/g) | (mAh/cm$^3$) | | (%) |
| Example 25-1 | 61.4 | 26.3 | 10 | 1.5 | 0.8 | 60.8 | 26 | 9.9 | 1.5 | 0.8 | 70 | 4.5 | 388 | 97 | 75 | 77 |
| Example 25-2 | 57 | 30.7 | 10 | 1.5 | 0.8 | 56.4 | 30.4 | 9.9 | 1.5 | 0.8 | 65 | 4.5 | 397 | 101 | 76 | 75 |
| Example 25-3 | 52.6 | 35.1 | 10 | 1.5 | 0.8 | 52.1 | 34.7 | 9.9 | 1.5 | 0.8 | 60 | 4.5 | 416 | 103 | 76 | 74 |
| Example 25-4 | 48.2 | 39.5 | 10 | 1.5 | 0.8 | 47.8 | 39.1 | 9.9 | 1.5 | 0.8 | 55 | 4.4 | 437 | 106 | 77 | 73 |
| Example 25-5 | 43.9 | 43.9 | 10 | 1.5 | 0.8 | 43.4 | 43.4 | 9.9 | 1.5 | 0.8 | 50 | 4.3 | 466 | 108 | 79 | 73 |
| Example 25-6 | 39.5 | 48.2 | 10 | 1.5 | 0.8 | 39.1 | 47.8 | 9.9 | 1.5 | 0.8 | 45 | 4.3 | 486 | 114 | 81 | 71 |
| Example 25-7 | 35.1 | 52.6 | 10 | 1.5 | 0.8 | 34.7 | 52.1 | 9.9 | 1.5 | 0.8 | 40 | 4.2 | 505 | 119 | 83 | 70 |
| Example 24-1 | 32.4 | 55.3 | 10 | 1.5 | 0.8 | 32.1 | 54.7 | 9.9 | 1.5 | 0.8 | 37 | 4.2 | 517 | 124 | 87 | 70 |
| Example 25-8 | 28.9 | 58.8 | 10 | 1.5 | 0.8 | 28.7 | 58.2 | 9.9 | 1.5 | 0.8 | 33 | 4.2 | 545 | 125 | 85 | 68 |
| Example 25-9 | 26.3 | 61.4 | 10 | 1.5 | 0.8 | 26 | 60.8 | 9.9 | 1.5 | 0.8 | 30 | 4.2 | 575 | 126 | 82 | 65 |
| Example 25-10 | 24.6 | 63.1 | 10 | 1.5 | 0.8 | 24.3 | 62.5 | 9.9 | 1.5 | 0.8 | 28 | 4.1 | 580 | 126 | 81 | 64 |
| Example 25-11 | 21 | 66.7 | 10 | 1.5 | 0.8 | 20.8 | 66 | 9.9 | 1.5 | 0.8 | 24 | 4 | 590 | 120 | 73 | 61 |
| Comparative example 25-1 | 65.8 | 21.9 | 10 | 1.5 | 0.8 | 65.1 | 21.7 | 9.9 | 1.5 | 0.8 | 75 | 4.5 | 302 | 72 | 55 | 77 |
| Comparative example 25-2 | 17.5 | 70.2 | 10 | 1.5 | 0.8 | 17.4 | 69.5 | 9.9 | 1.5 | 0.8 | 20 | 3 | 615 | 111 | 11 | 10 |
| Comparative example 25-3 | 14 | 73.7 | 10 | 1.5 | 0.8 | 13.9 | 72.9 | 9.9 | 1.5 | 0.8 | 16 | 2.5 | 621 | 100 | 0 | 0 |

As Comparative examples 25-1 to 25-3 relative to Examples 25-1 to 25-11, anode active materials and secondary batteries were formed in the same manner as in Examples 25-1 to 25-11. except that the Co/(Sn+Co) ratio was changed as shown in Table 27. Specifically, the Co/(Sn+Co) ratio in Comparative examples 25-1 to 25-3 was respectively 75 wt %, 20 wt %, and 16 wt %.

For the anode active materials of Examples 25-1 to 25-11 and Comparative examples 25-1 to 25-3. the composition thereof was analyzed and the half-width was measured in the same manner as in Examples 24-1 to 24-7. The results are shown in Table 27. Further, when XPS was performed and the obtained peak was analyzed, as in Examples 24-1 to 24-7, Peak P2 and peak P3 were obtained, and for all examples, peak P3 was obtained in the region lower than 284.5 eV. That is, it was confirmed that at least part of carbon contained in the That is, it was found that if the Co/(Sn+Co) ratio was from 24 wt % to 70 wt %, the capacity and the cycle characteristics could be improved. It was also found that the Co/(Sn+Co) ration was more preferably 60 wt % or less.

Examples 26-1 to 26-11

Anode active materials and secondary batteries were formed in the same manner as in Examples 24-1 to 24-7, except that the raw material rations of cobalt, tin, carbon, phosphorus, and iron were changed as shown in Table 28. Specifically, the raw material ratio of carbon was set to the constant value of 20 wt %, the raw material ratio of phosphorus was set to the constant value of 1.5 wt %, the raw material ratio of iron was set to the constant value of 0.8 wt %, and the Co/(Sn+Co) ratio was changed in the range from 24 wt % to 70 wt %.

TABLE 28

| | Raw material ratio (wt %) | | | | | Analytical value (wt %) | | | | | Co/(Sn + Co) (wt %) | Half-width (deg) | Initial charge capacity (mAh/g) | 2 Cy. discharge capacity (mAh/cm³) | 300 Cy. discharge capacity (mAh/cm³) | Capacity retention ratio (%) |
|---|---|---|---|---|---|---|---|---|---|---|---|---|---|---|---|---|
| | Co | Sn | C | P | Fe | Co | Sn | C | P | Fe | | | | | | |
| Example 26-1 | 54.4 | 23.3 | 20 | 1.5 | 0.8 | 53.8 | 23.1 | 19.8 | 1.5 | 0.8 | 70 | 5.8 | 387 | 99 | 88 | 89 |
| Example 26-2 | 50.5 | 27.2 | 20 | 1.5 | 0.8 | 50 | 26.9 | 19.8 | 1.5 | 0.8 | 65 | 5.8 | 397 | 101 | 87 | 86 |
| Example 26-3 | 46.6 | 31.1 | 20 | 1.5 | 0.8 | 46.2 | 30.8 | 19.8 | 1.5 | 0.8 | 60 | 5.7 | 417 | 107 | 94 | 88 |
| Example 26-4 | 42.7 | 35 | 20 | 1.5 | 0.8 | 42.3 | 34.6 | 19.8 | 1.5 | 0.8 | 55 | 5.7 | 437 | 113 | 97 | 86 |
| Example 26-5 | 38.9 | 38.9 | 20 | 1.5 | 0.8 | 38.5 | 38.5 | 19.8 | 1.5 | 0.8 | 50 | 5.7 | 467 | 119 | 100 | 84 |
| Example 26-6 | 35 | 42.7 | 20 | 1.5 | 0.8 | 34.6 | 42.3 | 19.8 | 1.5 | 0.8 | 45 | 5.6 | 467 | 129 | 103 | 80 |
| Example 26-7 | 31.1 | 46.6 | 20 | 1.5 | 0.8 | 30.8 | 46.2 | 19.8 | 1.5 | 0.8 | 40 | 5.6 | 522 | 134 | 106 | 79 |
| Example 24-5 | 28.7 | 49 | 20 | 1.5 | 0.8 | 28.5 | 48.5 | 19.8 | 1.5 | 0.8 | 37 | 5.6 | 542 | 141 | 111 | 79 |
| Example 26-8 | 25.6 | 52.1 | 20 | 1.5 | 0.8 | 25.4 | 51.5 | 19.8 | 1.5 | 0.8 | 33 | 5.6 | 562 | 142 | 105 | 74 |
| Example 26-9 | 23.3 | 54.4 | 20 | 1.5 | 0.8 | 23.1 | 53.8 | 19.8 | 1.5 | 0.8 | 30 | 5.5 | 576 | 143 | 104 | 73 |
| Example 26-10 | 21.8 | 55.9 | 20 | 1.5 | 0.8 | 21.5 | 55.4 | 19.8 | 1.5 | 0.8 | 28 | 5.4 | 581 | 144 | 104 | 72 |
| Example 26-11 | 18.6 | 59.1 | 20 | 1.5 | 0.8 | 18.5 | 58.5 | 19.8 | 1.5 | 0.8 | 24 | 5.3 | 591 | 145 | 97 | 67 |
| Comparative example 26-1 | 58.3 | 19.4 | 20 | 1.5 | 0.8 | 57.7 | 19.2 | 19.8 | 1.5 | 0.8 | 75 | 5.8 | 276 | 67 | 60 | 90 |
| Comparative example 26-2 | 15.5 | 62.2 | 20 | 1.5 | 0.8 | 15.4 | 61.5 | 19.8 | 1.5 | 0.8 | 20 | 5 | 615 | 128 | 38 | 30 |
| Comparative example 26-3 | 12.4 | 65.3 | 20 | 1.5 | 0.8 | 12.3 | 64.6 | 19.8 | 1.5 | 0.8 | 16 | 4.6 | 622 | 100 | 20 | 20 |

As Comparative examples 26-1 to 26-3 relative to Examples 26-1 to 26-11, anode active materials and secondary batteries were formed in the same manner as in Examples 26-1 to 26-11, except that the Co/(Sn+Co) ratio was changed as shown in Table 28. Specifically, the Co/(Sn+Co) ratio in Comparative examples 26-1 to 26-3 was respectively 75 wt %, 20 wt %, and 16 wt %.

For the anode active materials of Examples 26-1 to 26-11 and Comparative examples 26-1 to 26-3, the composition thereof was analyzed and the half-width was measured in the same manner as in Examples 24-1 to 24-7. The results are shown in Table 28. Further, when XPS was performed and the obtained peak was analyzed, as in Examples 24-1 to 24-7, Peak P2 and peak P3 were obtained, and for all examples, peak P3 was obtained in the region lower than 284.5 eV. That is, it was confirmed that at least part of carbon contained in the anode active material was bonded to other element. Further, for the secondary batteries, the initial charge capacity and the capacity retention ratio were examined in the same manner as in Examples 24-1 to 24-7. The results are shown in Table 28 and FIG. 26.

Figure 26:
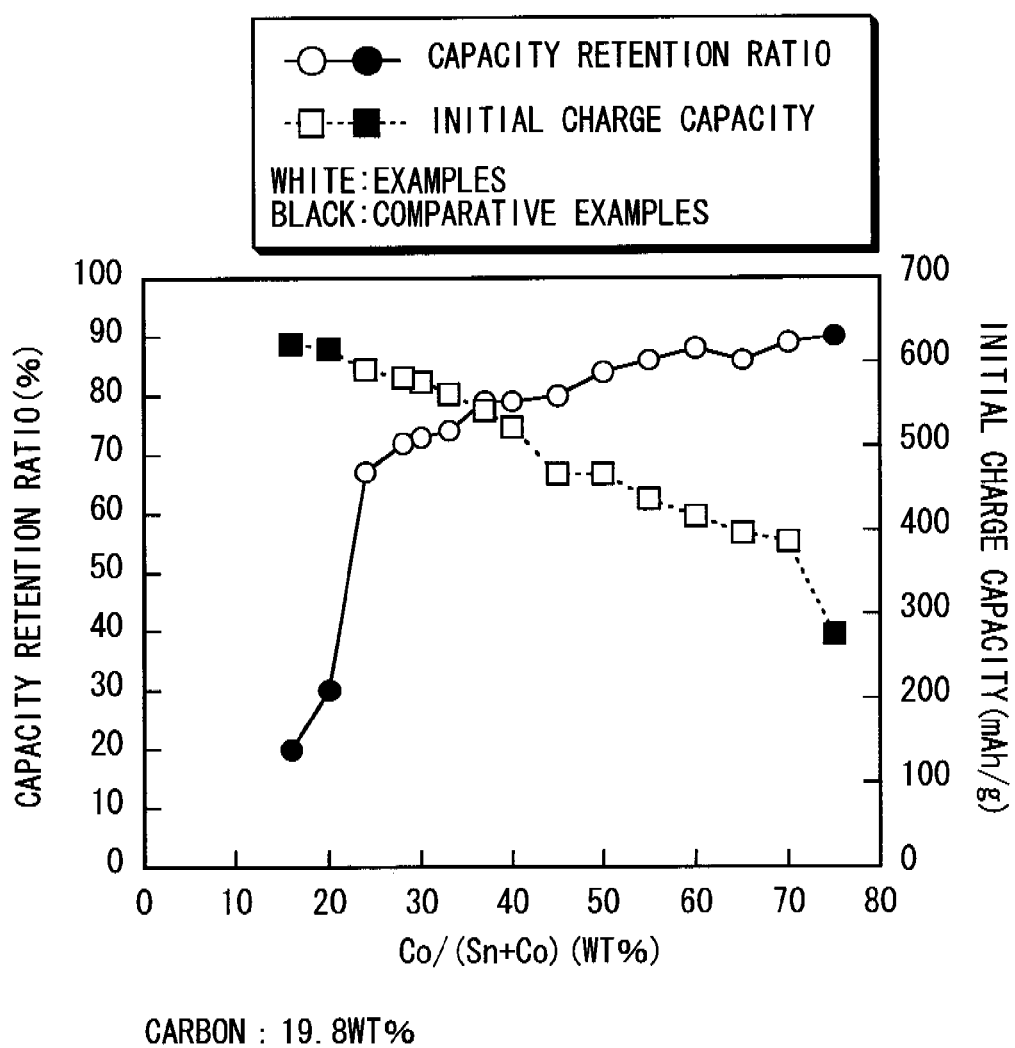
FIG. 26 is another characteristics diagram showing a relation between cobalt ratios to the total of tin and cobalt in anode active materials of the batteries according to the second embodiment (liquid electrolyte) and capacity retention ratios/initial charge capacities.

As evidenced by Table 28 and FIG. 26, results similar to those of Examples 25-1 to 25-11 were obtained. That is, it was found that if the Co/(Sn+Co) ratio was from 24 wt % to 70 wt %, the capacity and the cycle characteristics could be improved even in the case that the carbon content was 19.8 wt %.

Examples 27-1 to 27-11

Anode active materials and secondary batteries were formed in the same manner as in Examples 24-1 to 24-7, except that the raw material rations of cobalt, tin, carbon, phosphorus, and iron were changed as shown in Table 29. Specifically, the raw material ratio of carbon was set to the constant value of 30 wt %, the raw material ratio of phosphorus was set to the constant value of 1.5 wt %, the raw material ratio of iron was set to the constant value of 0.8 wt %, and the Co/(Sn+Co) ratio was changed in the range from 24 wt % to 70 wt %.

TABLE 29

| | Raw material ratio (wt %) | | | | | Analytical value (wt %) | | | | | Co/(Sn + Co) (wt %) | Half-width (deg) | Initial charge capacity (mAh/g) | 2 Cy. discharge capacity (mAh/cm³) | 300 Cy. discharge capacity (mAh/cm³) | Capacity retention ratio (%) |
|---|---|---|---|---|---|---|---|---|---|---|---|---|---|---|---|---|
| | Co | Sn | C | P | Fe | Co | Sn | C | P | Fe | | | | | | |
| Example 27-1 | 47.4 | 20.3 | 30 | 1.5 | 0.8 | 46.9 | 20.1 | 29.7 | 1.5 | 0.8 | 70 | 6.4 | 341 | 83 | 73 | 88 |
| Example 27-2 | 44 | 23.7 | 30 | 1.5 | 0.8 | 43.6 | 23.5 | 29.7 | 1.5 | 0.8 | 65 | 6.3 | 419 | 106 | 89 | 84 |
| Example 27-3 | 40.6 | 27.1 | 30 | 1.5 | 0.8 | 40.2 | 26.8 | 29.7 | 1.5 | 0.8 | 60 | 6.2 | 438 | 112 | 90 | 80 |
| Example 27-4 | 37.2 | 30.5 | 30 | 1.5 | 0.8 | 36.9 | 30.2 | 29.7 | 1.5 | 0.8 | 55 | 6.1 | 446 | 118 | 91 | 77 |

TABLE 29-continued

|  | Raw material ratio (wt %) | | | | | Analytical value (wt %) | | | | | Co/(Sn + Co) (wt %) | Half-width (deg) | Initial charge capacity (mAh/g) | 2 Cy. discharge capacity (mAh/cm³) | 300 Cy. discharge capacity | Capacity retention ratio (%) |
|---|---|---|---|---|---|---|---|---|---|---|---|---|---|---|---|---|
|  | Co | Sn | C | P | Fe | Co | Sn | C | P | Fe |  |  |  |  |  |  |
| Example 27-5 | 33.9 | 33.9 | 30 | 1.5 | 0.8 | 33.5 | 33.5 | 29.7 | 1.5 | 0.8 | 50 | 6 | 475 | 123 | 91 | 74 |
| Example 27-6 | 30.5 | 37.2 | 30 | 1.5 | 0.8 | 30.2 | 36.9 | 29.7 | 1.5 | 0.8 | 45 | 5.9 | 488 | 125 | 91 | 73 |
| Example 27-7 | 27.1 | 40.6 | 30 | 1.5 | 0.8 | 26.8 | 40.2 | 29.7 | 1.5 | 0.8 | 40 | 5.9 | 516 | 128 | 92 | 72 |
| Example 24-7 | 25 | 42.7 | 30 | 1.5 | 0.8 | 24.8 | 42.2 | 29.7 | 1.5 | 0.8 | 37 | 5.8 | 527 | 130 | 94 | 72 |
| Example 27-8 | 22.3 | 45.4 | 30 | 1.5 | 0.8 | 22.1 | 44.9 | 29.7 | 1.5 | 0.8 | 33 | 5.8 | 536 | 133 | 90 | 68 |
| Example 27-9 | 20.3 | 47.4 | 30 | 1.5 | 0.8 | 20.1 | 46.9 | 29.7 | 1.5 | 0.8 | 30 | 5.7 | 542 | 135 | 90 | 67 |
| Example 27-10 | 19 | 48.7 | 30 | 1.5 | 0.8 | 18.8 | 48.3 | 29.7 | 1.5 | 0.8 | 28 | 5.7 | 551 | 136 | 88 | 65 |
| Example 27-11 | 16.2 | 51.5 | 30 | 1.5 | 0.8 | 16.1 | 50.9 | 29.7 | 1.5 | 0.8 | 24 | 5.6 | 562 | 136 | 83 | 61 |
| Comparative example 27-1 | 50.8 | 16.9 | 30 | 1.5 | 0.8 | 50.3 | 16.8 | 29.7 | 1.5 | 0.8 | 75 | 6.5 | 288 | 69 | 62 | 90 |
| Comparative example 27-2 | 13.5 | 54.2 | 30 | 1.5 | 0.8 | 13.4 | 53.6 | 29.7 | 1.5 | 0.8 | 20 | 4.9 | 569 | 115 | 25 | 22 |
| Comparative example 27-3 | 10.8 | 56.9 | 30 | 1.5 | 0.8 | 10.7 | 56.3 | 29.7 | 1.5 | 0.8 | 16 | 4.6 | 578 | 92 | 0 | 0 |

As Comparative examples 27-1 to 27-3 relative to Examples 27-1 to 27-11, anode active materials and secondary batteries were formed in the same manner as in Examples 27-1 to 27-11, except that the Co/(Sn+Co) ratio was changed as shown in Table 29. Specifically, the Co/(Sn+Co) ratio in Comparative examples 27-1 to 27-3 was respectively 75 wt %, 20 wt %, and 16 wt %.

For the anode active materials of Examples 27-1 to 27-11 and Comparative examples 27-1 to 27-3, the composition thereof was analyzed and the half-width was measured in the same manner as in Examples 24-1 to 24-7. The results are shown in Table 29. Further, when XPS was performed and the obtained peak was analyzed, as in Examples 24-1 to 24-7, Peak P2 and peak P3 were obtained, and for all examples, peak P3 was obtained in the region lower than 284.5 eV. That is, it was confirmed that at least part of carbon contained in the anode active material was bonded to other element. Further, for the secondary batteries, the initial charge capacity and the cycle characteristics were examined in the same manner as in Examples 24-1 to 24-7. The results are shown in Table 29 and FIG. 27.

Figure 27:
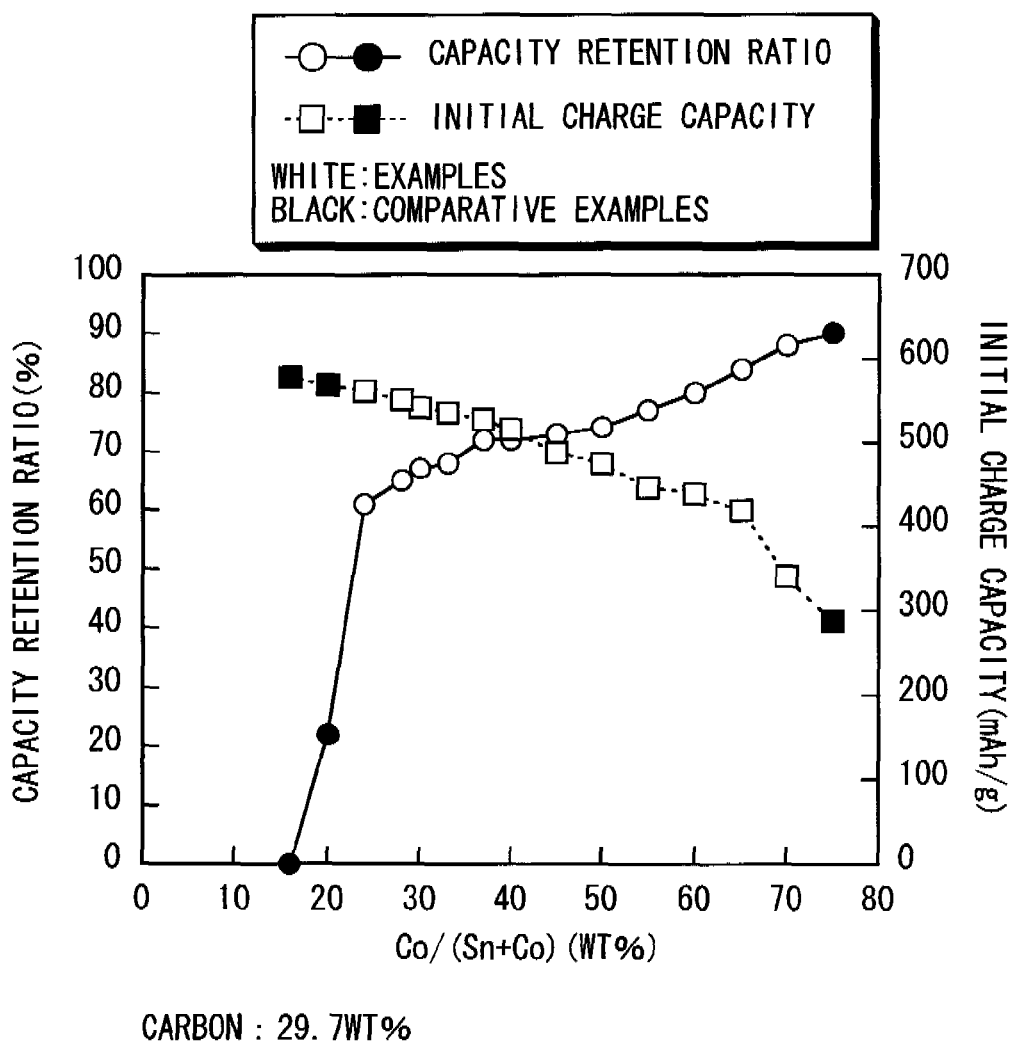
FIG. 27 is still another characteristics diagram showing a relation between cobalt ratios to the total of tin and cobalt in anode active materials of the batteries according to the second embodiment (liquid electrolyte) and capacity retention ratios/initial charge capacities.

As evidenced by Table 29 and FIG. 27, results similar to those of Examples 25-1 to 25-11 were obtained. That is, it was found that if the Co/(Sn+Co) ratio was from 24 wt % to 70 wt %, the capacity and the cycle characteristics could be improved even in the case that the carbon content was 29.7 wt %.

Examples 28-1 to 28-5

Anode active materials and secondary batteries were formed in the same manner as in Examples 24-1 to 24-7, except that the raw material ratios of cobalt, tin, carbon, phosphorus, and iron were changed as shown in Table 30. Specifically, the raw material ratio of carbon was set to the constant value of 20 wt %, the raw material ratio of iron was set to the constant value of 0.8 wt %, the Co/(Sn+Co) ratio was set to the constant value of 37 wt %, and the raw material ration of phosphorus was changed in the range from 0.1 wt % to 2.2 wt %.

TABLE 30

Co/(Sn + Co) = 37 wt %

|  | Raw material ratio (wt %) | | | | | Analytical value (wt %) | | | | | Half-width (deg) | Initial charge capacity (mAh/g) | Initial charge and discharge efficiency (%) | 2 Cy. discharge capacity (mAh/cm³) | 300 Cy. discharge capacity | Capacity retention ratio (%) |
|---|---|---|---|---|---|---|---|---|---|---|---|---|---|---|---|---|
|  | Co | Sn | C | P | Fe | Co | Sn | C | P | Fe |  |  |  |  |  |  |
| Example 28-1 | 29.3 | 49.8 | 20 | 0.1 | 0.8 | 29 | 49.3 | 19.8 | 0.1 | 0.8 | 4.9 | 521 | 86 | 140 | 105 | 75 |
| Example 28-2 | 29.1 | 49.6 | 20 | 0.5 | 0.8 | 28.8 | 49.1 | 19.8 | 0.5 | 0.8 | 5.2 | 529 | 87 | 140 | 108 | 77 |
| Example 28-3 | 28.9 | 49.3 | 20 | 1 | 0.8 | 28.6 | 48.8 | 19.8 | 1 | 0.8 | 5.4 | 534 | 88 | 141 | 110 | 78 |
| Example 24-5 | 28.7 | 49 | 20 | 1.5 | 0.8 | 28.5 | 48.5 | 19.8 | 1.5 | 0.8 | 5.6 | 542 | 88 | 141 | 111 | 79 |
| Example 28-4 | 28.6 | 48.6 | 20 | 2 | 0.8 | 28.3 | 48.1 | 19.8 | 2 | 0.8 | 5.7 | 545 | 87 | 141 | 111 | 79 |
| Example 28-5 | 28.5 | 48.5 | 20 | 2.2 | 0.8 | 28.2 | 48 | 19.8 | 2.2 | 0.8 | 5.7 | 548 | 86 | 142 | 112 | 79 |
| Comparative example 28-1 | 29.3 | 49.9 | 20 | 0 | 0.8 | 29 | 49.4 | 19.8 | 0 | 0.8 | 4.8 | 518 | 85 | 139 | 101 | 73 |
| Comparative example 28-2 | 28.2 | 48 | 20 | 3 | 0.8 | 27.9 | 47.5 | 19.8 | 3 | 0.8 | 5.9 | 551 | 85 | 143 | 112 | 78 |
| Comparative example 28-3 | 27.5 | 46.7 | 20 | 5 | 0.8 | 27.2 | 46.3 | 19.8 | 5 | 0.8 | 6.3 | 561 | 84 | 144 | 112 | 78 |

As Comparative example 28-1 to Examples 28-1 to 28-5, an anode active material and a secondary battery were formed in the same manner as in Examples 24-1 to 24-7, except that phosphorus was not contained. Further, as Comparative examples 28-2 and 28-3, anode active materials and secondary batteries were formed in the same manner as in Examples 24-1 to 24-7, except that the raw material ratio of phosphorus was changed as shown in Table 30. Specifically, the raw material ratio of phosphorus in Comparative examples 28-2 and 28-3 was respectively 3 wt % and 5 wt %.

Figure 28:
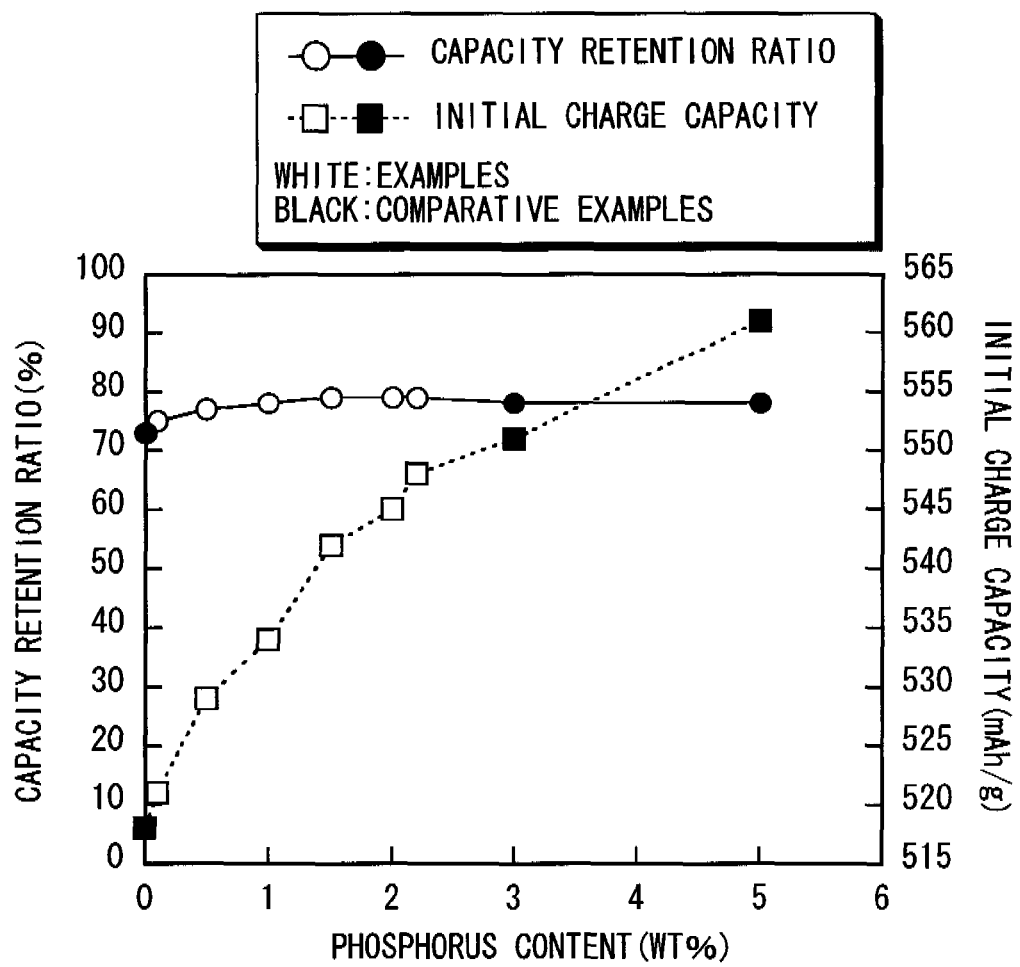
FIG. 28 is a characteristics diagram showing a relation between phosphorus contents in anode active materials of the batteries according to the second embodiment (liquid electrolyte) and capacity retention ratios/initial charge capacities.
Figure 29:
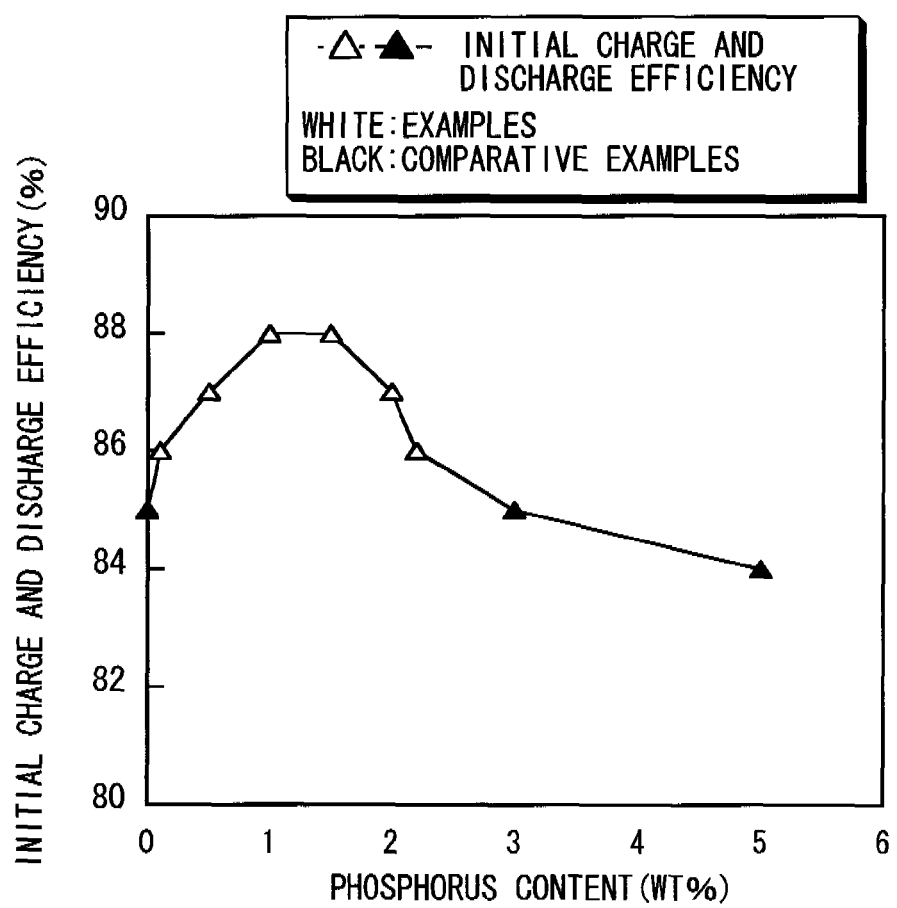
FIG. 29 is a characteristics diagram showing a relation between the phosphorus contents in the anode active materials of the batteries according to the second embodiment (liquid electrolyte) and initial charge and discharge efficiencies.

For the anode active materials of Examples 28-1 to 28-5 and Comparative examples 28-1 to 28-3, the composition thereof was analyzed and the half-width was measured in the same manner as in Examples 24-1 to 24-7. The results are shown in Table 30. Further, when XPS was performed and the obtained peak was analyzed, as in Examples 24-1 to 24-7, Peak P2 and peak P3 were obtained, and for all examples, peak P3 was obtained in the region lower than 284.5 eV. That is, it was confirmed that at least part of carbon contained in the anode active material was bonded to other element. Further, for the secondary batteries, the initial charge capacity, the initial charge and discharge efficiency, and the capacity retention ratio were examined in the same manner as in Examples 5-1 to 5-5, The results are shown in Table 30. FIG. 28, and FIG. 29.

As evidenced by Table 30 and FIG. 28, in Examples 28-1 to 28-5 in which the phosphorus content was in the range from 0.1 wt % to 2.2 wt %, the capacity retention ratio almost equal to those of Comparative examples 28-1 to 28-3 in which the phosphorus content was out of the range was obtained. In this case, the initial charge capacity and the discharge capacity were almost equal to those of Comparative examples 28-1 to 28-3 as well.

As evidenced by Table 30 and FIG. 29, in Examples 28-1 to 28-5 in which the phosphorus content was in the range from 0.1 wt % to 2.2 wt %, the initial charge and discharge efficiency thereof was more improved than those of Comparative examples 28-1 to 28-3 in which the phosphorus content was out of the range.

Further, if the phosphorus content was in the range from 0.5 wt % to 2 wt %, higher values were obtained.

That is, it was found that if the phosphorus content was in the range from 0.1 wt % to 2.2 wt %, the initial charge and discharge efficiency could be improved as well as the capacity and the cycle characteristics could. It was also found that the phosphorus content was preferably in the range from 0.5 wt % to 2 wt %.

Examples 29-1 to 29-7

Anode active materials and secondary batteries were formed in the same manner as in Examples 24-1 to 24-7, except that the raw material ratios of cobalt, tin, carbon, phosphorus, and iron were changed as shown in Table 31. Specifically, the raw material ratio of carbon was set to the constant value of 20 wt %, the raw material ratio of phosphorus was set to the constant value of 1.5 wt %, the Co/(Sn+Co) ratio was set to the constant value of 37 wt %, and the raw material ratio of iron was changed in the range from 0.1 wt % to 6.0 wt %.

TABLE 31

| | Co/(Sn + Co) = 37 wt % | | | | | | | | | | | | | | |
|---|---|---|---|---|---|---|---|---|---|---|---|---|---|---|---|
| | Raw material ratio (wt %) | | | | | Analytical value (wt %) | | | | | Half-width | Initial charge capacity | 2 Cy. discharge capacity | 300 Cy. discharge capacity | Capacity retention ratio |
| | Co | Sn | C | P | Fe | Co | Sn | C | P | Fe | (deg) | (mAh/g) | (mAh/cm³) | | (%) |
| Example 1-5 | 29 | 49.5 | 20 | 1.5 | 0 | 28.8 | 49 | 19.8 | 1.5 | 0 | 5.6 | 545 | 141 | 106 | 75 |
| Example 29-1 | 29 | 49.4 | 20 | 1.5 | 0.1 | 28.7 | 48.9 | 19.8 | 1.5 | 0.1 | 5.6 | 545 | 141 | 107 | 76 |
| Example 29-2 | 29 | 49.3 | 20 | 1.5 | 0.2 | 28.7 | 48.8 | 19.8 | 1.5 | 0.2 | 5.6 | 544 | 141 | 109 | 77 |
| Example 29-3 | 28.9 | 49.3 | 20 | 1.5 | 0.3 | 28.6 | 48.8 | 19.8 | 1.5 | 0.3 | 5.6 | 543 | 141 | 110 | 78 |
| Example 29-4 | 28.7 | 49 | 20 | 1.5 | 0.8 | 28.5 | 48.5 | 19.8 | 1.5 | 0.8 | 5.6 | 542 | 141 | 111 | 79 |
| Example 24-5 | 28.7 | 48.8 | 20 | 1.5 | 1 | 28.4 | 48.3 | 19.8 | 1.5 | 1 | 5.6 | 540 | 140 | 112 | 80 |
| Example 29-5 | 27.9 | 47.6 | 20 | 1.5 | 3 | 27.7 | 47.1 | 19.8 | 1.5 | 3 | 5.6 | 536 | 139 | 113 | 81 |
| Example 29-6 | 27.2 | 46.3 | 20 | 1.5 | 5 | 26.9 | 45.8 | 19.8 | 1.5 | 5 | 5.6 | 521 | 133 | 108 | 81 |
| Example 29-7 | 26.8 | 45.7 | 20 | 1.5 | 6 | 26.6 | 45.2 | 19.8 | 1.5 | 5.9 | 5.6 | 507 | 129 | 106 | 82 |
| Comparative example 29-1 | 26.6 | 45.4 | 20 | 1.5 | 6.5 | 26.4 | 44.9 | 19.8 | 1.5 | 6.4 | 5.6 | 480 | 119 | 98 | 82 |
| Comparative example 29-2 | 26.5 | 45 | 20 | 1.5 | 7 | 26.2 | 44.6 | 19.8 | 1.5 | 6.9 | 5.6 | 431 | 111 | 92 | 83 |

As Comparative examples 29-1 and 29-2 relative to Examples 29-1 to 29-7, anode active materials and secondary batteries were formed in the same manner as in Examples 29-1 to 29-7, except that the raw material ratio of iron was changed as shown in Table 31. Specifically, the raw material ration of iron in Comparative examples 29-1 and 29-2 was respectively 6.5 wt % and 7 wt %.

For the anode active materials of Examples 29-1 to 29-7 and Comparative examples 29-1 and 29-2, the composition thereof was analyzed and the half-width was measured in the same manner as in Examples 24-1 to 24-7. The results are shown in Table 31. Further, when XPS was performed and the obtained peak was analyzed, as in Examples 24-1 to 24-7, Peak P2 and peak P3 were obtained, and for all examples, peak P3 was obtained in the region lower than 284.5 eV. That is, it was confirmed that at least part of carbon contained in the anode active material was bonded to other element. Further, for the secondary batteries, the initial charge capacity and the capacity retention ratio were examined in the same manner as in Examples 24-1 to 24-7. The results are shown in Table 31 and FIG. 30.

Figure 30:
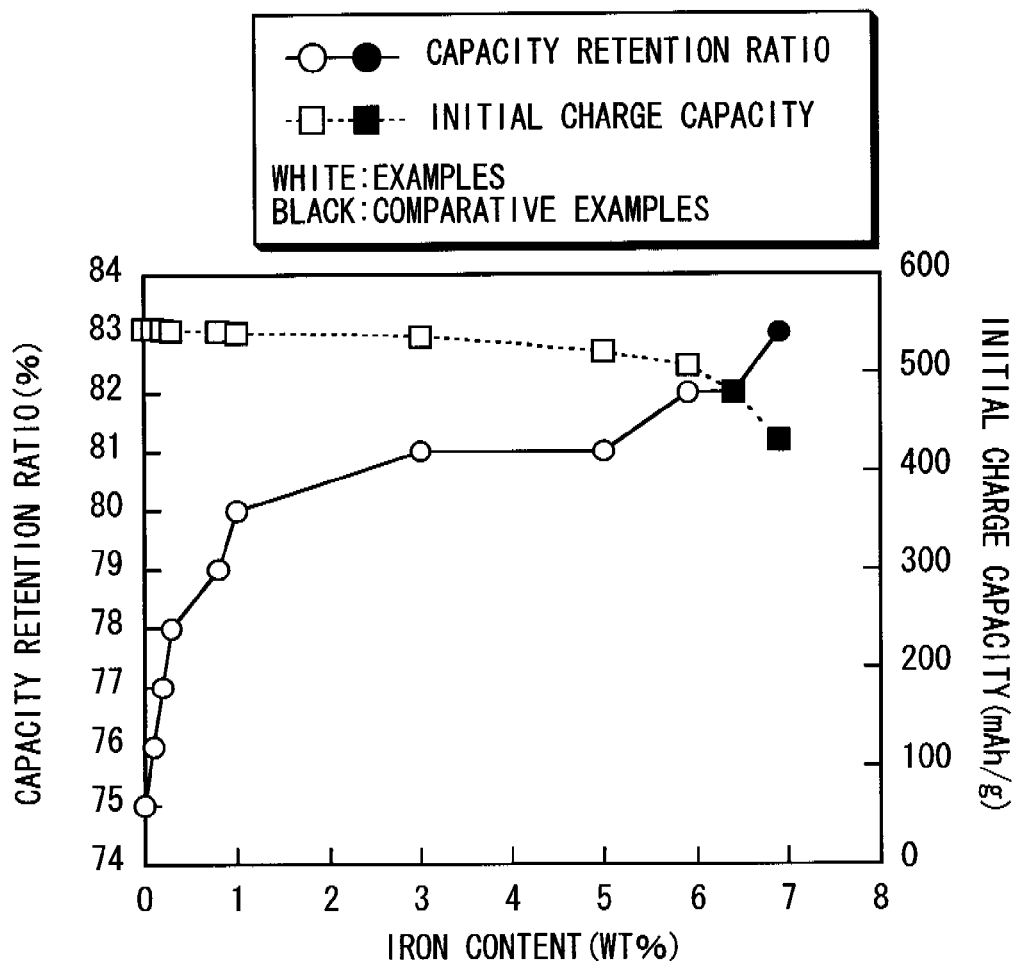
FIG. 30 is a characteristics diagram showing a relation between iron contents in anode active materials of the batteries according to the second embodiment (liquid electrolyte) and capacity retention ratios/initial charge capacities.

As evidenced by Table 31 and FIG. 30, in Examples 29-1 to 29-7 in which the iron content was in the range from 0.1 wt % to 5.9 wt %, the capacity retention ratio was more improved than that of Example 1-5 in which iron was not contained, and the initial charge capacity was more improved than those of Comparative examples 29-1 and 29-2 in which the iron content was over 5.9 wt %.

That is, it was found that if the iron content was from 0.1 wt % to 5.9 wt %, the capacity and the cycle characteristics could be improved.

Examples 30-1 to 30-6 and 31-1 to 31-6

Anode active materials and secondary batteries were formed in the same manner as in Examples 24-1 to 24-7, except that the half-width was changed as shown in Table 32 as in Examples 6-1 to 6-6 and 7-1 to 7-6. The raw material ratio of phosphorus was set to the constant value of 1.5 wt %, the raw material ratio of iron was set to the constant value of 0.8 wt %, the Co/(Sn+Co) ratio was set to the constant value of 37 wt %, and the raw material ratios of cobalt, tin, and carbon were changed as shown in Table 32.

For the anode active materials of Examples 30-1 to 30-6 and 31-1 to 31-6, the composition thereof was analyzed and the half-width was measured in the same manner as in Examples 24-1 to 24-7. The results are shown in Table 32. Further, when XPS was performed and the obtained peak was analyzed, as in Examples 24-1 to 24-7, Peak P2 and Peak P3 were obtained, and for all examples, peak P3 was obtained in the region lower than 284.5 eV. That is, it was confirmed that at least part of carbon contained in the anode active material was bonded to other element. Further, for the secondary batteries, the initial charge capacity and the capacity retention ratio were examined in the same manner as in Examples 24-1 to 24-7. The results are shown in Table 32.

As evidenced by Table 32, in all Examples 30-1 to 30-6 and 31-1 to 31-6, as the half-width was increased, the capacity retention ratio was improved. That is, it was found that if the reactive phase with a larger half-width of the diffraction peak was included, the cycle characteristics could be improved.

Examples 32-1 to 32-11

Anode active materials and secondary batteries were formed in the same manner as in Examples 24-1 to 24-7, except that silicon powder was further used as a raw material, and the raw material ratios of cobalt, tin, carbon, phosphorus, iron, and silicon were changed as shown in Table 33. Specifically, the raw material ratio of carbon was set to the constant value of 20 wt %, the raw material ratio of phosphorus was set to the constant value of 1.5 wt %, the raw material ratio of iron was set to the constant value of 0.8 wt %, the Co/(Sn+Co) ratio was set to the constant value of 37 wt %, and the raw material ratio of silicon was changed in the range from 0.3 wt % to 10 wt %. For the secondary batteries of Examples 32-1 to 32-11, the composition thereof was analyzed in the same manner as in Examples 24-1 to 24-7. The results are shown in Table 33. Further, when XPS was performed and the obtained peak was analyzed, as in Examples 24-1 to 24-7, Peak P2 and peak P3 were obtained, and for all examples, peak P3 was obtained in the region lower than 284.5 eV. That is, it was confirmed that at least part of carbon contained in the anode active material was bonded to other element. Further, for the secondary batteries, the initial charge capacity and the capacity retention ratio were examined in the same manner as in Examples 24-1 to 24-7. The results are shown in Table 34.

TABLE 32

Co/(Sn + Co) = 37 wt %

| | Raw material ratio (wt %) | | | | | Analytical value (wt %) | | | | | Half-width (deg) | Capacity retention ratio (%) |
|---|---|---|---|---|---|---|---|---|---|---|---|---|
| | Co | Sn | C | P | Fe | Co | Sn | C | P | Fe | | |
| Example 30-1 | 32.4 | 55.3 | 10 | 1.5 | 0.8 | 32.1 | 54.7 | 9.9 | 1.5 | 0.8 | 1 | 43 |
| Example 30-2 | 32.4 | 55.3 | 10 | 1.5 | 0.8 | 32.1 | 54.7 | 9.9 | 1.5 | 0.8 | 1.4 | 49 |
| Example 30-3 | 32.4 | 55.3 | 10 | 1.5 | 0.8 | 32.1 | 54.7 | 9.9 | 1.5 | 0.8 | 1.7 | 56 |
| Example 30-4 | 32.4 | 55.3 | 10 | 1.5 | 0.8 | 32.1 | 54.7 | 9.9 | 1.5 | 0.8 | 2.2 | 58 |
| Example 30-5 | 32.4 | 55.3 | 10 | 1.5 | 0.8 | 32.1 | 54.7 | 9.9 | 1.5 | 0.8 | 3.2 | 63 |
| Example 30-6 | 32.4 | 55.3 | 10 | 1.5 | 0.8 | 32.1 | 54.7 | 9.9 | 1.5 | 0.8 | 4.2 | 70 |
| Example 31-1 | 25 | 42.7 | 30 | 1.5 | 0.8 | 24.8 | 42.2 | 29.7 | 1.5 | 0.8 | 1 | 48 |
| Example 31-2 | 25 | 42.7 | 30 | 1.5 | 0.8 | 24.8 | 42.2 | 29.7 | 1.5 | 0.8 | 1.4 | 53 |
| Example 31-3 | 25 | 42.7 | 30 | 1.5 | 0.8 | 24.8 | 42.2 | 29.7 | 1.5 | 0.8 | 2.3 | 61 |
| Example 31-4 | 25 | 42.7 | 30 | 1.5 | 0.8 | 24.8 | 42.2 | 29.7 | 1.5 | 0.8 | 3.4 | 65 |
| Example 31-5 | 25 | 42.7 | 30 | 1.5 | 0.8 | 24.8 | 42.2 | 29.7 | 1.5 | 0.8 | 4.5 | 67 |
| Example 31-6 | 25 | 42.7 | 30 | 1.5 | 0.8 | 24.8 | 42.2 | 29.7 | 1.5 | 0.8 | 5.8 | 72 |

TABLE 33

Co/(Sn + Co) = 37 wt %

| | Raw material ratio (wt %) | | | | | | | Analytical value (wt %) | | | | | | |
|---|---|---|---|---|---|---|---|---|---|---|---|---|---|---|
| | Co | Sn | C | P | Fe | Si | (Sn + Si) | Co | Sn | C | P | Fe | Si | (Sn + Si) |
| Example 24-5 | 28.7 | 49 | 20 | 1.5 | 0.8 | 0 | 49 | 28.5 | 48.5 | 19.8 | 1.5 | 0.8 | 0 | 48.5 |
| Example 32-1 | 28.6 | 49.1 | 20 | 1.5 | 0.8 | 0.3 | 49.4 | 28.4 | 48.6 | 19.8 | 1.5 | 0.8 | 0.3 | 48.9 |
| Example 32-2 | 28.6 | 49.1 | 20 | 1.5 | 0.8 | 0.5 | 49.6 | 28.3 | 48.6 | 19.8 | 1.5 | 0.8 | 0.5 | 49.1 |
| Example 32-3 | 28.4 | 49.3 | 20 | 1.5 | 0.8 | 1 | 50.3 | 28.1 | 48.8 | 19.8 | 1.5 | 0.8 | 1 | 49.8 |
| Example 32-4 | 28 | 49.7 | 20 | 1.5 | 0.8 | 2 | 51.7 | 27.7 | 49.2 | 19.8 | 1.5 | 0.8 | 2 | 51.2 |
| Example 32-5 | 27.3 | 50.4 | 20 | 1.5 | 0.8 | 4 | 54.4 | 27 | 49.9 | 19.8 | 1.5 | 0.8 | 4 | 53.9 |
| Example 32-6 | 26.5 | 51.2 | 20 | 1.5 | 0.8 | 6 | 57.2 | 26.3 | 50.7 | 19.8 | 1.5 | 0.8 | 5.9 | 56.6 |
| Example 32-7 | 26.2 | 51.5 | 20 | 1.5 | 0.8 | 7 | 58.5 | 25.9 | 51 | 19.8 | 1.5 | 0.8 | 6.9 | 58 |
| Example 32-8 | 25.8 | 51.9 | 20 | 1.5 | 0.8 | 8 | 59.9 | 25.5 | 51.4 | 19.8 | 1.5 | 0.8 | 7.9 | 59.3 |
| Example 32-9 | 25.6 | 52.1 | 20 | 1.5 | 0.8 | 8.5 | 60.6 | 25.3 | 51.6 | 19.8 | 1.5 | 0.8 | 8.4 | 60 |
| Example 32-10 | 25.4 | 52.3 | 20 | 1.5 | 0.8 | 9 | 61.3 | 25.2 | 51.8 | 19.8 | 1.5 | 0.8 | 8.9 | 60.7 |
| Example 32-11 | 25 | 52.7 | 20 | 1.5 | 0.8 | 10 | 62.7 | 24.8 | 52.1 | 19.8 | 1.5 | 0.8 | 9.9 | 62 |

TABLE 34

| | Initial charge capacity (mAh/g) | 2 Cy. discharge capacity (mAh/cm³) | 300 Cy. discharge capacity (mAh/cm³) | Capacity retention ratio (%) |
|---|---|---|---|---|
| Example 24-5 | 542 | 141 | 111 | 79 |
| Example 32-1 | 543 | 141 | 109 | 77 |
| Example 32-2 | 547 | 143 | 107 | 75 |
| Example 32-3 | 567 | 146 | 108 | 74 |
| Example 32-4 | 579 | 147 | 106 | 72 |
| Example 32-5 | 592 | 149 | 106 | 71 |
| Example 32-6 | 618 | 153 | 107 | 70 |
| Example 32-7 | 628 | 158 | 109 | 69 |
| Example 32-8 | 638 | 161 | 103 | 64 |
| Example 32-9 | 652 | 161 | 76 | 47 |
| Example 32-10 | 676 | 162 | 53 | 33 |
| Example 32-11 | 708 | 164 | 28 | 17 |

As evidenced by Table 33 and Table 34, in Examples 32-1 to 32-11 in which silicon was contained, the initial charge capacity was more improved than that of Example 24-5 in which silicon was not contained. However, there was a tendency that as the silicon content was increased, the capacity retention ratio was lowered.

That is, it was found that if the anode active material contained silicon, the capacity could be improved. It was found that in this case, if the silicon content was in the range from 0.5 wt % to 7.9 wt %, a sufficient initial charge and discharge capacity and a sufficient capacity retention ratio could be obtained.

Examples 33-1 to 33-12

In Example 33-1, an anode active material and a secondary battery were formed in the same manner as in Examples 24-1 to 24-7, except that the raw material ratios of cobalt, tin, carbon, phosphorus, and iron were changed as shown in Table 35. Further, in Examples 33-2 to 33-12, anode active materials and secondary batteries were formed in the same manner as in Examples 24-1 to 24-7, except that as raw materials, cobalt powder, tin powder, carbon powder, phosphorus powder, iron power, and titanium powder were prepared, and the raw material ratios thereof were changed as shown in Table 35. Specifically, the raw material ratio of carbon was set to the constant value of 20 wt %, the raw material ratio of phosphorus was set to the constant value of 1.5 wt %, the raw material ratio of iron was set to the constant value of 0.8 wt %, the Co/(Sn+Co) ratio was set to the constant value of 37 wt %, and the raw material ratio of titanium was changed in the range from 0 wt % to 16 wt %. For the anode active materials of Examples 33-1 to 33-12, the composition thereof was analyzed in the same manner as in Examples 24-1 to 24-7. The results are shown in Table 35. Further, when XPS was performed and the obtained peak was analyzed, as in Examples 24-1 to 24-7, Peak P2 and peak P3 were obtained, and for all examples, peak P3 was obtained in the region lower than 284.5 eV. That is, it was confirmed that at least part of carbon contained in the anode active material was bonded to other element. Further, for the secondary batteries, the initial charge capacity and the capacity retention ratio were examined in the same manner as in Examples 24-1 to 24-7. The results are shown in Table 35 and FIG. 31.

TABLE 35

Co/(Sn + Co) = 37 wt %

| | Raw material ratio (wt %) | | | | | | Analytical value (wt %) | | | | | | Initial charge capacity (mAh/g) | 2 Cy. discharge capacity (mAh/cm³) | 300 Cy. discharge capacity (mAh/cm³) | Capacity retention ratio (%) |
|---|---|---|---|---|---|---|---|---|---|---|---|---|---|---|---|---|
| | Co | Sn | C | P | Fe | Ti | Co | Sn | C | P | Fe | Ti | | | | |
| Example 33-1 | 27.2 | 50.5 | 20 | 1.5 | 0.8 | 0 | 26.9 | 50 | 19.8 | 1.5 | 0.8 | 0 | 552 | 141 | 109 | 77 |
| Example 33-2 | 26.9 | 50 | 20 | 1.5 | 0.8 | 0.8 | 26.6 | 49.5 | 19.8 | 1.5 | 0.8 | 0.8 | 562 | 145 | 115 | 79 |
| Example 33-3 | 26.7 | 49.5 | 20 | 1.5 | 0.8 | 1.5 | 26.4 | 49 | 19.8 | 1.5 | 0.8 | 1.5 | 564 | 146 | 121 | 83 |
| Example 33-4 | 26.4 | 48.9 | 20 | 1.5 | 0.8 | 2.4 | 26.1 | 48.5 | 19.8 | 1.5 | 0.8 | 2.4 | 568 | 146 | 123 | 84 |

TABLE 35-continued

Co/(Sn + Co) = 37 wt %

| | Raw material ratio (wt %) | | | | | | Analytical value (wt %) | | | | | | Initial charge capacity (mAh/g) | 2 Cy. discharge capacity (mAh/cm³) | 300 Cy. discharge capacity | Capacity retention ratio (%) |
|---|---|---|---|---|---|---|---|---|---|---|---|---|---|---|---|---|
| | Co | Sn | C | P | Fe | Ti | Co | Sn | C | P | Fe | Ti | | | | |
| Example 33-5 | 26.2 | 48.7 | 20 | 1.5 | 0.8 | 2.8 | 26 | 48.2 | 19.8 | 1.5 | 0.8 | 2.8 | 575 | 150 | 132 | 88 |
| Example 33-6 | 25.8 | 47.9 | 20 | 1.5 | 0.8 | 4 | 25.5 | 47.4 | 19.8 | 1.5 | 0.8 | 4 | 577 | 150 | 134 | 89 |
| Example 33-7 | 25.4 | 47.2 | 20 | 1.5 | 0.8 | 5.1 | 25.2 | 46.7 | 19.8 | 1.5 | 0.8 | 5 | 585 | 152 | 135 | 89 |
| Example 33-8 | 24.6 | 45.6 | 20 | 1.5 | 0.8 | 7.5 | 24.3 | 45.2 | 19.8 | 1.5 | 0.8 | 7.4 | 589 | 152 | 134 | 88 |
| Example 33-9 | 23.7 | 44 | 20 | 1.5 | 0.8 | 10 | 23.5 | 43.6 | 19.8 | 1.5 | 0.8 | 9.9 | 586 | 152 | 134 | 88 |
| Example 33-10 | 22.6 | 42.1 | 20 | 1.5 | 0.8 | 13 | 22.4 | 41.6 | 19.8 | 1.5 | 0.8 | 12.9 | 581 | 151 | 131 | 87 |
| Example 33-11 | 21.9 | 40.8 | 20 | 1.5 | 0.8 | 15 | 21.7 | 40.3 | 19.8 | 1.5 | 0.8 | 14.9 | 556 | 147 | 123 | 84 |
| Example 33-12 | 21.6 | 40.1 | 20 | 1.5 | 0.8 | 16 | 21.4 | 39.7 | 19.8 | 1.5 | 0.8 | 15.8 | 515 | 128 | 92 | 72 |

Figure 31:
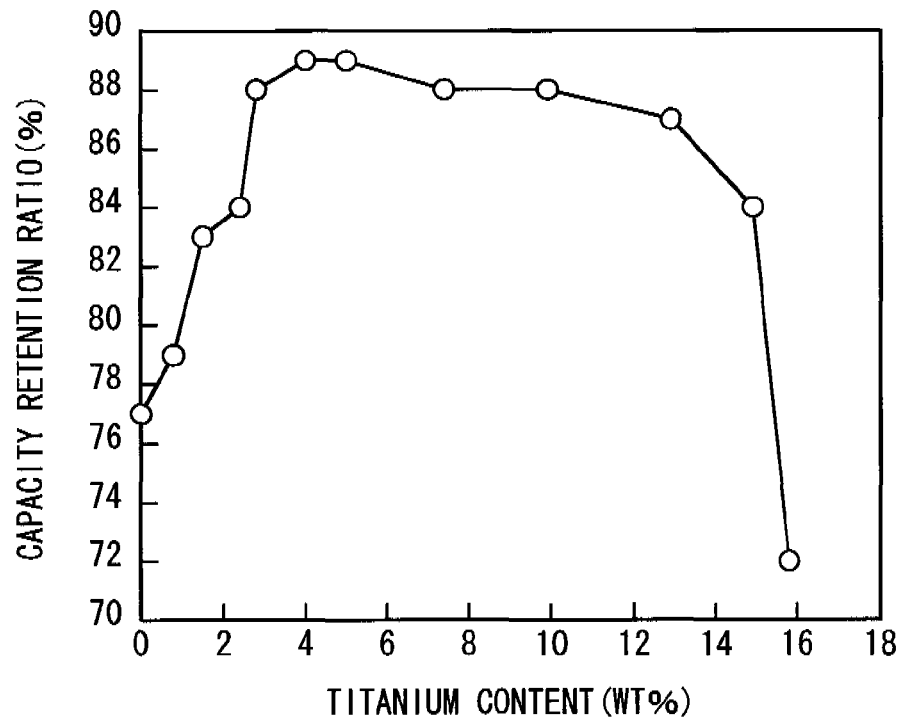
FIG. 31 is a characteristics diagram showing a relation between titanium contents in anode active materials of the batteries according to the second embodiment (liquid electrolyte) and capacity retention ratios.

As evidenced by Table 35 and FIG. 31, in Examples 33-2 to 33-11 in which titanium was contained in the range of 14.9 wt % or less, the capacity retention ration was more improved than those of Example 33-1 in which titanium was not contained and Example 33-12 in which the titanium content was over 14.9 wt %. In this case, higher values were obtained if the titanium content was 1.5 wt % or more, in particular if the titanium content was in the range from 2.8 wt % to 12.9 wt %.

That is, it was found that if the anode active material contained titanium in the range of 14.9 wt % or less, the cycle characteristics could be more improved. In addition, it was found that the titanium content was more preferably 1.5 wt % or more, and in particular, was much more preferably in the range from 2.8 wt % to 12.9 wt %.

Examples 34-1 to 34-11

Anode active materials and secondary batteries were formed in the same manner as in Examples 24-1 to 24-7, except that as raw materials, cobalt powder, tin powder, carbon powder, phosphorus powder, iron powder, and bismuth powder were prepared, and the raw material ratios thereof were changed as shown in Table 36. Specifically, the raw material ratio of carbon was set to the constant value of 20 wt %, the raw material ratio of phosphorus was set to the constant value of 1.5 wt %, the raw material ratio of iron was set to the constant value of 0.8 wt %, the Co/(Sn+Co) ratio was set to the constant value of 37 wt %, and the raw material ratio of bismuth was changed in the range from 0.8 wt % to 16 wt %. For the anode active materials of Examples 34-1 to 34-11, the composition thereof was analyzed in the same manner as in Examples 24-1 to 24-7. The results are shown in Table 36. Further, when XPS was performed and the obtained peak was analyzed, as in Examples 24-1 to 24-7, Peak P2 and peak P3 were obtained, and for all examples, peak P3 was obtained in the region lower than 284.5 eV. That is, it was confirmed that at least part of carbon contained in the anode active material was bonded to other element. Further, for the secondary batteries, the initial charge capacity and the capacity retention ratio were examined in the same manner as in Examples 24-1 to 24-7. The results are shown in Table 36 and FIG. 32.

TABLE 36

Co/(Sn + Co) = 37 wt %

| | Raw material ratio (wt %) | | | | | | Analytical value (wt %) | | | | | | Initial charge capacity (mAh/g) | Cy. discharge capacity (mAh/cm³) | 300 Cy. discharge capacity | Capacity retention ratio (%) |
|---|---|---|---|---|---|---|---|---|---|---|---|---|---|---|---|---|
| | Co | Sn | C | P | Fe | Bi | Co | Sn | C | P | Fe | Bi | | | | |
| Example 33-1 | 27.2 | 50.5 | 20 | 1.5 | 0.8 | 0 | 26.9 | 50 | 19.8 | 1.5 | 0.8 | 0 | 552 | 141 | 109 | 77 |
| Example 34-1 | 26.9 | 50 | 20 | 1.5 | 0.8 | 0.8 | 26.6 | 49.5 | 19.8 | 1.5 | 0.8 | 0.8 | 547 | 141 | 110 | 78 |
| Example 34-2 | 26.7 | 49.5 | 20 | 1.5 | 0.8 | 1.5 | 26.4 | 49 | 19.8 | 1.5 | 0.8 | 1.5 | 546 | 140 | 119 | 85 |
| Example 34-3 | 26.4 | 48.9 | 20 | 1.5 | 0.8 | 2.4 | 26.1 | 48.5 | 19.8 | 1.5 | 0.8 | 2.4 | 545 | 140 | 119 | 85 |
| Example 34-4 | 26.2 | 48.7 | 20 | 1.5 | 0.8 | 2.8 | 26 | 48.2 | 19.8 | 1.5 | 0.8 | 2.8 | 544 | 140 | 122 | 87 |
| Example 34-5 | 25.8 | 47.9 | 20 | 1.5 | 0.8 | 4 | 25.5 | 47.4 | 19.8 | 1.5 | 0.8 | 4 | 544 | 140 | 125 | 89 |
| Example 34-6 | 25.4 | 47.2 | 20 | 1.5 | 0.8 | 5.1 | 25.2 | 46.7 | 19.8 | 1.5 | 0.8 | 5 | 537 | 139 | 122 | 88 |
| Example 34-7 | 24.6 | 45.6 | 20 | 1.5 | 0.8 | 7.5 | 24.3 | 45.2 | 19.8 | 1.5 | 0.8 | 7.4 | 534 | 139 | 122 | 88 |

TABLE 36-continued

Co/(Sn + Co) = 37 wt %

| | Raw material ratio (wt %) | | | | | | Analytical value (wt %) | | | | | | Initial charge capacity (mAh/g) | Cy. discharge capacity (mAh/cm³) | 300 Cy. discharge capacity (mAh/cm³) | Capacity retention ratio (%) |
|---|---|---|---|---|---|---|---|---|---|---|---|---|---|---|---|---|
| | Co | Sn | C | P | Fe | Bi | Co | Sn | C | P | Fe | Bi | | | | |
| Example 34-8 | 23.7 | 44 | 20 | 1.5 | 0.8 | 10 | 23.5 | 43.6 | 19.8 | 1.5 | 0.8 | 9.9 | 532 | 138 | 120 | 87 |
| Example 34-9 | 22.6 | 42.1 | 20 | 1.5 | 0.8 | 13 | 22.4 | 41.6 | 19.8 | 1.5 | 0.8 | 12.9 | 528 | 138 | 117 | 85 |
| Example 34-10 | 21.9 | 40.8 | 20 | 1.5 | 0.8 | 15 | 21.7 | 40.3 | 19.8 | 1.5 | 0.8 | 14.9 | 525 | 135 | 112 | 83 |
| Example 34-11 | 21.6 | 40.1 | 20 | 1.5 | 0.8 | 16 | 21.4 | 39.7 | 19.8 | 1.5 | 0.8 | 15.8 | 514 | 125 | 89 | 71 |

Figure 32:
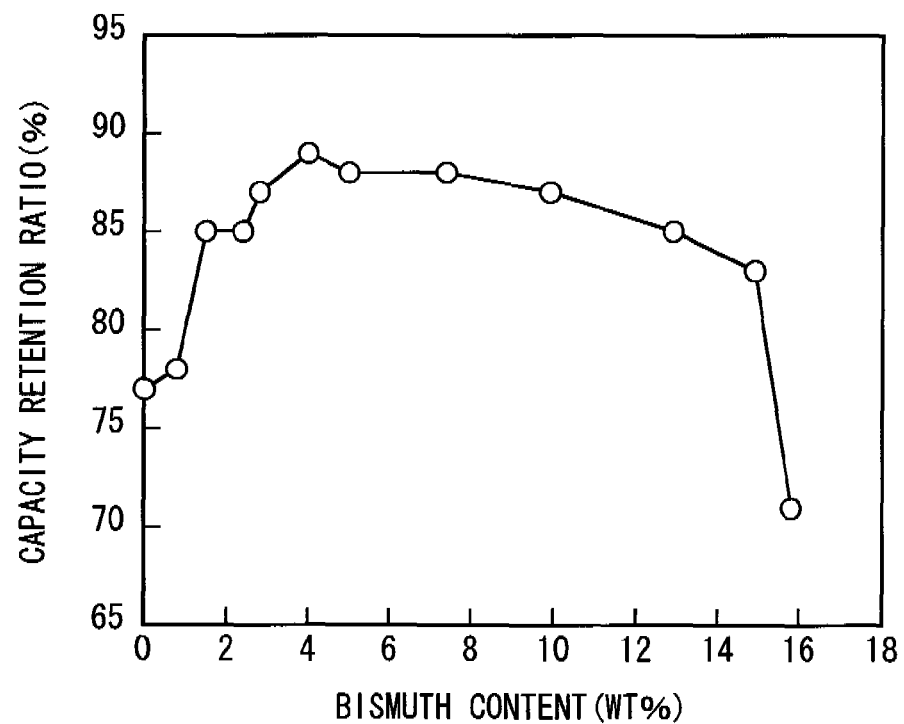
FIG. 32 is a characteristics diagram showing a relation between bismuth contents in anode active materials of the batteries according to the second embodiment (liquid electrolyte) and capacity retention ratios.

As evidenced in Table 36 and FIG. 32, in Examples 34-1 to 34-11 in which bismuth was contained, results similar to those of Examples 33-2 to 33-12 in which titanium was contained were obtained. That is, it was found that if the anode active material contained bismuth in the range of 14.9 wt % or less, the cycle characteristics could be more improved as well. In addition, it was found that the bismuth content was more preferably 1.5 wt % or more.

Examples 35-1 to 35-10

Anode active materials and secondary batteries were formed in the same manner as in Examples 24-1 to 24-7, except that as raw materials, molybdenum powder, niobium powder, germanium powder, indium powder, and gallium powder were used together with cobalt powder, tin powder, carbon powder, phosphorus powder, and iron power; and the raw material ratios of cobalt, tin, carbon, phosphorus, iron, molybdenum, niobium, germanium, indium, and gallium were changed as shown in Table 37. Specifically, the raw material ratio of phosphorus was set to the constant value of 1.5 wt %, the raw material ratio of iron was set to the constant value of 0.8 wt %, the Co/(Sn+Co) ratio was set to the constant value of 37 wt %, and the raw material ratio of molybdenum was any of 3 wt %, 4 wt %, 5 wt %, and 6 wt %. For the anode active materials of Examples 35-1 to 35-10, the composition thereof was analyzed in the same manner as in Examples 24-1 to 24-7. The results are shown in Table 37. Further, when XPS was performed and the obtained peak was analyzed, as in Examples 24-1 to 24-7, Peak P2 and peak P3 were obtained, and for all examples, peak P3 was obtained in the region lower than 284.5 eV. That is, it was confirmed that at least part of carbon contained in the anode active material was bonded to other element. Further, for the secondary batteries, the initial charge capacity and the capacity retention ration were examined in the same manner as in Examples 24-1 to 24-7. The are shown in Table 38.

TABLE 37

Co/(Sn + Co) = 37 wt %

| | Raw material ratio (wt %) | | | | | | | | | | Analytical value (wt %) | | | | | | | | | |
|---|---|---|---|---|---|---|---|---|---|---|---|---|---|---|---|---|---|---|---|---|
| | Co | Sn | C | P | Fe | Mo | Nb | Ge | In | Ga | Co | Sn | C | P | Fe | Mo | Nb | Ge | In | Ga |
| Example 35-1 | 25.8 | 47.9 | 20 | 1.5 | 0.8 | 4 | — | — | — | — | 25.5 | 47.4 | 19.8 | 1.5 | 0.8 | 4 | — | — | — | — |
| Example 35-2 | 25.8 | 47.9 | 18 | 1.5 | 0.8 | 6 | — | — | — | — | 25.5 | 47.4 | 17.8 | 1.5 | 0.8 | 5.9 | — | — | — | — |
| Example 35-3 | 25.8 | 47.9 | 20 | 1.5 | 0.8 | — | 4 | — | — | — | 25.5 | 47.4 | 19.8 | 1.5 | 0.8 | — | 4 | — | — | — |
| Example 35-4 | 26.1 | 48.6 | 18 | 1.5 | 0.8 | — | 5 | — | — | — | 25.9 | 48.1 | 17.8 | 1.5 | 0.8 | — | 5 | — | — | — |
| Example 35-5 | 25.4 | 47.3 | 19 | 1.5 | 0.8 | — | 6 | — | — | — | 25.2 | 46.8 | 18.8 | 1.5 | 0.8 | — | 5.9 | — | — | — |
| Example 35-6 | 25.1 | 46.6 | 20 | 1.5 | 0.8 | — | — | 6 | — | — | 24.8 | 46.1 | 19.8 | 1.5 | 0.8 | — | — | 5.9 | — | — |
| Example 35-7 | 26.8 | 49.9 | 18 | 1.5 | 0.8 | — | — | — | 3 | — | 26.6 | 49.4 | 17.8 | 1.5 | 0.8 | — | — | — | 3 | — |
| Example 35-8 | 26.5 | 49.2 | 18 | 1.5 | 0.8 | — | — | — | 4 | — | 26.2 | 48.7 | 17.8 | 1.5 | 0.8 | — | — | — | 4 | — |
| Example 35-9 | 25.1 | 46.6 | 20 | 1.5 | 0.8 | — | — | — | 6 | — | 24.8 | 46.1 | 19.8 | 1.5 | 0.8 | — | — | — | 5.9 | — |
| Example 35-10 | 25.1 | 46.6 | 20 | 1.5 | 0.8 | — | — | — | — | 6 | 24.8 | 46.1 | 19.8 | 1.5 | 0.8 | — | — | — | — | 5.9 |

TABLE 38

Co/(Sn + Co) = 37 wt %

| | Initial charge capacity (mAh/g) | 2 Cy. discharge capacity (mAh/cm³) | 300 Cy. discharge capacity (mAh/cm³) | Capacity retention ratio (%) |
|---|---|---|---|---|
| Example 35-1 | 527 | 137 | 116 | 85 |
| Example 35-2 | 525 | 139 | 121 | 87 |

TABLE 38-continued

Co/(Sn + Co) = 37 wt %

| | Initial charge capacity (mAh/g) | 2 Cy. discharge capacity (mAh/cm³) | 300 Cy. discharge capacity (mAh/cm³) | Capacity retention ratio (%) |
|---|---|---|---|---|
| Example 35-3 | 552 | 142 | 122 | 86 |
| Example 35-4 | 547 | 140 | 120 | 86 |
| Example 35-5 | 549 | 139 | 120 | 86 |
| Example 35-6 | 557 | 143 | 120 | 84 |
| Example 35-7 | 557 | 140 | 115 | 82 |
| Example 35-8 | 561 | 141 | 117 | 83 |
| Example 35-9 | 567 | 145 | 125 | 86 |
| Example 35-10 | 542 | 139 | 117 | 84 | was set to the constant value of 0.8 wt %, the raw material ratio of silicon was set to the constant value of 3 wt %, the Co/(Sn+Co) ratio was set to the constant value of 37 wt %, and the raw material ratio of titanium was changed in the range from 0 wt % to 7.5 wt %. For the anode active materials of Examples 36-1 to 36-4, the composition thereof was analyzed in the same manner as in Examples 24-1 to 24-7. The results are shown in Table 39. Further, when XPS was performed and the obtained peak was analyzed, as in Examples 24-1 to 24-7, Peak P2 and peak P3 were obtained, and for all examples, peak P3 was obtained in the region lower than 284.5 eV. That is, it was confirmed that at least part of carbon contained in the anode active material was bonded to other element. Further, for the secondary batteries, the initial charge capacity and the capacity retention ratio were examined in the same manner as in Examples 24-1 to 24-7. The results are shown in Table 39.

TABLE 39

Co/(Sn + Co) = 37 wt %

| | Raw material ratio (wt %) | | | | | | Analytical value (wt %) | | | | | | Initial charge capacity (mAh/g) | 2 Cy. discharge capacity (mAh/cm³) | 300 Cy. discharge capacity (mAh/cm³) | Capacity retention ratio (%) |
|---|---|---|---|---|---|---|---|---|---|---|---|---|---|---|---|---|---|
| | Co | Sn | C | P | Fe | Si | Ti | Co | Sn | C | P | Fe | Si | Ti | | | | |
| Example 33-1 | 27.2 | 50.5 | 20 | 1.5 | 0.8 | — | — | 26.9 | 50 | 19.8 | 1.5 | 0.8 | — | — | 552 | 141 | 109 | 77 |
| Example 36-1 | 26.8 | 49.9 | 18 | 1.5 | 0.8 | 3 | 0 | 26.6 | 49.4 | 17.8 | 1.5 | 0.8 | 3 | 0 | 579 | 147 | 106 | 72 |
| Example 36-2 | 25.4 | 47.3 | 18 | 1.5 | 0.8 | 3 | 4 | 25.2 | 46.8 | 17.8 | 1.5 | 0.8 | 3 | 4 | 598 | 148 | 115 | 78 |
| Example 36-3 | 25.1 | 46.5 | 18 | 1.5 | 0.8 | 3 | 5.1 | 24.8 | 46.1 | 17.8 | 1.5 | 0.8 | 3 | 5 | 615 | 149 | 119 | 80 |
| Example 36-4 | 24.2 | 45 | 18 | 1.5 | 0.8 | 3 | 7.5 | 24 | 44.5 | 17.8 | 1.5 | 0.8 | 3 | 7.4 | 618 | 149 | 119 | 80 |

As evidenced by Table 37 and Table 38 in Examples 35-1 to 35-10, the cycle characteristics were improved as in Examples 33-2 to 33-12 and 34-1 to 34-11. That is, it was found that if the anode active material contained at least one selected from the group consisting of molybdenum, niobium, germanium, indium, and gallium, the cycle characteristics could be more improved.

Examples 36-1 to 36-

Anode active materials and secondary batteries were formed in the same manner as in Examples 24-1 to 24-7, except that as raw materials, cobalt powder, tin powder, carbon powder, phosphorus powder, iron powder, silicon powder, and titanium power were prepared, and the raw material ratios thereof were changed as shown in Table 39. Specifically, the raw material ration of carbon was set to the constant value of 18 wt %, the raw material ratio of phosphorus was set to the constant value of 1.5 wt %, the raw material ratio of iron As evidenced by Table 39, in Examples 36-2 to 36-4 in which titanium was contained in addition to silicon, the initial charge capacity and the capacity retention ration were more improved than those of Examples 33-1 to 36-1.

That is, it was found that if the anode active material contained at least one selected from the group consisting of titanium, molybdenum, niobium, germanium, indium, and gallium together with silicon, the capacity and the cycle characteristics could be more improved.

Examples 37-1 to 37-3

Secondary batteries were formed in the same manner as in Examples 24-5, 32-5, and 36-2, except the FEC was added to the solvent of the electrolytic solution, and the solvent composition was FEC:EC:PC:DMC=20:10:10:60 at a weight ratio. The capacity retention ration was examined in the same manner as in Examples 24-1 to 24-7. The results are shown in Table 40.

TABLE 40

Co/(Sn + Co) = 37 wt %

| | Raw material ratio (wt %) | | | | | | Analytical value (wt %) | | | | | | | Capacity retention ratio |
|---|---|---|---|---|---|---|---|---|---|---|---|---|---|---|
| | Co | Sn | C | P | Fe | Si | Ti | Co | Sn | C | P | Fe | Si | Ti | Solvent | (%) |
| Example 24-5 | 28.7 | 49 | 20 | 1.5 | 0.8 | — | — | 28.5 | 48.5 | 19.8 | 1.5 | 0.8 | — | — | EC + PC + DMC | 79 |
| Example 32-5 | 27.3 | 50.4 | 20 | 1.5 | 0.8 | 4 | — | 27 | 49.9 | 19.8 | 1.5 | 0.8 | 4 | — | EC + PC + DMC | 71 |
| Example 36-2 | 25.4 | 47.3 | 18 | 1.5 | 0.8 | 3 | 4 | 25.2 | 46.8 | 17.8 | 1.5 | 0.8 | 3 | 4 | EC + PC + DMC | 78 |
| Example 37-1 | 28.7 | 49 | 20 | 1.5 | 0.8 | — | — | 28.5 | 48.5 | 19.8 | 1.5 | 0.8 | — | — | FEC + EC + PC + DMC | 92 |
| Example 37-2 | 27.3 | 50.4 | 20 | 1.5 | 0.8 | 4 | — | 27 | 49.9 | 19.8 | 1.5 | 0.8 | 4 | — | FEC + EC + PC + DMC | 81 |
| Example 37-3 | 25.4 | 47.3 | 18 | 1.5 | 0.8 | 3 | 4 | 25.2 | 46.8 | 17.8 | 1.5 | 0.8 | 3 | 4 | FEC + EC + PC + DMC | 88 |

As evidenced by Table 40, in Examples 37-1 to 37-3 in which FEC was added to the solvent, the capacity retention ratio was more improved than those of Examples 24-5, 32-5, and 36-2 in which FEC was not added to the solvent. That is, it was found that if FEC was added to the solvent, the cycle characteristics could be more improved.

Examples 38-1 to 38-16

Cylindrical type secondary batteries were fabricated in the same manner as in Example 24-5 to 37-1, except that the solvent composition was changed as shown in Table 41. For the secondary batteries of Examples 38-1 to 38-16, the capacity retention ratio was examined in the same manner as in Examples 24-1 to 24-7. The results are shown in Table 41.

TABLE 41

Co/(Sn + Co) = 37 wt %

| | Raw material ratio (wt %) | | | | | Analytical value (wt %) | | | | | Solvent (wt %) | | | | Capacity retention ratio |
|---|---|---|---|---|---|---|---|---|---|---|---|---|---|---|---|
| | Co | Sn | C | P | Fe | Co | Sn | C | P | Fe | FEC | EC | PC | DMC | (%) |
| Example 24-5 | 28.7 | 49 | 20 | 1.5 | 0.8 | 28.5 | 48.5 | 19.8 | 1.5 | 0.8 | 0 | 30 | 10 | 60 | 79 |
| Example 38-1 | 28.7 | 49 | 20 | 1.5 | 0.8 | 28.5 | 48.5 | 19.8 | 1.5 | 0.8 | 1 | 29 | 10 | 60 | 86 |
| Example 38-2 | 28.7 | 49 | 20 | 1.5 | 0.8 | 28.5 | 48.5 | 19.8 | 1.5 | 0.8 | 5 | 25 | 10 | 60 | 87 |
| Example 38-3 | 28.7 | 49 | 20 | 1.5 | 0.8 | 28.5 | 48.5 | 19.8 | 1.5 | 0.8 | 10 | 20 | 10 | 60 | 90 |
| Example 38-4 | 28.7 | 49 | 20 | 1.5 | 0.8 | 28.5 | 48.5 | 19.8 | 1.5 | 0.8 | 15 | 15 | 10 | 60 | 91 |
| Example 37-1 | 28.7 | 49 | 20 | 1.5 | 0.8 | 28.5 | 48.5 | 19.8 | 1.5 | 0.8 | 20 | 10 | 10 | 60 | 92 |
| Example 38-5 | 28.7 | 49 | 20 | 1.5 | 0.8 | 28.5 | 48.5 | 19.8 | 1.5 | 0.8 | 25 | 5 | 10 | 60 | 92 |
| Example 38-6 | 28.7 | 49 | 20 | 1.5 | 0.8 | 28.5 | 48.5 | 19.8 | 1.5 | 0.8 | 30 | 0 | 10 | 60 | 93 |
| Example 38-7 | 28.7 | 49 | 20 | 1.5 | 0.8 | 28.5 | 48.5 | 19.8 | 1.5 | 0.8 | 35 | 0 | 5 | 60 | 94 |
| Example 38-8 | 28.7 | 49 | 20 | 1.5 | 0.8 | 28.5 | 48.5 | 19.8 | 1.5 | 0.8 | 40 | 0 | 0 | 60 | 94 |
| Example 38-9 | 28.7 | 49 | 20 | 1.5 | 0.8 | 28.5 | 48.5 | 19.8 | 1.5 | 0.8 | 50 | 0 | 0 | 50 | 91 |
| Example 38-10 | 28.7 | 49 | 20 | 1.5 | 0.8 | 28.5 | 48.5 | 19.8 | 1.5 | 0.8 | 60 | 0 | 0 | 40 | 89 |
| Example 38-11 | 28.7 | 49 | 20 | 1.5 | 0.8 | 28.5 | 48.5 | 19.8 | 1.5 | 0.8 | 65 | 0 | 0 | 35 | 86 |
| Example 38-12 | 28.7 | 49 | 20 | 1.5 | 0.8 | 28.5 | 48.5 | 19.8 | 1.5 | 0.8 | 20 | 20 | 0 | 60 | 89 |
| Example 38-13 | 28.7 | 49 | 20 | 1.5 | 0.8 | 28.5 | 48.5 | 19.8 | 1.5 | 0.8 | 30 | 10 | 0 | 60 | 91 |
| Example 38-14 | 28.7 | 49 | 20 | 1.5 | 0.8 | 28.5 | 48.5 | 19.8 | 1.5 | 0.8 | 70 | 0 | 0 | 30 | 84 |

TABLE 41-continued

Co/(Sn + Co) = 37 wt %

| | Raw material ratio (wt %) | | | | | Analytical value (wt %) | | | | | Solvent (wt %) | | | | Capacity retention ratio |
|---|---|---|---|---|---|---|---|---|---|---|---|---|---|---|---|
| | Co | Sn | C | P | Fe | Co | Sn | C | P | Fe | FEC | EC | PC | DMC | (%) |
| Example 38-15 | 28.7 | 49 | 20 | 1.5 | 0.8 | 28.5 | 48.5 | 19.8 | 1.5 | 0.8 | 80 | 0 | 0 | 20 | 76 |
| Example 38-16 | 28.7 | 49 | 20 | 1.5 | 0.8 | 28.5 | 48.5 | 19.8 | 1.5 | 0.8 | 90 | 0 | 0 | 10 | 56 |

As evidenced by Table 41, the capacity retention ratio was increased, showed the maximum value, and then was lowered, as the FEC content was increased.

That is, it was found that if the solvent contained FEC, the cycle characteristics were improved regardless of the composition of the solvent, and in particular, higher effects could be obtained if FEC was contained in the range from 1 wt % to 80 wt %.

Examples 39-1 to 39-6

Cylindrical secondary batteries were fabricated in the same manner as in Example 37-1, except that other cyclic ester carbonate derivative having a halogen atom was used instead of FEC. In Example 39-1, DFEC was used. In Example 39-3, Tri-FEC was used. In Example 39-3, Cl-EC was used. In Example 39-4, Br-EC was used. In Example 39-5, I-EC was used. In Example 39-6, F-PC was used.

For the secondary batteries of Examples 39-1 to 39-6, the capacity retention ratio was examined in the same manner as in Examples 24-1 to 24-7. The results are shown in Table 42.

cycle characteristics were improved as in Example 37-1. However, in Example 37-1 in which FEC was used, the capacity retention ratio was particularly improved. That is, it was found that the cycle characteristics could be improved if the solvent contained a cyclic ester carbonate derivative having a halogen atom, and it was particularly effective if the solvent contained FEC.

2-2 Case using gel electrolyte

Examples 40-1 to 40-7

Coin type secondary batteries were formed in the same manner as in Examples 24-1 to 24-7, except that an electrolyte layer composed of a gel electrolyte instead of the liquid electrolyte (electrolytic solution) was formed on the surface of the test electrode 61 and the counter electrode 63. That is, as shown in Table 43, for the test electrode 61, an anode active material whose raw material rations of cobalt, tin, carbon, phosphorus, and iron were similar to those of Examples 24-1

TABLE 42

Co/(Sn + Co) = 37 wt %

| | Raw material ratio (wt %) | | | | | Analytical value (wt %) | | | | | | Capacity retention ratio |
|---|---|---|---|---|---|---|---|---|---|---|---|---|
| | Co | Sn | C | P | Fe | Co | Sn | C | P | Fe | Solvent | (%) |
| Example 24-5 | 28.7 | 49 | 20 | 1.5 | 0.8 | 28.5 | 48.5 | 19.8 | 1.5 | 0.8 | EC + PC + DMC | 79 |
| Example 37-1 | 28.7 | 49 | 20 | 1.5 | 0.8 | 28.5 | 48.5 | 19.8 | 1.5 | 0.8 | FEC + EC + PC + DMC | 92 |
| Example 39-1 | 28.7 | 49 | 20 | 1.5 | 0.8 | 28.5 | 48.5 | 19.8 | 1.5 | 0.8 | DFEC + EC + PC + DMC | 82 |
| Example 39-2 | 28.7 | 49 | 20 | 1.5 | 0.8 | 28.5 | 48.5 | 19.8 | 1.5 | 0.8 | Tri-FEC + EC + PC + DMC | 78 |
| Example 39-3 | 28.7 | 49 | 20 | 1.5 | 0.8 | 28.5 | 48.5 | 19.8 | 1.5 | 0.8 | Cl-EC + EC + PC + DMC | 83 |
| Example 39-4 | 28.7 | 49 | 20 | 1.5 | 0.8 | 28.5 | 48.5 | 19.8 | 1.5 | 0.8 | Br-EC + EC + PC + DMC | 76 |
| Example 39-5 | 28.7 | 49 | 20 | 1.5 | 0.8 | 28.5 | 48.5 | 19.8 | 1.5 | 0.8 | I-EC + EC + PC + DMC | 75 |
| Example 39-6 | 28.7 | 49 | 20 | 1.5 | 0.8 | 28.5 | 48.5 | 19.8 | 1.5 | 0.8 | F-PC + EC + PC + DMC | 85 |

As evidenced by Table 42, even when other cyclic ester carbonate derivative having a halogen atom was used, the to 24-7 was used. The procedure of forming the electrolyte layer was similar to that of Examples 16-1 to 16-7

TABLE 43

Co/(Sn + Co) = 37 wt %

| | Raw material ratio (wt %) | | | | | Analytical value (wt %) | | | | | Half-width | Initial charge capacity | 2 Cy. discharge capacity | 300 Cy. discharge capacity | Capacity retention ratio |
|---|---|---|---|---|---|---|---|---|---|---|---|---|---|---|---|
| | Co | Sn | C | P | Fe | Co | Sn | C | P | Fe | (deg) | (mAh/g) | (mAh/cm$^3$) | | (%) |
| Example 40-1 | 32.4 | 55.3 | 10 | 1.5 | 0.8 | 32.1 | 54.7 | 9.9 | 1.5 | 0.8 | 4.2 | 498 | 110 | 75 | 68 |

TABLE 43-continued

| | Co/(Sn + Co) = 37 wt % | | | | | | | | | | | | | |
|---|---|---|---|---|---|---|---|---|---|---|---|---|---|---|
| | Raw material ratio (wt %) | | | | | Analytical value (wt %) | | | | | Half-width | Initial charge capacity | 2 Cy. discharge capacity | 300 Cy. discharge capacity | Capacity retention ratio |
| | Co | Sn | C | P | Fe | Co | Sn | C | P | Fe | (deg) | (mAh/g) | (mAh/cm³) | | (%) |
| Example 40-2 | 31.7 | 54 | 12 | 1.5 | 0.8 | 31.4 | 53.5 | 11.9 | 1.5 | 0.8 | 4.6 | 500 | 110 | 77 | 70 |
| Example 40-3 | 30.6 | 52.1 | 15 | 1.5 | 0.8 | 30.3 | 51.6 | 14.9 | 1.5 | 0.8 | 5.1 | 509 | 111 | 79 | 71 |
| Example 40-4 | 29.9 | 50.8 | 17 | 1.5 | 0.8 | 29.6 | 50.3 | 16.8 | 1.5 | 0.8 | 5.3 | 516 | 115 | 86 | 75 |
| Example 40-5 | 28.7 | 49 | 20 | 1.5 | 0.8 | 28.5 | 48.5 | 19.8 | 1.5 | 0.8 | 5.6 | 519 | 116 | 88 | 76 |
| Example 40-6 | 26.9 | 45.8 | 25 | 1.5 | 0.8 | 26.6 | 45.3 | 24.8 | 1.5 | 0.8 | 5.7 | 521 | 118 | 91 | 77 |
| Example 40-7 | 25 | 42.7 | 30 | 1.5 | 0.8 | 24.8 | 42.2 | 29.7 | 1.5 | 0.8 | 5.8 | 508 | 117 | 81 | 69 |
| Comparative example 40-1 | 36.1 | 61.6 | 0 | 1.5 | 0.8 | 35.8 | 60.9 | 0 | 1.5 | 0.8 | 0.4 | 449 | 80 | 0 | 0 |
| Comparative example 40-2 | 35.8 | 60.9 | 1 | 1.5 | 0.8 | 35.4 | 60.3 | 1 | 1.5 | 0.8 | 0.6 | 453 | 83 | 0 | 0 |
| Comparative example 40-3 | 34.3 | 58.4 | 5 | 1.5 | 0.8 | 34 | 57.8 | 5 | 1.5 | 0.8 | 2.1 | 473 | 90 | 0 | 0 |
| Comparative example 40-4 | 33.2 | 56.5 | 8 | 1.5 | 0.8 | 32.9 | 55.9 | 7.9 | 1.5 | 0.8 | 3.1 | 479 | 94 | 14 | 15 |
| Comparative example 40-5 | 21.3 | 36.4 | 40 | 1.5 | 0.8 | 21.1 | 36 | 39.6 | 1.5 | 0.8 | 5.8 | 459 | 86 | 18 | 21 |
| Comparative example 40-6 | 17.6 | 30.1 | 50 | 1.5 | 0.8 | 17.5 | 29.8 | 49.5 | 1.5 | 0.8 | 5.8 | 409 | 83 | 13 | 16 |
| Comparative example 40-7 | 15.8 | 26.9 | 55 | 1.5 | 0.8 | 15.6 | 26.6 | 54.5 | 1.5 | 0.8 | 5.8 | 380 | 65 | 6 | 9 |

For the obtained coin type secondary batteries, the initial charge capacity was examined in the same manner as in Examples 24-1 to 24-7. The results are shown in Table 43 and FIG. 33.

Further, the laminated film type secondary batteries shown in FIG. 3 and FIG. 4 were fabricated in the same manner as in Examples 16-1 to 16-7. For these secondary batteries, the capacity retention ratio was examined in the same manner as in Examples 24-1 to 24-7. The results are shown in Table 43 and FIG. 33.

As Comparative examples 40-1 to 40-7 relative to Examples 40-1 to 40-7, secondary batteries were fabricated in the same manner as in Examples 40-1 to 40-7, except that anode active materials in which the raw material ratios of cobalt, tin, carbon, phosphorus, and iron were as shown in Table 43 were used, that is, anode active materials similar to those of Comparative examples 24-1 to 24-7 were used.

For the obtained secondary batteries of Comparative examples 40-1 to 40-7, the initial charge capacity and the capacity retention ratio were also examined. The results are shown in Table 43 and FIG. 33.

Figure 33:
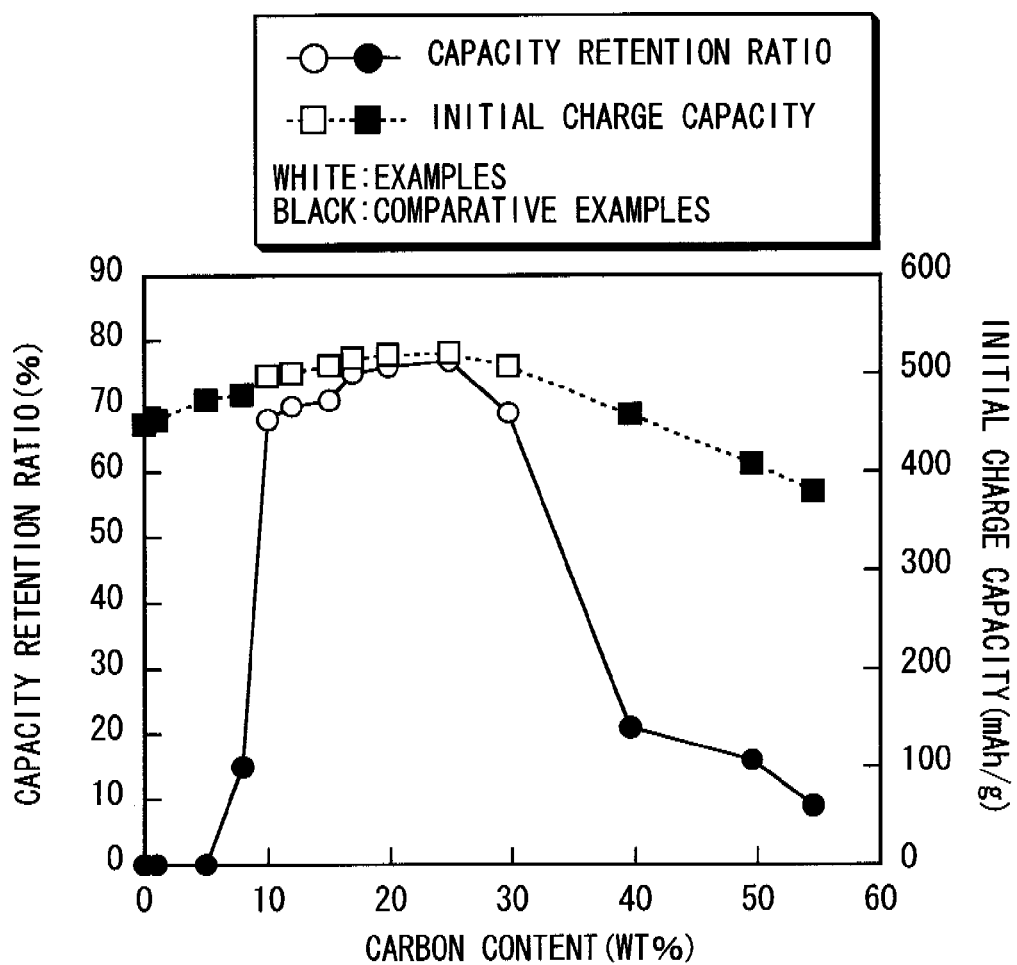
FIG. 33 is a characteristics diagram showing a relation between carbon contents in anode active materials of batteries according to the second embodiment (gel electrolyte) and capacity retention ratios/initial charge capacities.

As evidenced by Table 43 and FIG. 33, results similar to those of Examples 24-1 to 24-7 were obtained. That is, it was found that even in the case that the gel electrolyte was used, if the carbon content was in the range from 9.9 wt % to 29.7 wt %, the capacity and the cycle characteristics could be improved, the carbon content was more preferably in the range from 14.9 wt % to 29.7 wt %, and much more preferably in the range from 16.8 wt % to 24.8 wt %.

Examples 41-1 to 41-11, 42-1 to 42-11, and 43-1 to 43-11

As Examples 41-1 to 41-11, anode active materials and secondary batteries were formed in the same manner as in Examples 40-1 to 40-7, except that, as shown in Table 44, the raw material ratio of carbon was set to the constant value of 10 wt %, the raw material ratio of phosphorus was set to the constant value of 1.5 wt %, the raw material ratio of iron was set to the constant value of 0.8 wt %, and the Co/(Sn+Co) ratio was changed in the range from 24 wt % to 70 wt %, that is, the raw material ratios were similar to those pf Examples 25-1 to 25-11. As Comparative examples 41-1 to 41-3 relative to Examples 41-1 to 41-11, anode active materials and secondary batteries were formed in the same manner as in Examples 41-1 to 41-11, except that, as shown in Table 44, the Co/(Sn+Co) ratio was respectively 75 wt %, 20 wt %, and 16 wt %, that is, the raw material ratios were similar to those of Comparative examples 25-1 to 25-3.

TABLE 44

| | Raw material ratio (wt %) | | | | | Analytical value (wt %) | | | | | Co/(Sn + Co) (wt %) | Half-width (deg) | Initial charge capacity (mAh/g) | 2 Cy. discharge capacity (mAh/cm$^3$) | 300 Cy. discharge capacity (mAh/cm$^3$) | Capacity retention ratio (%) |
|---|---|---|---|---|---|---|---|---|---|---|---|---|---|---|---|---|
| | Co | Sn | C | P | Fe | Co | Sn | C | P | Fe | | | | | | |
| Example 41-1 | 61.4 | 26.3 | 10 | 1.5 | 0.8 | 60.8 | 26 | 9.9 | 1.5 | 0.8 | 70 | 4.5 | 367 | 82 | 63 | 77 |
| Example 41-2 | 57 | 30.7 | 10 | 1.5 | 0.8 | 56.4 | 30.4 | 9.9 | 1.5 | 0.8 | 65 | 4.5 | 377 | 83 | 62 | 75 |
| Example 41-3 | 52.6 | 35.1 | 10 | 1.5 | 0.8 | 52.1 | 34.7 | 9.9 | 1.5 | 0.8 | 60 | 4.5 | 395 | 85 | 63 | 74 |
| Example 41-4 | 48.2 | 39.5 | 10 | 1.5 | 0.8 | 47.8 | 39.1 | 9.9 | 1.5 | 0.8 | 55 | 4.4 | 418 | 86 | 63 | 73 |
| Example 41-5 | 43.9 | 43.9 | 10 | 1.5 | 0.8 | 43.4 | 43.4 | 9.9 | 1.5 | 0.8 | 50 | 4.3 | 445 | 88 | 64 | 73 |
| Example 41-6 | 39.5 | 48.2 | 10 | 1.5 | 0.8 | 39.1 | 47.8 | 9.9 | 1.5 | 0.8 | 45 | 4.3 | 468 | 95 | 67 | 70 |
| Example 41-7 | 35.1 | 52.6 | 10 | 1.5 | 0.8 | 34.7 | 52.1 | 9.9 | 1.5 | 0.8 | 40 | 4.2 | 486 | 105 | 74 | 70 |
| Example 40-1 | 32.4 | 55.3 | 10 | 1.5 | 0.8 | 32.1 | 54.7 | 9.9 | 1.5 | 0.8 | 37 | 4.2 | 498 | 110 | 75 | 68 |
| Example 41-8 | 28.9 | 58.8 | 10 | 1.5 | 0.8 | 28.7 | 58.2 | 9.9 | 1.5 | 0.8 | 33 | 4.2 | 529 | 113 | 76 | 67 |
| Example 41-9 | 26.3 | 61.4 | 10 | 1.5 | 0.8 | 26 | 60.8 | 9.9 | 1.5 | 0.8 | 30 | 4.2 | 558 | 114 | 74 | 65 |
| Example 41-10 | 24.6 | 63.1 | 10 | 1.5 | 0.8 | 24.3 | 62.5 | 9.9 | 1.5 | 0.8 | 28 | 4.1 | 560 | 115 | 74 | 64 |
| Example 41-11 | 21 | 66.7 | 10 | 1.5 | 0.8 | 20.8 | 66 | 9.9 | 1.5 | 0.8 | 24 | 4 | 568 | 117 | 73 | 62 |
| Comparative example 41-1 | 65.8 | 21.9 | 10 | 1.5 | 0.8 | 65.1 | 21.7 | 9.9 | 1.5 | 0.8 | 75 | 4.5 | 321 | 65 | 46 | 71 |
| Comparative example 41-2 | 17.5 | 70.2 | 10 | 1.5 | 0.8 | 17.4 | 69.5 | 9.9 | 1.5 | 0.8 | 20 | 3 | 600 | 48 | 9 | 18 |
| Comparative example 41-3 | 14 | 73.7 | 10 | 1.5 | 0.8 | 13.9 | 72.9 | 9.9 | 1.5 | 0.8 | 16 | 2.5 | 601 | 44 | 0 | 0 |

As Examples 42-1 to 42-11, anode active materials and secondary batteries were formed in the same manner as in Examples 24-1 to 24-7, except that, as shown in Table 45, the raw material ratio of carbon was set to the constant value of 20 wt %, the raw material ration of phosphorus was set to the constant value of 1.5 wt %, the raw material ratio of iron was set to the constant value of 0.8 wt %, and the Co/(Sn+Co) ratio was changed in the range from 24 wt % to 70 wt %, that is, raw material ratios were similar to those of Examples 26-1 to 26-11. As Comparative examples 42-1 to 42-3 relative to Examples 42-1 to 42-11, anode active materials and secondary batteries were formed in the same manner as in Examples 42-1 to 42-11, except that, as shown in Table 45, the Co/(Sn+Co) ratio was changed respectively 75 wt %, 20 wt %, and 16 wt %, that is, the raw material ratios were similar to those of Comparative examples 26-1 to 26-3.

TABLE 45

| | Raw material ratio (wt %) | | | | | Analytical value (wt %) | | | | | Co/(Sn + Co) (wt %) | Half-width (deg) | Initial charge capacity (mAh/g) | 2 Cy. discharge capacity (mAh/cm$^3$) | 300 Cy. discharge capacity (mAh/cm$^3$) | Capacity retention ratio (%) |
|---|---|---|---|---|---|---|---|---|---|---|---|---|---|---|---|---|
| | Co | Sn | C | P | Fe | Co | Sn | C | P | Fe | | | | | | |
| Example 42-1 | 54.4 | 23.3 | 20 | 1.5 | 0.8 | 53.8 | 23.1 | 19.8 | 1.5 | 0.8 | 70 | 5.8 | 367 | 80 | 70 | 87 |
| Example 42-2 | 50.5 | 27.2 | 20 | 1.5 | 0.8 | 50 | 26.9 | 19.8 | 1.5 | 0.8 | 65 | 5.8 | 378 | 82 | 71 | 87 |
| Example 42-3 | 46.6 | 31.1 | 20 | 1.5 | 0.8 | 46.2 | 30.8 | 19.8 | 1.5 | 0.8 | 60 | 5.7 | 398 | 87 | 75 | 86 |
| Example 42-4 | 42.7 | 35 | 20 | 1.5 | 0.8 | 42.3 | 34.6 | 19.8 | 1.5 | 0.8 | 55 | 5.7 | 418 | 95 | 81 | 85 |
| Example 42-5 | 38.9 | 38.9 | 20 | 1.5 | 0.8 | 38.5 | 38.5 | 19.8 | 1.5 | 0.8 | 50 | 5.7 | 450 | 96 | 80 | 83 |
| Example 42-6 | 35 | 42.7 | 20 | 1.5 | 0.8 | 34.6 | 42.3 | 19.8 | 1.5 | 0.8 | 45 | 5.6 | 478 | 105 | 85 | 81 |
| Example 42-7 | 31.1 | 46.6 | 20 | 1.5 | 0.8 | 30.8 | 46.2 | 19.8 | 1.5 | 0.8 | 40 | 5.6 | 501 | 108 | 85 | 79 |
| Example 40-5 | 28.7 | 49 | 20 | 1.5 | 0.8 | 28.5 | 48.5 | 19.8 | 1.5 | 0.8 | 37 | 5.6 | 519 | 116 | 88 | 76 |
| Example 42-8 | 25.6 | 52.1 | 20 | 1.5 | 0.8 | 25.4 | 51.5 | 19.8 | 1.5 | 0.8 | 33 | 5.6 | 542 | 116 | 85 | 73 |
| Example 42-9 | 23.3 | 54.4 | 20 | 1.5 | 0.8 | 23.1 | 53.8 | 19.8 | 1.5 | 0.8 | 30 | 5.5 | 557 | 116 | 84 | 72 |
| Example 42-10 | 21.8 | 55.9 | 20 | 1.5 | 0.8 | 21.5 | 55.4 | 19.8 | 1.5 | 0.8 | 28 | 5.4 | 561 | 110 | 78 | 71 |
| Example 42-11 | 18.6 | 59.1 | 20 | 1.5 | 0.8 | 18.5 | 58.5 | 19.8 | 1.5 | 0.8 | 24 | 5.3 | 571 | 108 | 71 | 66 |
| Comparative example 42-1 | 58.3 | 19.4 | 20 | 1.5 | 0.8 | 57.7 | 19.2 | 19.8 | 1.5 | 0.8 | 75 | 5.8 | 255 | 61 | 53 | 87 |
| Comparative example 42-2 | 15.5 | 62.2 | 20 | 1.5 | 0.8 | 15.4 | 61.5 | 19.8 | 1.5 | 0.8 | 20 | 5.0 | 599 | 46 | 13 | 29 |
| Comparative example 42-3 | 12.4 | 65.3 | 20 | 1.5 | 0.8 | 12.3 | 64.6 | 19.8 | 1.5 | 0.8 | 16 | 4.6 | 601 | 44 | 10 | 23 |

As examples 43-1 to 43-11, anode active materials and secondary batteries were formed in the same manner as in Examples 24-1 to 24-7, except that, as shown in Table 46, the raw material ratio of carbon was set to the constant value of 30 wt %, the raw material ratio of phosphorus was set to the constant value of 1.5 wt %, the raw material ratio of iron was set to the constant value of 0.8 wt %, and the Co/(Sn+Co) ratio was changed in the range from 24 wt % to 70 wt %, that is, the raw material ratios were similar to those of Examples 27-1 to 27-11. As Comparative examples 43-1 to 43-3 relative to Examples 43-1 to 43-11, anode active materials and secondary batteries were formed in the same manner as in Examples 43-1 to 43-11, except that, as shown in Table 46, the Co/(Sn+Co) ratio was respectively 75 wt %, 20 wt %, and 16 wt %, that is, raw material ratios were similar to thsoe of Comparative examples 27-1 to 27-3.

27-1 to 27-11 were obtained. That is, it was found that if the Co/(Sn+Co) ratio was from 24 wt % to 70 wt %, even in the case that the gel electrolyte was used, the capacity and the cycle characteristics could be improved, and the Co/(Sn+Co) ratio was more preferably 60 wt % or less.

Examples 44-1 to 44-5

Anode active materials and secondary batteries were formed in the same manner as in Examples 40-1 to 40-7, except that, as shown in Table 47, the raw material ratio of carbon was set to the constant value of 20 wt %, the raw material ratio of iron was set to the constant value of 0.8 wt %, the Co/(Sn+Co) ratio was set to the constant value of 37 wt %, and the raw material ratio of phosphorus was changed in the range from 0.1 wt % to 2.2 wt %, that is, the raw material

TABLE 46

|  | Raw material ratio (wt %) | | | | | Analytical value (wt %) | | | | | Co/ (Sn + Co) (wt %) | Half-width (deg) | Initial charge capacity (mAh/g) | 2 Cy. discharge capacity (mAh/cm³) | 300 Cy. discharge capacity | Capacity retention ratio (%) |
| --- | --- | --- | --- | --- | --- | --- | --- | --- | --- | --- | --- | --- | --- | --- | --- | --- |
|  | Co | Sn | C | P | Fe | Co | Sn | C | P | Fe |  |  |  |  |  |  |
| Example 43-1 | 47.4 | 20.3 | 30 | 1.5 | 0.8 | 46.9 | 20.1 | 29.7 | 1.5 | 0.8 | 70 | 6.4 | 321 | 63 | 55 | 88 |
| Example 43-2 | 44 | 23.7 | 30 | 1.5 | 0.8 | 43.6 | 23.5 | 29.7 | 1.5 | 0.8 | 65 | 6.3 | 399 | 80 | 67 | 84 |
| Example 43-3 | 40.6 | 27.1 | 30 | 1.5 | 0.8 | 40.2 | 26.8 | 29.7 | 1.5 | 0.8 | 60 | 6.2 | 418 | 84 | 67 | 80 |
| Example 43-4 | 37.2 | 30.5 | 30 | 1.5 | 0.8 | 36.9 | 30.2 | 29.7 | 1.5 | 0.8 | 55 | 6.1 | 427 | 90 | 70 | 78 |
| Example 43-5 | 33.9 | 33.9 | 30 | 1.5 | 0.8 | 33.5 | 33.5 | 29.7 | 1.5 | 0.8 | 50 | 6 | 456 | 93 | 69 | 74 |
| Example 43-6 | 30.5 | 37.2 | 30 | 1.5 | 0.8 | 30.2 | 36.9 | 29.7 | 1.5 | 0.8 | 45 | 5.9 | 469 | 94 | 70 | 74 |
| Example 43-7 | 27.1 | 40.6 | 30 | 1.5 | 0.8 | 26.8 | 40.2 | 29.7 | 1.5 | 0.8 | 40 | 5.9 | 496 | 99 | 69 | 70 |
| Example 40-7 | 25 | 42.7 | 30 | 1.5 | 0.8 | 24.8 | 42.2 | 29.7 | 1.5 | 0.8 | 37 | 5.8 | 508 | 117 | 81 | 69 |
| Example 43-8 | 22.3 | 45.4 | 30 | 1.5 | 0.8 | 22.1 | 44.9 | 29.7 | 1.5 | 0.8 | 33 | 5.8 | 516 | 118 | 79 | 67 |
| Example 43-9 | 20.3 | 47.4 | 30 | 1.5 | 0.8 | 20.1 | 46.9 | 29.7 | 1.5 | 0.8 | 30 | 5.7 | 522 | 119 | 79 | 66 |
| Example 43-10 | 19 | 48.7 | 30 | 1.5 | 0.8 | 18.8 | 48.3 | 29.7 | 1.5 | 0.8 | 28 | 5.7 | 531 | 119 | 77 | 65 |
| Example 43-11 | 16.2 | 51.5 | 30 | 1.5 | 0.8 | 16.1 | 50.9 | 29.7 | 1.5 | 0.8 | 24 | 5.6 | 542 | 122 | 73 | 60 |
| Comparative example 43-1 | 50.8 | 16.9 | 30 | 1.5 | 0.8 | 50.3 | 16.8 | 29.7 | 1.5 | 0.8 | 75 | 6.5 | 269 | 61 | 54 | 88 |
| Comparative example 43-2 | 13.5 | 54.2 | 30 | 1.5 | 0.8 | 13.4 | 53.6 | 29.7 | 1.5 | 0.8 | 20 | 4.9 | 553 | 46 | 8 | 18 |
| Comparative example 43-3 | 10.8 | 56.9 | 30 | 1.5 | 0.8 | 10.7 | 56.3 | 29.7 | 1.5 | 0.8 | 16 | 4.6 | 558 | 43 | 0 | 0 |

For the secondary batteries of Examples 41-1 to 41-11, 42-1 to 42-11, and 43-1 to 43-11 and Comparative examples 41-1 to 41-3, 42-1 to 42-3, and 43-1 to 43-3, the charge capacity and the capacity retention ratio were examined in the same manner as in Examples 24-1 to 24-7. The results are shown in Tables 44 to 46 and FIGS. 34 to 36.

Figure 34:
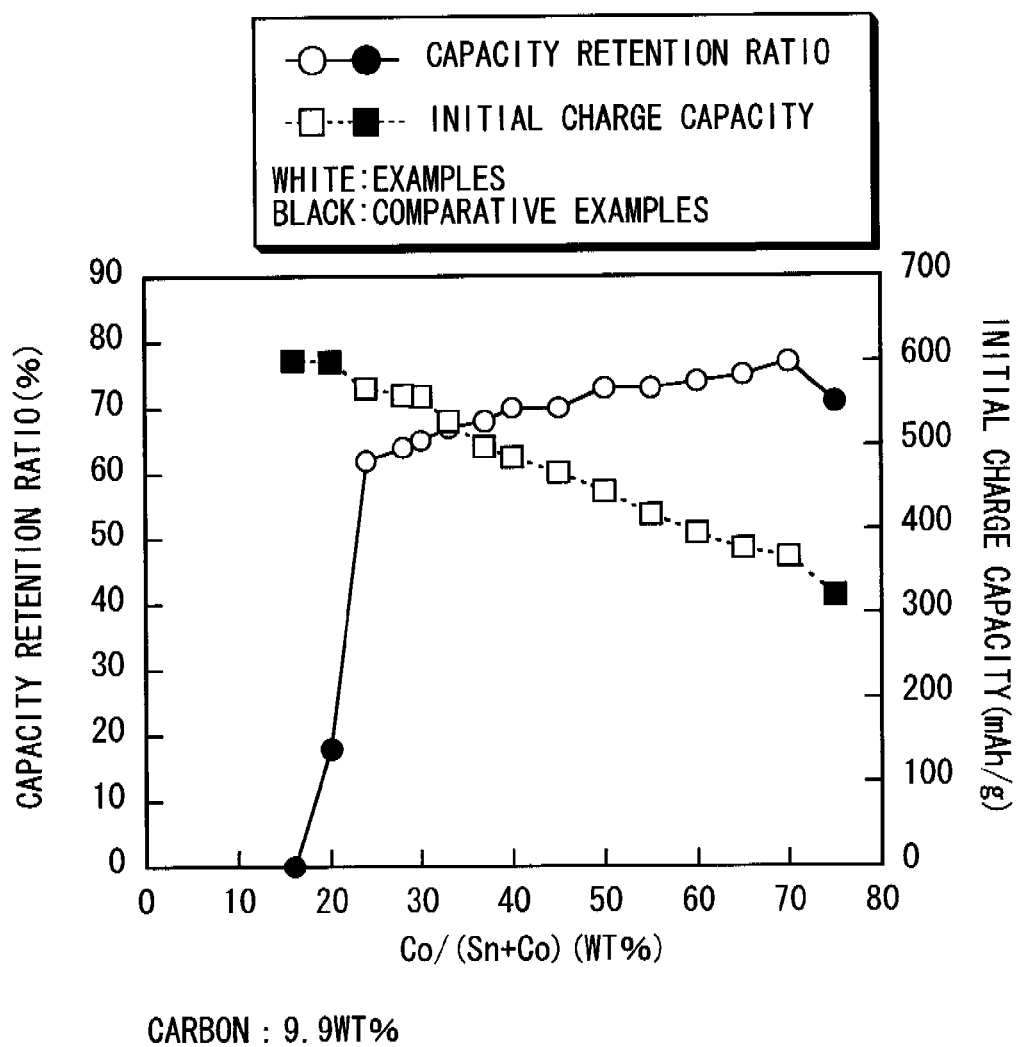
FIG. 34 is a characteristics diagram showing a relation between cobalt ratios to the total of tin and cobalt in anode active materials of the batteries according to the second embodiment (gel electrolyte) and capacity retention ratios/initial charge capacities.
Figure 35:
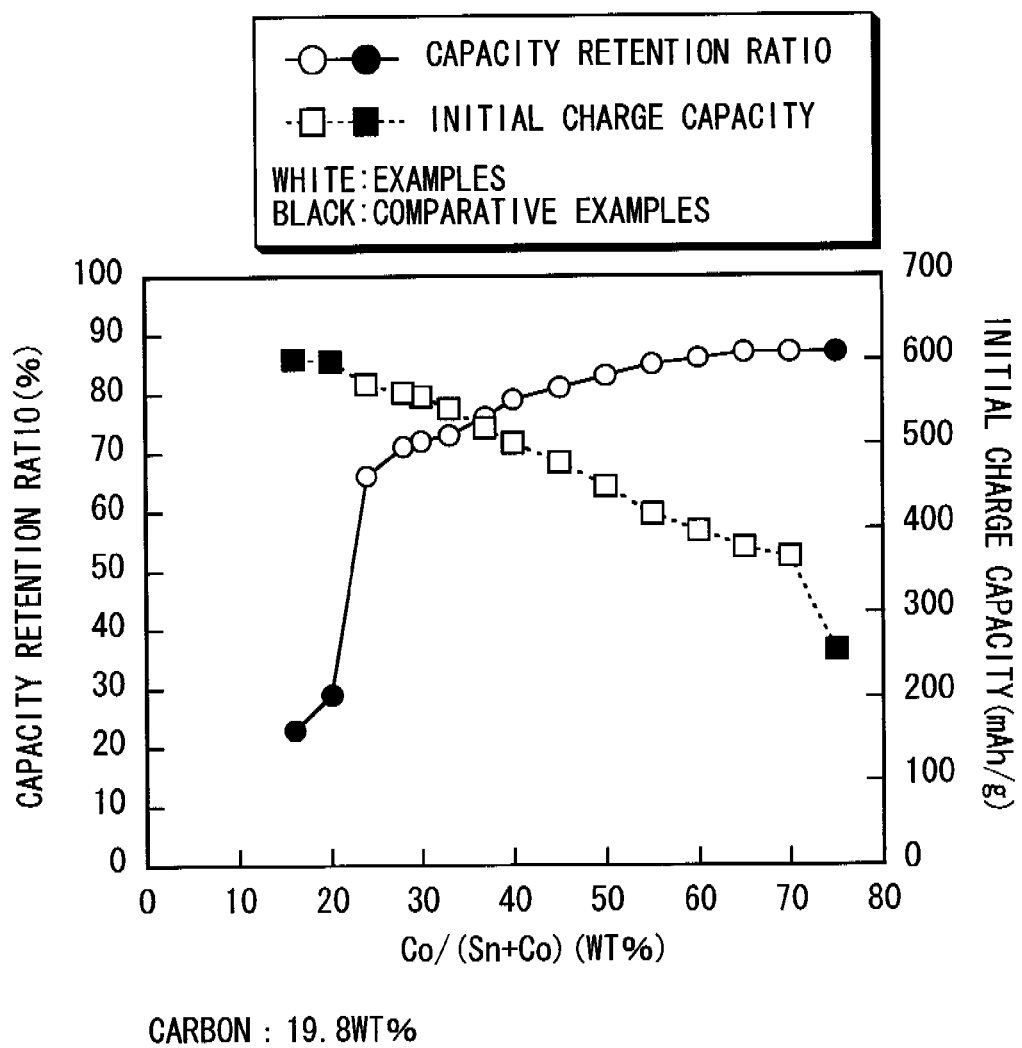
FIG. 35 is another characteristics diagram showing a relation between cobalt ratios to the total of tin and cobalt in anode active materials of the batteries according to the second embodiment (gel electrolyte) and capacity retention ratios/initial charge capacities.
Figure 36:
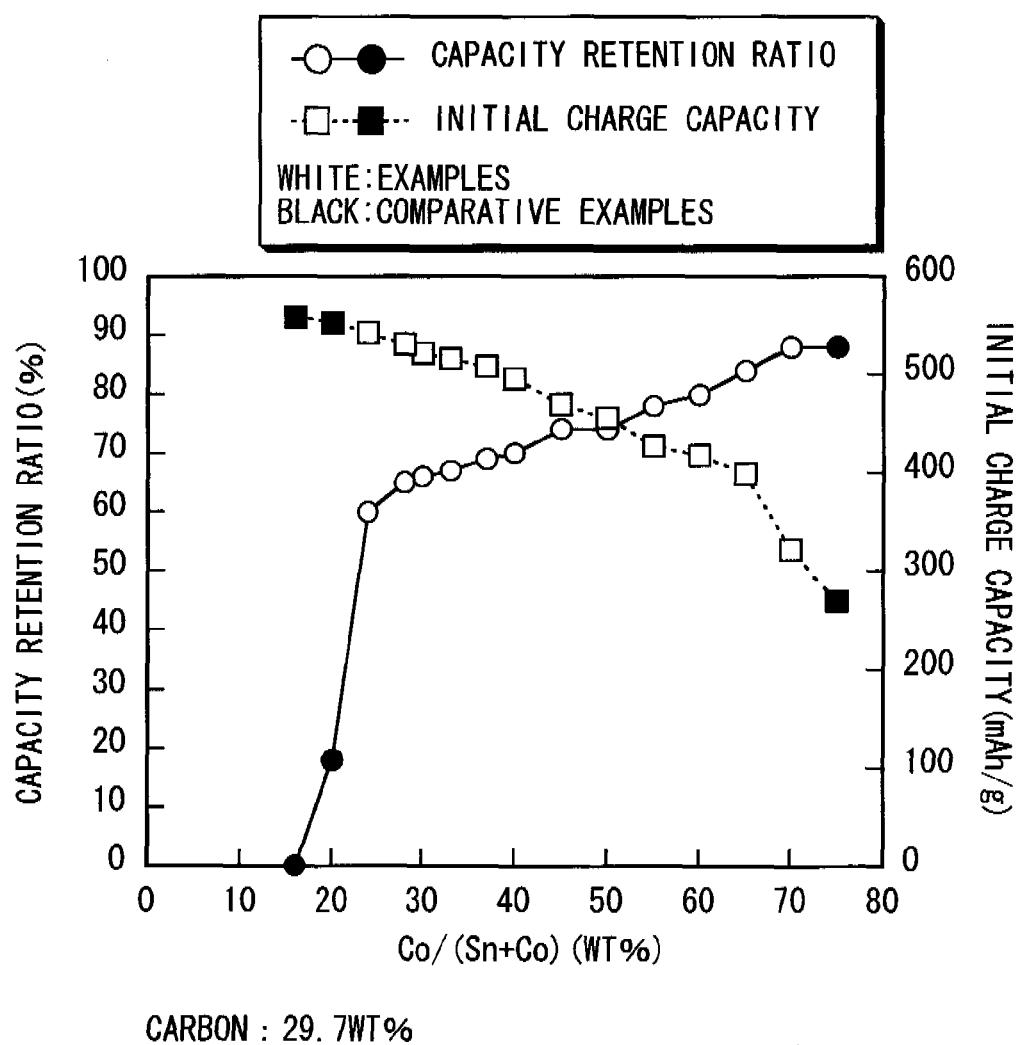
FIG. 36 is still another characteristics diagram showing a relation between cobalt ratios to the total of tin and cobalt in anode active materials of the batteries according to the second embodiment (gel electrolyte) and capacity retention ratios/initial charge capacities.

As evidenced by Tables 44 to 46 and FIGS. 34 to 36, results similar to those of Examples 25-1 to 25-11, 26-1 to 26-11, and ratios thereof were similar to those of Examples 28-1 to 28-5, As Comparative examples 44-1 to 44-3 relative to Examples 44-1 to 44-5, anode active materials and secondary batteries were formed in the same manner as in Examples 44-1 to 44-5, except that, as shown in Table 47, the raw material ratio of phosphorus was respectively 0 wt %, 3 wt % and 5 wt %, that is, the raw material ratios were similar to those of Comparative examples 28-1 to 28-3.

TABLE 47

Co/(Sn + Co) = 37 wt %

|  | Raw material ratio (wt %) | | | | | Analytical value (wt %) | | | | | Half-width (deg) | Initial charge capacity (mAh/g) | Initial charge and discharge efficiency (%) | 2 Cy. discharge capacity (mAh/cm³) | 300 Cy. discharge capacity | Capacity retention ratio (%) |
|---|---|---|---|---|---|---|---|---|---|---|---|---|---|---|---|---|
|  | Co | Sn | C | P | Fe | Co | Sn | C | P | Fe | | | | | | |
| Example 44-1 | 29.3 | 49.8 | 20 | 0.1 | 0.8 | 29 | 49.3 | 19.8 | 0.1 | 0.8 | 4.9 | 502 | 81 | 113 | 80 | 71 |
| Example 44-2 | 29.1 | 49.6 | 20 | 0.5 | 0.8 | 28.8 | 49.1 | 19.8 | 0.5 | 0.8 | 5.2 | 511 | 82 | 115 | 86 | 75 |
| Example 44-3 | 28.9 | 49.3 | 20 | 1 | 0.8 | 28.6 | 48.8 | 19.8 | 1 | 0.8 | 5.4 | 516 | 82 | 116 | 87 | 75 |
| Example 40-5 | 28.7 | 49 | 20 | 1.5 | 0.8 | 28.5 | 48.5 | 19.8 | 1.5 | 0.8 | 5.6 | 519 | 82 | 116 | 88 | 76 |
| Example 44-4 | 28.6 | 48.6 | 20 | 2 | 0.8 | 28.3 | 48.1 | 19.8 | 2 | 0.8 | 5.7 | 523 | 82 | 116 | 88 | 76 |
| Example 44-5 | 28.5 | 48.5 | 20 | 2.2 | 0.8 | 28.2 | 48 | 19.8 | 2.2 | 0.8 | 5.7 | 527 | 82 | 117 | 90 | 77 |
| Comparative example 44-1 | 29.3 | 49.9 | 20 | 0 | 0.8 | 29 | 49.4 | 19.8 | 0 | 0.8 | 4.8 | 497 | 80 | 112 | 81 | 72 |
| Comparative example 44-2 | 28.2 | 48 | 20 | 3 | 0.8 | 27.9 | 47.5 | 19.8 | 3 | 0.8 | 5.9 | 532 | 80 | 117 | 90 | 77 |
| Comparative example 44-3 | 27.5 | 46.7 | 20 | 5 | 0.8 | 27.2 | 46.3 | 19.8 | 5 | 0.8 | 6.3 | 542 | 80 | 118 | 92 | 78 |

Figure 37:
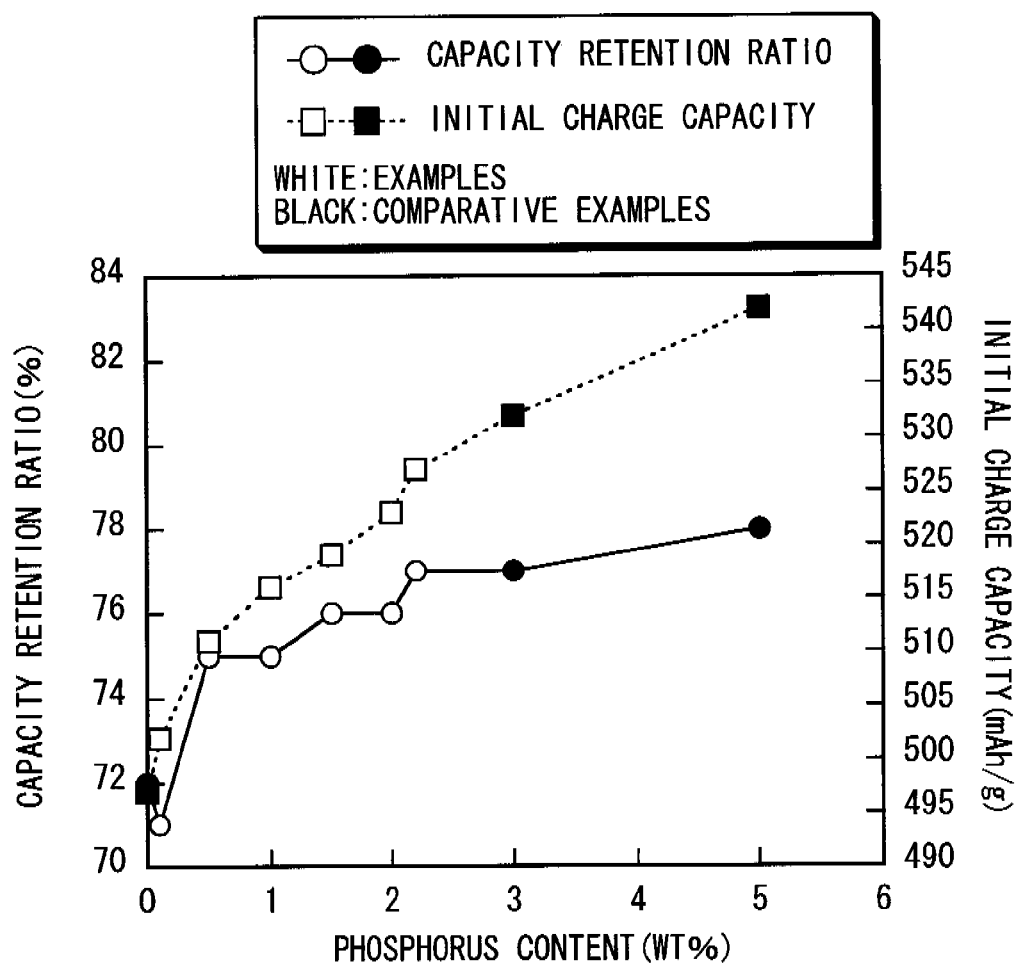
FIG. 37 is a characteristics diagram showing a relation between phosphorus contents in anode active materials of the batteries according to the second embodiment (gel electrolyte) and capacity retention ratios/initial charge capacities.
Figure 38:
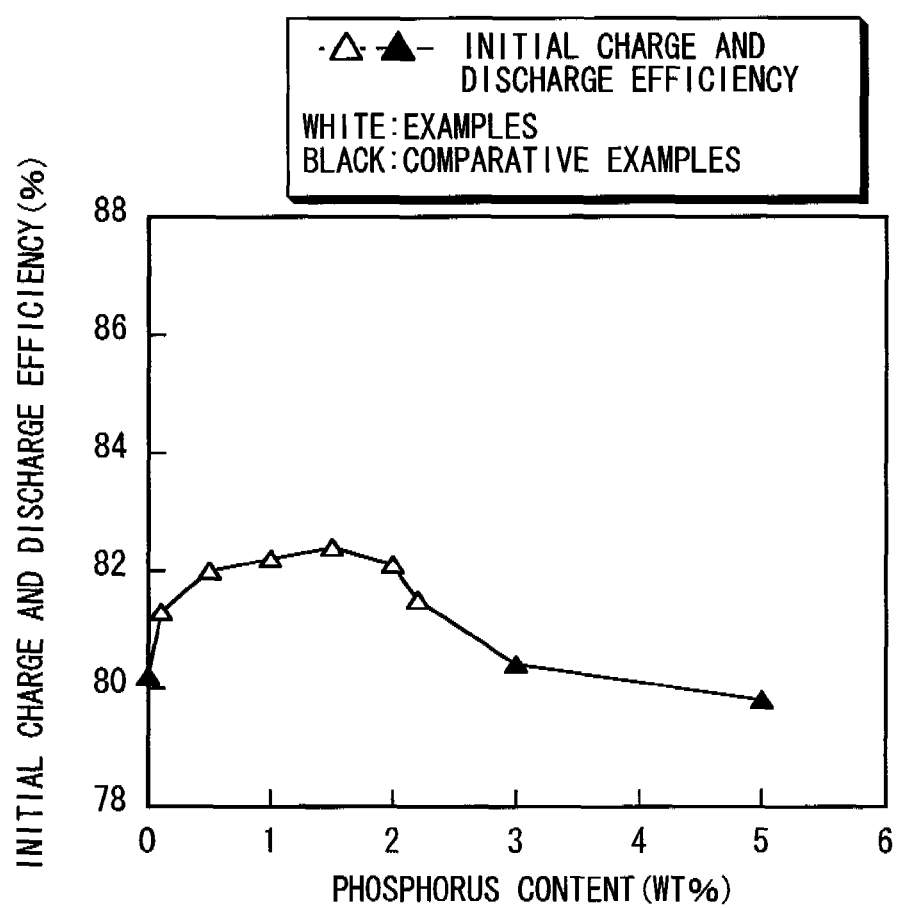
FIG. 38 is a characteristics diagram showing a relation between the phosphorus contents in the anode active materials of the batteries according to the second embodiment (gel electrolyte) and initial charge and discharge efficiencies.

For the secondary batteries of Examples 44-1 to 44-5 and Comparative examples 44-1 to 44-3, the initial charge capacity, the initial charge and discharge efficiency, and the capacity retention ratio were examined in the same manner as in Examples 28-1 to 28-5, The results are shown in Table 47, and FIG. 37, and FIG. 38.

As evidenced by Table 47, FIG. 37, and FIG. 38, results similar to those of Examples 28-1 to 28-5 were obtained. That is, if the phosphorus content was in the range from 0.1 wt % to 2.2 wt %, the initial charge and discharge fficiency could be improved as well as the capacity and the cycle characteristics could, and the phosphorus content was more preferably in the range from 0.5 wt % to 2 wt %.

Examples 45-1 to 45-7

Secondary batteries were found in the same manner as in Examples 40-1 to 40-7, except that, as shown in Table 48, the raw material ratio of carbon was set to the constant value of 20 wt %, the raw material ratio of phosphorus was set to the constant value of 1.5 wt %, the Co/(Sn+Co) ratio was set to the constant value of 37 wt %, and the raw material ratio of iron was changed in the range from 0.1 wt % to 6 wt %, that is, the raw material ratios were similar to those of Examples 9-1 to 29-7.

TABLE 48

Co/(Sn + Co) = 37 wt %

|  | Raw material ratio (wt %) | | | | | Analytical value (wt %) | | | | | Half-width (deg) | Initial charge capacity (mAh/g) | 2 Cy. discharge capacity (mAh/cm³) | 300 Cy. discharge capacity | Capacity retention ratio (%) |
|---|---|---|---|---|---|---|---|---|---|---|---|---|---|---|---|
|  | Co | Sn | C | P | Fe | Co | Sn | C | P | Fe | | | | | |
| Example 16-5 | 29 | 49.5 | 20 | 1.5 | 0 | 28.8 | 49 | 19.8 | 1.5 | 0 | 5.6 | 522 | 116 | 86 | 74 |
| Example 45-1 | 29 | 49.4 | 20 | 1.5 | 0.1 | 28.7 | 48.9 | 19.8 | 1.5 | 0.1 | 5.6 | 522 | 116 | 86 | 74 |
| Example 45-2 | 29 | 49.3 | 20 | 1.5 | 0.2 | 28.7 | 48.8 | 19.8 | 1.5 | 0.2 | 5.6 | 521 | 116 | 87 | 75 |
| Example 45-3 | 28.9 | 49.3 | 20 | 1.5 | 0.3 | 28.6 | 48.8 | 19.8 | 1.5 | 0.3 | 5.6 | 520 | 116 | 87 | 75 |
| Example 40-5 | 28.7 | 49 | 20 | 1.5 | 0.8 | 28.5 | 48.5 | 19.8 | 1.5 | 0.8 | 5.6 | 519 | 116 | 88 | 76 |
| Example 45-4 | 28.7 | 48.8 | 20 | 1.5 | 1 | 28.4 | 48.3 | 19.8 | 1.5 | 1 | 5.6 | 516 | 114 | 88 | 77 |
| Example 45-5 | 27.9 | 47.6 | 20 | 1.5 | 3 | 27.7 | 47.1 | 19.8 | 1.5 | 3 | 5.6 | 510 | 112 | 87 | 78 |
| Example 45-6 | 27.2 | 46.3 | 20 | 1.5 | 5 | 26.9 | 45.8 | 19.8 | 1.5 | 5 | 5.6 | 508 | 110 | 86 | 78 |
| Example 45-7 | 26.8 | 45.7 | 20 | 1.5 | 6 | 26.6 | 45.2 | 19.8 | 1.5 | 5.9 | 5.6 | 500 | 106 | 85 | 80 |
| Comparative example 45-1 | 26.6 | 45.4 | 20 | 1.5 | 6.5 | 26.4 | 44.9 | 19.8 | 1.5 | 6.4 | 5.6 | 460 | 104 | 84 | 81 |
| Comparative example 45-2 | 26.5 | 45 | 20 | 1.5 | 7 | 2.62 | 44.6 | 19.8 | 1.5 | 6.9 | 5.6 | 433 | 99 | 81 | 82 |

As Comparative examples 45-1 to 45-2 relative to Examples 45-1 to 45-7, anode active materials and secondary batteries were formed in the same manner as in Examples 40-1 to 40-7, except that, as shown in Table 48, an anode active material synthesized so that the raw material ratio of iron was respectively 6.5 et % adn 7 wt % was used, that is, an anode active material synthesized in the same manner as in Comparative examples 29-1 to 29-2 was used.

For the secondary batteries of Examples 45-1 to 45-7 and Comparative examples 45-1 and 45-3, the charge capacity and the capacity retention ratio were examined in the same manner as in Examples 40-1 to 40-7. The results are shown in Table 48 and FIG. 39.

Figure 39:
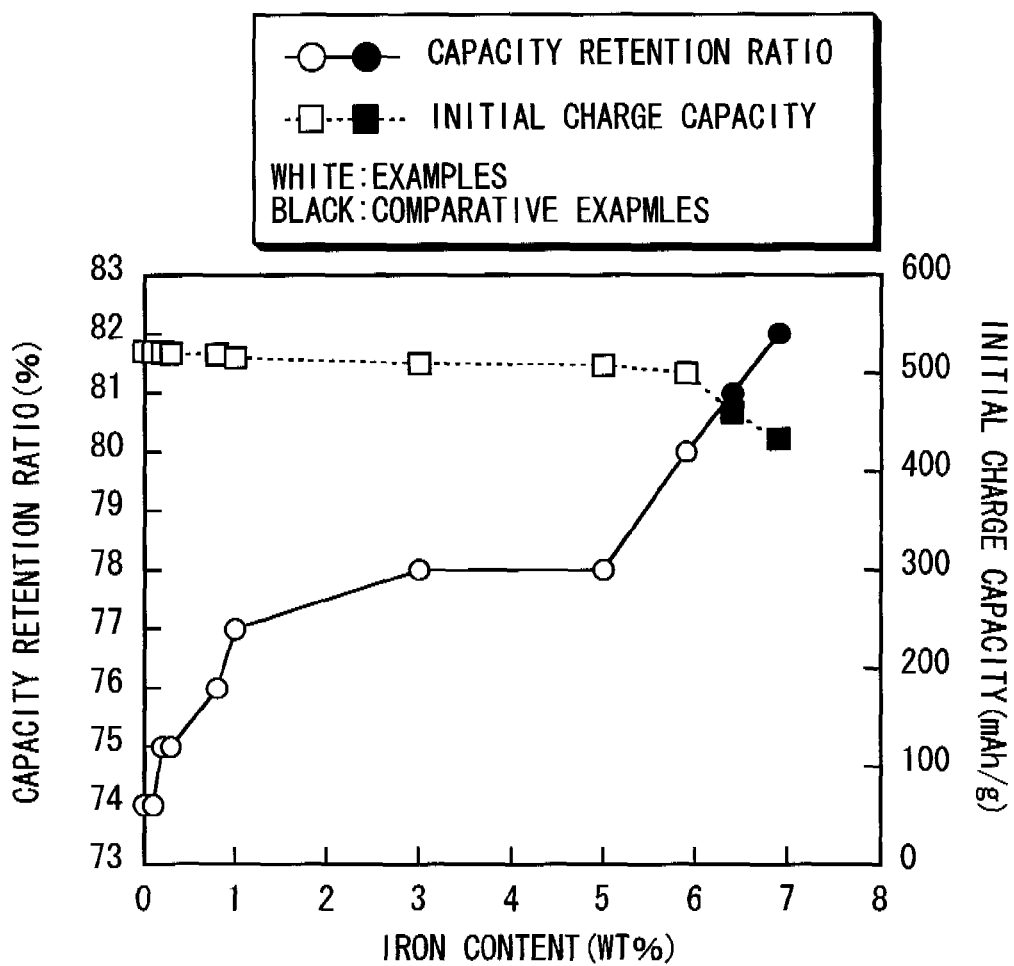
FIG. 39 is a characteristics diagram showing a relation between iron contents in anode active materials of the batteries according to the second embodiment (gel electrolyte) and capacity retention ratios/initial charge capacities.

As evidenced by Table 48 and FIG. 39, results similar to those of Examples 29-1 to 29-7 were obtained. That is, it was found that if the iron content was from 0.1 wt % to 5.9 wt %, the capacity and the cycle characteristics could be improved even in the case that the gel electrolyte was used.

Examples 46-1 to 46-11

Anode active materials and secondary batteries were formed in the same manner as in Examples 40-1 to 40-7, except that the raw material ratio of carbon was set to the constant value of 20 wt %, the raw material ratio of phosphorus was set to the constant value of 1.5 wt %, the raw material ratio of iron was set to the constant value of 0.8 wt %, the Co/(Sn+Co) ratio was set to the constant value of 37 wt %, and the raw material ratio of silicon was changed in the range from 0.3 wt % to 10 wt %, that is, the raw material ratios were similar to those of Examples 32-1 to 32-11.

For the secondary batteries of Examples 46-1 to 46-11, the initial charge capacity and the capacity retention ratio were examined in the same manner as in Examples 40-1 to 40-7. The results are shown in Table 50.

TABLE 50

|  | Initial charge capacity (mAh/g) | 2 Cy. discharge capacity (mAh/cm³) | 300 Cy. discharge capacity (mAh/cm³) | Capacity retention ratio (%) |
|---|---|---|---|---|
| Example 40-5 | 519 | 116 | 88 | 76 |
| Example 46-1 | 522 | 116 | 88 | 76 |
| Example 46-2 | 527 | 117 | 87 | 74 |
| Example 46-3 | 549 | 118 | 86 | 73 |
| Example 46-4 | 559 | 119 | 84 | 71 |
| Example 46-5 | 572 | 120 | 83 | 69 |
| Example 46-6 | 598 | 122 | 84 | 69 |
| Example 46-7 | 608 | 125 | 85 | 68 |
| Example 46-8 | 620 | 127 | 79 | 62 |
| Example 46-9 | 631 | 128 | 60 | 47 |
| Example 46-10 | 658 | 131 | 42 | 32 |
| Example 46-11 | 688 | 134 | 24 | 18 |

As Evidenced by Table 49 and Table 50, results similar to those of Examples 32-1 to 32-11. That is, it was found that if the anode active material contained silicon, the capacity could be improved even in the case that the gel electrolyte was used, and the silicon content was preferably in the range from 0.5 wt % to 7.9 wt %.

Examples 47-1 to 47-12

Anode active materials and secondary batteries were formed in the same manner as in Examples 40-1 to 40-7, except that the raw material ratio of carbon was set to the constant value of 20 wt %, the raw material ratio of phosphorus was set to the constant value of 1.5 wt %, the raw material ratio of iron was set to the constant value of 0.8 wt %, the Co/(Sn+Co) ratio was set to the constant value of 37 wt %, and the raw material ratio of titanium was change in the range form 0 wt % to 16 wt %, that is, the raw material ratios were similar to those of Examples 33-12.

TABLE 49

|  | Raw material ratio (wt %) | | | | | | | Analytical value (wt %) | | | | | | |
|---|---|---|---|---|---|---|---|---|---|---|---|---|---|---|
|  | Co | Sn | C | P | Fe | Si | (Sn + Si) | Co | Sn | C | P | Fe | Si | (Sn + Si) |
| Example 40-5 | 28.7 | 49 | 20 | 1.5 | 0.8 | 0 | 49 | 28.5 | 48.5 | 19.8 | 1.5 | 0.8 | 0 | 48.5 |
| Example 46-1 | 28.6 | 49.1 | 20 | 1.5 | 0.8 | 0.3 | 49.4 | 28.4 | 48.6 | 19.8 | 1.5 | 0.8 | 0.3 | 48.9 |
| Example 46-2 | 28.6 | 49.1 | 20 | 1.5 | 0.8 | 0.5 | 49.6 | 28.3 | 48.6 | 19.8 | 1.5 | 0.8 | 0.5 | 49.1 |
| Example 46-3 | 28.4 | 49.3 | 20 | 1.5 | 0.8 | 1 | 50.3 | 28.1 | 48.8 | 19.8 | 1.5 | 0.8 | 1 | 49.8 |
| Example 46-4 | 28 | 49.7 | 20 | 1.5 | 0.8 | 2 | 51.7 | 27.7 | 49.2 | 19.8 | 1.5 | 0.8 | 2 | 51.2 |
| Example 46-5 | 27.3 | 50.4 | 20 | 1.5 | 0.8 | 4 | 54.4 | 27 | 49.9 | 19.8 | 1.5 | 0.8 | 4 | 53.9 |
| Example 46-6 | 26.5 | 51.2 | 20 | 1.5 | 0.8 | 6 | 57.2 | 26.3 | 50.7 | 19.8 | 1.5 | 0.8 | 5.9 | 56.6 |
| Example 46-7 | 26.2 | 51.5 | 20 | 1.5 | 0.8 | 7 | 58.5 | 25.9 | 51 | 19.8 | 1.5 | 0.8 | 6.9 | 58 |
| Example 46-8 | 25.8 | 51.9 | 20 | 1.5 | 0.8 | 8 | 59.9 | 25.5 | 51.4 | 19.8 | 1.5 | 0.8 | 7.9 | 59.3 |
| Example 46-9 | 25.6 | 52.1 | 20 | 1.5 | 0.8 | 8.5 | 60.6 | 25.3 | 51.6 | 19.8 | 1.5 | 0.8 | 8.4 | 60 |
| Example 46-10 | 25.4 | 52.3 | 20 | 1.5 | 0.8 | 9 | 61.3 | 25.2 | 51.8 | 19.8 | 1.5 | 0.8 | 8.9 | 60.7 |
| Example 46-11 | 25 | 52.7 | 20 | 1.5 | 0.8 | 10 | 62.7 | 24.8 | 52.1 | 19.8 | 1.5 | 0.8 | 9.9 | 62 |

TABLE 51

| | Raw material ratio (wt %) | | | | | | Analytical value (wt %) | | | | | | Initial charge capacity (mAh/g) | 2 Cy. discharge capacity (mAh/cm³) | 300 Cy. discharge capacity (mAh/cm³) | Capacity retention ratio (%) |
|---|---|---|---|---|---|---|---|---|---|---|---|---|---|---|---|---|
| | Co | Sn | C | P | Fe | Ti | Co | Sn | C | P | Fe | Ti | | | | |
| Example 47-1 | 27.2 | 50.5 | 20 | 1.5 | 0.8 | 0 | 26.9 | 50 | 19.8 | 1.5 | 0.8 | 0 | 519 | 116 | 88 | 76 |
| Example 47-2 | 26.9 | 50 | 20 | 1.5 | 0.8 | 0.8 | 26.6 | 49.5 | 19.8 | 1.5 | 0.8 | 0.8 | 532 | 116 | 90 | 78 |
| Example 47-3 | 26.7 | 49.5 | 20 | 1.5 | 0.8 | 1.5 | 26.4 | 49 | 19.8 | 1.5 | 0.8 | 1.5 | 534 | 118 | 96 | 81 |
| Example 47-4 | 26.4 | 48.9 | 20 | 1.5 | 0.8 | 2.4 | 26.1 | 48.5 | 19.8 | 1.5 | 0.8 | 2.4 | 538 | 119 | 98 | 82 |
| Example 47-5 | 26.2 | 48.7 | 20 | 1.5 | 0.8 | 2.8 | 26 | 48.2 | 19.8 | 1.5 | 0.8 | 2.8 | 545 | 119 | 102 | 86 |
| Example 47-6 | 25.8 | 47.9 | 20 | 1.5 | 0.8 | 4 | 25.5 | 47.4 | 19.8 | 1.5 | 0.8 | 4 | 547 | 120 | 104 | 87 |
| Example 47-7 | 25.4 | 47.2 | 20 | 1.5 | 0.8 | 5.1 | 25.2 | 46.7 | 19.8 | 1.5 | 0.8 | 5 | 556 | 120 | 104 | 87 |
| Example 47-8 | 24.6 | 45.6 | 20 | 1.5 | 0.8 | 7.5 | 24.3 | 45.2 | 19.8 | 1.5 | 0.8 | 7.4 | 559 | 121 | 104 | 86 |
| Example 47-9 | 23.7 | 44 | 20 | 1.5 | 0.8 | 10 | 23.5 | 43.6 | 19.8 | 1.5 | 0.8 | 9.9 | 556 | 119 | 102 | 86 |
| Example 47-10 | 22.6 | 42.1 | 20 | 1.5 | 0.8 | 13 | 22.4 | 41.6 | 19.8 | 1.5 | 0.8 | 12.9 | 551 | 118 | 100 | 85 |
| Example 47-11 | 21.9 | 40.8 | 20 | 1.5 | 0.8 | 15 | 21.7 | 40.3 | 19.8 | 1.5 | 0.8 | 14.9 | 526 | 118 | 97 | 82 |
| Example 47-12 | 21.6 | 40.1 | 20 | 1.5 | 0.8 | 16 | 21.4 | 39.7 | 19.8 | 1.5 | 0.8 | 15.8 | 485 | 100 | 70 | 70 |

For the secondary batteries of Examples 47-1 to 47-12, the initial charge capacity and the capacity retention ratio were examined in the same manner as in Examples 40-1 to 40-7. The results are shown in Table 51 and FIG. 40.

Figure 40:
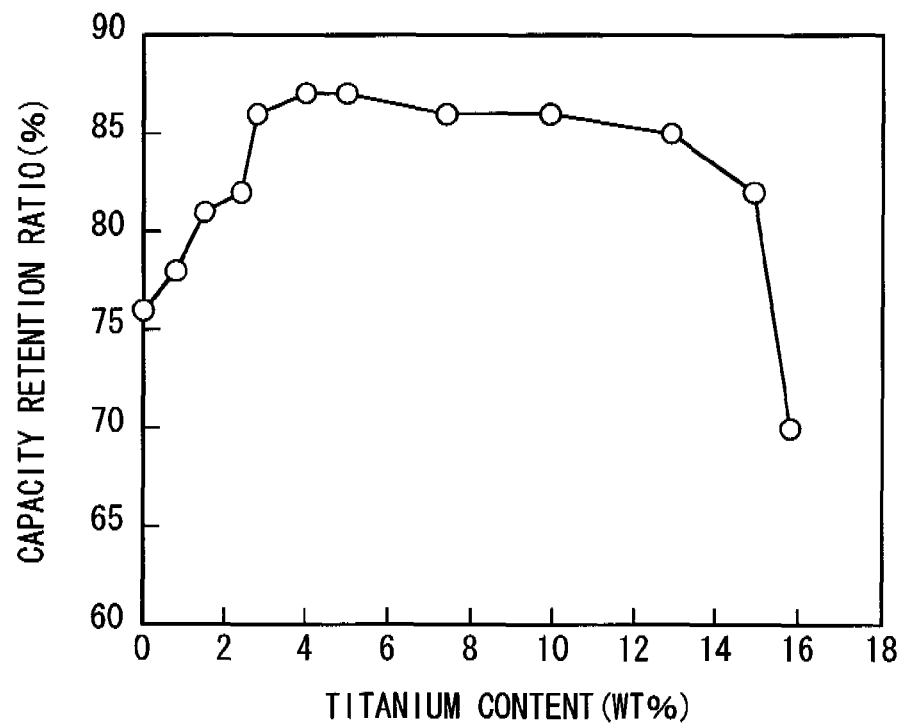
FIG. 40 is a characteristics diagram showing a relation between titanium contents in anode active materials of the batteries according to the second embodiment (gel electrolyte) and capacity retention ratios.

As evidenced by Table 51 and FIG. 40, results similar to those of Examples 33-1 to 33-12 were obtained. That is, it was found that even in the case that the gel electrolyte was used, if the anode active material contained titanium in the range of 14.9 wt % or less, the cycle characteristics could be more improved. In addition, it was found that the titanium content was more preferably 1.5 wt % or more, and in particular, was much more preferably in the range from 2.8 wt % to 12.9 wt %.

Examples 48-1 to 48-3

Secondary batteries were fabricated in the same manner as in Example 40-5, except that FEC was added to the solvent of the electrolytic solution, that is, the composition of the solvent was similar to those of Examples 23-1 to 23-3.

For the secondary batteries of Examples 48-1 to 48-3, the capacity retention ratio was examined in the same manner as in Examples 40-1 to 40-7. The results are shown in Table 52.

FEC was not added to the solvent. That is, it was found that if the solvent contained a cyclic ester carbonate having a halogen atom, the cycle characteristics could be more improved even when the gel electrolyte was used.

As evidenced by the results shown in Table 1 to Table 52, FIG. 8, and FIG. 10 to FIG. 40, the following was confirmed. That is, regardless of the battery structure (cylindrical type or laminated film type) or the electrolyte type (liquid or gel), if the anode active material contained tin, cobalt, carbon, and phosphorus as an element, the carbon content was from 9.9 wt % to 29.7 wt %, the phosphorus content was from 0.1 wt % to 2.2 wt %, and the cobalt ratio to the total of tin and cobalt was from 24 wt % to 70 wt %; or if the anode active material contained tin, cobalt, carbon, phosphorus, and iron as an element, the carbon content was from 9.9 wt % to 29.7 wt %, the phosphorus content was from 0.1 wt % to 2.2 wt %, the iron content was from 0.1 wt % to 5.9 wt %, and the cobalt ratio to the total of tin and cobalt was from 24 wt % to 70 wt %; the capacity, the cycle characteristics, and the initial charge and discharge efficiency were improved. In this case, it was also confirmed that if the anode active material contained iron as an element, the cycle characteristics were more improved compared to the case that the anode active material did not contain iron.

TABLE 52

| | Raw material ratio (wt %) | | | | | Analytical value (wt %) | | | | | Solvent (wt %) | | | Capacity retention ratio (%) |
|---|---|---|---|---|---|---|---|---|---|---|---|---|---|---|
| | Co | Sn | C | P | Fe | Co | Sn | C | P | Fe | FEC | EC | PC | |
| Example 40-5 | 28.7 | 49 | 20 | 1.5 | 0.8 | 28.5 | 48.5 | 19.8 | 1.5 | 0.8 | 0 | 11.5 | 11.5 | 76 |
| Example 48-1 | 28.7 | 49 | 20 | 1.5 | 0.8 | 28.5 | 48.5 | 19.8 | 1.5 | 0.8 | 1 | 10.5 | 11.5 | 78 |
| Example 48-2 | 28.7 | 49 | 20 | 1.5 | 0.8 | 28.5 | 48.5 | 19.8 | 1.5 | 0.8 | 5 | 6.5 | 11.5 | 88 |
| Example 48-3 | 28.7 | 49 | 20 | 1.5 | 0.8 | 28.5 | 48.5 | 19.8 | 1.5 | 0.8 | 10 | 1.5 | 11.5 | 93 |

As evidenced by Table 52, in Examples 48-1 to 48-3 in which FEC was added to the solvent, the capacity retention ratio was more improved than that of Example 40-5 in which The invention has been described with reference to the embodiments and the examples. However, the invention is not limited to the aspects described in the foregoing embodiments and the foregoing examples, and various modifications may be made. For example, in the foregoing embodiments and the foregoing examples, the descriptions have been given of the lithium ion secondary battery in which the anode capacity is expressed as the capacity component based on insertion and extraction of lithium as a battery type. However, the invention is not limited thereto. The battery of the invention can be similarly applied to a secondary battery in which the anode capacity includes the capacity component based on insertion and extraction of lithium and the capacity component based on precipitation and dissolution of lithium, and the anode capacity is expressed as the total of the foregoing capacity components by setting the charge capacity of the anode material capable of inserting and extracting lithium to the smaller value than the value of the cathode charge capacity.

Further, in the foregoing embodiments and the foregoing examples, the descriptions have been given of the battery in which the battery structure is the cylindrical type, the laminated type, the sheet type, or the coin type; or the battery in which the element structure is the spirally winding structure. However, the invention can be similarly applied to a battery having other battery structure using a package member such as a button type battery and a square type battery; or a battery that has other element structure such as a lamination structure in which a plurality of cathodes and a plurality of anodes are layered. It is needless to say that the battery of the invention can be similarly applied to any other kind of battery such as a primary battery, in addition to the secondary battery.

Further, in the foregoing embodiments and the foregoing examples, the descriptions have been given of the case using lithium as an electrode reactant. However, the invention can be applied to a case using other Group 1 element in the long period periodic table such as sodium (Na) and potassium (K); a Group 2 element in the long period periodic table such as magnesium and calcium (Ca); other light metal such as aluminum; or an alloy of lithium or the foregoing elements. In this case, similar effects can be obtained. At this time, a cathode active material capable of inserting and extracting an electrode reactant, a nonaqueous solvent and the like can be selected according to the electrode reactant.

Further, in the foregoing embodiments and the foregoing examples, the appropriate ranges derived from the results of the examples have been described for the carbon content in the anode active material and the battery of the invention. However, the descriptions do not totally deny the possibility that the content is out of the foregoing range. That is, the foregoing appropriate range is only the particularly preferable range for obtaining the effects of the invention. As long as the effects of the invention could be obtained, the carbon content may be slightly out of the foregoing range. The same is similarly applied to other numerical ranges such as the phosphorus content, the iron content, the cobalt ratio to the total of tin and cobalt, the silicon content, and the indium content.

It should be understood by those skilled in the art that various modifications, combinations, sub-combinations and alternations may occur depending on design requirements and other factors insofar as they are within the scope of the appended claims or the equivalents thereof.

What is claimed is:

1. An anode active material comprising:
    (a) at least tin, cobalt, carbon, phosphorus, iron, and silicon; and
    (b) at least one of titanium or bismuth
wherein,
    a carbon content is from and including 9.9 wt % to 29.7 wt %,
    a phosphorus content is from and including 0.5 wt % to 2.0 wt %
    a silicon content is from and including 0.5 wt % to 7.9 wt %,
    an iron content is from 0.1 wt % to 5.9 wt %, and
    a ratio of cobalt to the total of the tin and the cobalt is from and including 24 wt % to 70 wt %.

2. The anode active material according to claim 1, wherein a 1s peak of the carbon is obtained in a region lower than 284.5 eV by X-ray Photoelectron Spectroscopy.

3. The anode active material according to claim 1 having a reactive phase which is capable of reacting with lithium (Li), and whose half-width of a diffraction peak obtained by X-ray diffraction is 1 degree or more.

4. The anode active material according to claim 1 further comprising at least one element selected from the group consisting of indium, niobium, germanium, titanium, molybdenum, and gallium, and bismuth, in an amount of 14.9 wt % or less.

5. The anode active material according to claim 1 comprising at least one element selected from the group consisting of indium, niobium, germanium, titanium, molybdenum, and gallium, and bismuth in an amount 1.5 wt % or more.

6. The anode active material according to claim 5 further comprising at least one element selected from the group consisting of indium, niobium, germanium, titanium, molybdenum, and gallium, and bismuth in an amount from 1.5 wt % to 14.9 wt %.

7. A battery comprising:
    a cathode;
    an anode; and
    an electrolyte,
    wherein,
        the anode contains an anode active material containing (a) at least tin, cobalt, carbon, phosphorus, iron, and silicon, and (b) at least one of titanium and bismuth, a carbon content in the anode active material is from and including 9.9 wt % to 29.7 wt %,
        a phosphorus content in the anode active material is from and including 0.5 wt % to 2.0 wt %
        a silicon content in the anode active material is from and including 0.5 wt % to 7.9 wt %,
        an iron content is from 0.1 wt % to 5.9 wt %, and
        a ratio of cobalt to the total of the tin and the cobalt is from and including 24 wt % to 70 wt %.

8. The battery according to claim 7, wherein in the anode active material, a 1s peak of the carbon is obtained in a region lower than 284.5 eV by X-ray Photoelectron Spectroscopy.

9. The battery according to claim 7, wherein the anode active material has a reactive phase which is capable of reacting with lithium, and whose half-width of a diffraction peak obtained by X-ray diffraction is 1 degree or more.

10. The battery according to claim 7, wherein the anode active material further comprises at least one element selected from the group consisting of indium, niobium, germanium, titanium, molybdenum, and gallium, and bismuth in an amount of 14.9 wt % or less.

11. The battery according to claim 10, wherein the anode active material comprises at least one element selected from the group consisting of the indium, niobium, germanium, titanium, molybdenum, and gallium, and bismuth in an amount of 1.5 wt % or more.

12. The battery according to claim 11, wherein the anode active material further comprises at least one element selected from the group consisting of indium, niobium, germanium, titanium, molybdenum, and gallium, and bismuth in an amount of 1.5 wt % to 14.9 wt %.

13. The battery according to claim 7, wherein the electrolyte contains a cyclic ester carbonate derivative having a halogen atom.

14. The anode active material according to claim 1 wherein the amount of titanium or bismuth is 14.9 wt % or less.

15. The anode active material according to claim 1 wherein the amount of titanium or bismuth is 1.5 wt % or more.

16. The anode active material according to claim 1 wherein the amount of titanium or bismuth is from 1.5 wt % to 14.9 wt %.

17. The battery according to claim 7 wherein the amount of titanium or bismuth is 14.9 wt % or less.

18. The battery according to claim 7 wherein the amount of titanium or bismuth is 1.5 wt % or more.

19. The battery according to claim 7 wherein the amount of titanium or bismuth is from 1.5 wt % to 14.9 wt %.

20. An anode active material comprising at least tin, cobalt, carbon, phosphorus, iron and silicon,
   wherein,
      a carbon content is from and including 9.9 wt % to 29.7 wt %,
      a phosphorus content is from and including 0.5 wt % to 2.0 wt %
      a silicon content is from and including 0.5 wt % to 7.9 wt %,
      an iron content is from 0.1 wt % to 5.9 wt %, and
      a ratio of cobalt to the total of the tin and the cobalt is from and including 24 wt % to 70 wt %.

* * * * *